(12) United States Patent
Hunt

(10) Patent No.: US 7,984,429 B2
(45) Date of Patent: *Jul. 19, 2011

(54) TOOLS AND TECHNIQUES FOR INSTRUMENTING INTERFACES OF UNITS OF A SOFTWARE PROGRAM

(75) Inventor: Galen C. Hunt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1609 days.

This patent is subject to a terminal disclaimer.

(21) Appl. No.: 11/097,636

(22) Filed: Apr. 1, 2005

(65) Prior Publication Data

US 2005/0183090 A1  Aug. 18, 2005

Related U.S. Application Data

(62) Division of application No. 09/196,836, filed on Nov. 20, 1998, now Pat. No. 7,039,919.

(60) Provisional application No. 60/102,815, filed on Oct. 2, 1998.

(51) Int. Cl.
G06F 9/44 (2006.01)
G06F 9/45 (2006.01)

(52) U.S. Cl. ......... 717/130; 717/139; 717/143; 717/153

(58) Field of Classification Search .................. None
See application file for complete search history.

(56) References Cited

U.S. PATENT DOCUMENTS

| | | | |
|---|---|---|---|
| 3,427,443 A | 2/1969 | Apple et al. | |
| 3,551,659 A | 12/1970 | Forsythe | |
| 4,819,233 A | 4/1989 | Delucia et al. | |
| 5,021,947 A | 6/1991 | Campbell et al. | |
| 5,193,180 A | 3/1993 | Hastings | |
| 5,247,678 A | 9/1993 | Littleton | |
| 5,379,432 A | 1/1995 | Orton et al. | |
| 5,390,329 A | 2/1995 | Gaertner et al. | |
| 5,497,491 A | 3/1996 | Mitchell et al. | |
| 5,535,329 A | 7/1996 | Hastings | |
| 5,579,520 A | 11/1996 | Bennett | |
| 5,634,114 A | 5/1997 | Shipley | |
| 5,675,805 A | 10/1997 | Boldo et al. | |
| 5,710,925 A | 1/1998 | Leach et al. | |
| 5,724,584 A | 3/1998 | Peters et al. | |

(Continued)

OTHER PUBLICATIONS

"Debugging with GDB: Symbols, 10. Examining the Symbol Table," 3 pp., downloaded from the World Wide Web on Oct. 29, 2001.

(Continued)

*Primary Examiner* — Chuck O Kendall
(74) *Attorney, Agent, or Firm* — Klarquist Sparkman, LLP

(57) ABSTRACT

A method of instrumenting one or more units of an application program is disclosed. Each unit can have one or more interfaces through which communications pass through the unit. Client units can request creation of a server unit. When they do so, the call is intercepted and sent to a unit creation function, which creates the server unit and returns a reference to an interface of the server unit. When a reference to an interface of the server unit is detected, an interface wrapper is created for the interface, the interface wrapper comprising a reference to instrumentation, the reference to the interface, and a reference to a type description of the interface. The client receives a reference to the interface wrapper in place of a reference to the interface, and thereafter is able to treat the reference to the interface wrapper as if it were a reference to the interface.

20 Claims, 18 Drawing Sheets

U.S. PATENT DOCUMENTS

| | | | |
|---|---|---|---|
| 5,748,962 A | 5/1998 | Brechtel et al. | |
| 5,752,038 A | 5/1998 | Blake et al. | |
| 5,790,858 A | 8/1998 | Vogel | |
| 5,802,585 A | 9/1998 | Scales et al. | |
| 5,805,885 A | 9/1998 | Leach et al. | |
| 5,806,061 A | 9/1998 | Chaudhuri et al. | |
| 5,881,268 A | 3/1999 | McDonald et al. | |
| 5,893,118 A | 4/1999 | Sonderegger | |
| 5,905,987 A | 5/1999 | Shutt et al. | |
| 5,917,998 A | 6/1999 | Cabrera et al. | |
| 5,978,583 A | 11/1999 | Ekanadham et al. | |
| 5,978,785 A | 11/1999 | Johnson et al. | |
| 5,987,247 A | 11/1999 | Lau | |
| 5,987,249 A | 11/1999 | Grossman et al. | |
| 6,011,918 A | 1/2000 | Cohen et al. | |
| 6,016,392 A | 1/2000 | Jordan | |
| 6,023,696 A | 2/2000 | Osborn et al. | |
| 6,026,236 A | 2/2000 | Fortin et al. | |
| 6,026,484 A | 2/2000 | Golston | |
| 6,044,224 A | 3/2000 | Radia et al. | |
| 6,088,717 A | 7/2000 | Reed et al. | |
| 6,088,739 A | 7/2000 | Pugh et al. | |
| 6,101,325 A | 8/2000 | Flaat | |
| 6,112,304 A | 8/2000 | Clawson | |
| 6,131,095 A | 10/2000 | Low et al. | |
| 6,134,559 A | 10/2000 | Brumme et al. | |
| 6,154,878 A | 11/2000 | Saboff | |
| 6,199,075 B1 | 3/2001 | Ungar et al. | |
| 6,230,312 B1 | 5/2001 | Hunt | |
| 6,237,079 B1 | 5/2001 | Stoney | |
| 6,263,491 B1 | 7/2001 | Hunt | |
| 6,353,887 B1 | 3/2002 | Cotugno et al. | |
| 6,381,628 B1 | 4/2002 | Hunt | |
| 6,381,735 B1 | 4/2002 | Hunt | |
| 6,385,766 B1 | 5/2002 | Doran, Jr. et al. | |
| 6,393,476 B1 | 5/2002 | Barnhouse et al. | |
| 6,397,254 B1 | 5/2002 | Northrup | |
| 6,412,019 B1 | 6/2002 | Gibbons et al. | |
| 6,421,705 B1 | 7/2002 | Northrup | |
| 6,445,782 B1 | 9/2002 | Elfe et al. | |
| 6,473,768 B1 | 10/2002 | Srivastava et al. | |
| 6,499,137 B1 | 12/2002 | Hunt | |
| 6,516,354 B2 | 2/2003 | Cavanaugh | |
| 6,519,767 B1 | 2/2003 | Carter et al. | |
| 6,546,553 B1 | 4/2003 | Hunt | |
| 6,629,123 B1 * | 9/2003 | Hunt | 718/106 |
| 6,721,941 B1 | 4/2004 | Morshed et al. | |
| 6,760,903 B1 | 7/2004 | Morshed et al. | |
| 6,957,422 B2 | 10/2005 | Hunt | |
| 6,983,463 B1 | 1/2006 | Hunt | |
| 6,988,271 B2 | 1/2006 | Hunt | |
| 7,039,919 B1 | 5/2006 | Hunt | |
| 7,415,712 B2 | 8/2008 | Hunt | |
| 7,493,630 B2 | 2/2009 | Hunt | |

OTHER PUBLICATIONS

"Linux From Scratch: Version 20010921, Chapter 6: Installing basic system software, 6.2. About debugging symbols," 1 pp., downloaded from the World Wide Web on Oct. 29, 2001.

Using Inter-Component Communication Analysis to Understand Component Applications, University of Rochester (Sep. 1997).

Aral et al., "Efficient Debugging Primitives for Multiprocessors," ASPLOS-III Proceedings, Third International Conference on Architectural Support for Programming Languages and Operating Systems, Boston, Massachusetts, pp. 87-95, Apr. 1989.

Aral et al., "Non-Intrusive and Interactive Profiling in Parasight," ACM/SIGPLAN PPEALS 1988, New Haven, Connecticut, pp. 21-30, Jul. 1988.

Ball et al., "Optimally Profiling and Tracing Programs," *University of Wisconsin Computer Sciences Technical Report 1031*, Sep. 6, 1991.

Berre et al., "SIMOD—An ODP—extended Role—Modeling Methodology for Distributed Objects," (Mar. 1997).

Brown, "Building a Lightweight COM Interception Framework, Part I: The Universal Delegator," *Microsoft Systems Journal*, vol. 14, pp. 17-29 (Jan. 1999).

Brown, "Building a Lightweight COM Interception Framework, Part II: The Guts of the UD," *Microsoft Systems Journal*, vol. 14, pp. 49-59 (Feb. 1999).

Chang et al., "Using Profile Information to Assist Classic Code Optimizations," *Software Practice and Experience*, vol. 21(12), pp. 1301-1321 (Dec. 1991).

Evans, "On-Line Debugging Techniques: A survey," AFIPS Conference Proceedings, vol. 29, Fall Joint Computer Conference, pp. 37-50 (Nov. 1966).

Exton et al., "Comparisons between CORBA IDL and COM/DCOM MIDL: Interfaces for Distributed Computing," (Aug. 1997).

Fagin, "Combining Fuzzy Information from Multiple Systems," *Special Issue of the J. Computer and System Sciences for Selected Papers from the 1996 Symposium on Principles of Database Systems*, 33 pp. (1996).

Gill, "The Diagnosis of Mistakes in Programmes on the EDASC," Proceedings of the Royal Society of London, Series A. Mathematical and Physical Sciences, vol. 206, London, England, pp. 538-554 (May 1951).

Gilpin, "Debugging Under Unix: gdb Tutorial," 6 pp., page last modified Sep. 11, 2001, downloaded from the World Wide Web on Oct. 29, 2001.

GNU Binary Utilities Documentation, version 2.10.1, 41 pp., downloaded from the World Wide Web on Nov. 16, 2001.

Hamlin et al., "Configurable Applications for Graphics Employing Satellites (CAGES)," *Proc. Second Annual Conf. on Computer Graphics and Interactive Techniques* (SIGGRAPH '75), pp. 9-19 (1975).

Hamlin, "Configurable Applications for Satellite Graphics," *Proc. Third Annual Conf. on Computer Graphics and Interactive Techniques* (SIGGRAPH '76), pp. 196-203 (1976).

Harchol-Balter et al., "Exploiting process lifetime distributions for dynamic load balancing," *ACM*, pp. 13-24 (1996).

Hartley, "Compile-Time Program Restructuring in Multiprogrammed Virtual Memory Systems," *IEEE Transactions on Software Engineering*, vol. 14, No. 11 (Nov. 1988).

Heisch, "Trace-directed program restructuring for AIX executables," *IBM J. Res. Develop.*, vol. 38, No. 5 (Sep. 1994).

Hellerstein et al., "Predicate Migration: Optimizing Queries with Expensive Predicates," *Proc. ACM SIGMOD International Symposium on Management of Data*, Washington, D.C., 10 pp. (May 1993).

Hong et al., "Classifying and Retrieving Software Components Based on Profiles," *IEEE*, pp. 1756-1760 (1997).

Hunt et al., "A Guided Tour of the Coign Automatic Distributed Partitioning System," *Proc. Second International Enterprise Distributed Object Computing Workshop*, pp. 252-262 (Nov. 1998).

Hunt et al., "Coign: Automated Distributed Partitioning of Component Applications," Presentation from SOSP Work-in-Progress session, 13 pp. (Oct. 1997).

Hunt et al., "Coign: Automated Distributed Partitioning of Component Applications," Slide Presentation from SOSP Work-in-Progress session 5 pp. (Oct. 1997).

Hunt et al., "Coign: Automated Distributed Partitioning of Component Applications," Abstract from SOSP Work-in-Progress session, 1 p. (Oct. 1997).

Hunt et al., "Coign: Automated, Distributed Partitioning of Component Applications," Poster from SOSP Work-in-Progress session, 9 pp. (Oct. 1997).

Hunt et al., "Coign: Efficient Instrumentation for Inter-Component Communication Analysis," URCS Tech Report 648, University of Rochester, Rochester, New York, 11 pp. (Feb. 1997).

Hunt et al., "Contributions," Poster from SOSP Work-in-Progress session, 3 pp. (Oct. 1997).

Hunt et al., "Intercepting and Instrumenting COM Applications," *Proc. Fifth Conference on Object-Oriented Technologies and Systems*, pp. 45-56 (May 1999).

Hunt et al., "The Coign Automatic Distributed Partitioning System," *Proc. Third Symposium on Operating System Design and Implementation*, pp. 187-200 (Feb. 1999).

Hunt, "Automatic Application Partitioning," Slide Presentation at 6 month Review of Ph.D. Thesis Project, University of Rochester, Rochester, New York, 17 pp. (Dec. 1997).

Hunt, "Automatic Distributed Partitioning of Component Applications," Slide Presentation at 6 Month Review of Ph.D. Thesis Project, University of Rochester, Rochester, New York, 17 pp. (May 1998).
Hunt, "Automatic Distributed Partitioning of Component-Based Applications," Ph.D. thesis, University of Rochester, Rochester, New York, 135 pp. (1998).
Hunt, "Automatic Distributed Partitioning of Component-Based Applications," doctoral thesis, University of Rochester, Rochester, New York, 145 pp. (Summer 1998).
Hunt, "Creating Distributed Applications the Easy Way," Handout at presentation to ACM of Rochester, Rochester, New York, 1 p. (Dec. 1997).
Hunt, "Creating Distributed Applications the Easy Way," Slide presentation to ACM of Rochester, Rochester, New York, 44 pp. (Dec. 1997).
Hunt, "Inter-Component Communication Analysis: Dynamic Discovery and Partitioning of Components in Distributed Applications," Handout from Third Conference on Object-Oriented Technologies and Systems, 2 pp. (May 1997).
Hunt, "Inter-Component Communication Analysis: Dynamic Discovery and Partitioning of Components in Distributed Applications," Slide Presentation at Third Conference on Object-Oriented Technologies and Systems, 7 pp., May 1997.
Hunt, "Using Inter-Component Communication Analysis to Understand Component Applications," Ph.D. Thesis Proposal, University of Rochester, Rochester, New York, 42 pp. (Jan. 1997).
Hunt, "Using Inter-Component Communication Analysis to Understand Component Applications," Slide Presentation at Six Month Review of Ph.D. Thesis Project, University of Rochester, Rochester, New York, 42 pp (Jan. 1997).
Hunt, "Using Inter-Component Communication Analysis to Understand Component Applications," Slide Presentation at Six Month Review of Ph.D. Thesis Project, University of Rochester, Rochester, New York, 42 pp (Apr. 1997).
Hunt, "Using Inter-Component Communication Analysis: Dynamic discovery and Placement of Components in Distributed Applications," Slide Presentation at Third Conference on Object-Oriented Technologies and Systems, 7 pp. (May 1997).
Keller et al., "Binary Component Adaptation", ECOOP'98, pp. 307-329.
Kemper et al., "Optimizing Disjunctive Queries with Expensive Predicates," *Proceedings ACM SIGMOD Conference on Management of Data*, pp. 336-347, Minneapolis, Minnesota (May 1994).
Keppel, "A Portable Interface for On-The-Fly Instruction Space Modification," University of Washington, Seattle, Washington, pp. 86-94 (1991).
Keppel, "A Portable Interface for On-The-Fly Instruction Space Modification," Proceedings of the Fourth International Conference on Architectural Support for Programming Languages and Operating Systems, pp. 86-95, Santa Clara, California (Apr. 1991).
Kessler, "Fast Breakpoints: Design and Implementation," Proceedings of the ACM SIGPLAN'90 Conference on Programming Language Design and Implementation, White Plains, New York, pp. 78-84 (Jun. 1990).
Kimelman et al., "Dynamic Application Partitioning in VisualAge Generator Version 3.0," *Proc. ECOOP '98 Workshop on Object-Oriented Technology*, pp. 547-548 (Jul. 1998).
Kimelman et al., "Partitioning and Assignment of Distributed Object Applications Incorporating Object Replication and Caching," *Proc. ECOOP '98 Workshop on Object-Oriented Technology*, pp. 313-314 (Jul. 1998).
Kirtland, "Object-Oriented Software Development Made Simple With COM+ Runtime Services," *Microsoft Systems Journal*, vol. 12, pp. 49-59 (Nov. 1997).
Larus et al, "EEL: Machine-Independent Executable Editing," SIGPLAN Conference on Programming Language Design and Implementation, pp. 291-300 (Jun. 1995).
Larus et al., "Rewriting Executable Files to Measure Program Behavior," *University of Wisconsin Computer Sciences Technical Report 1083* (Mar. 25, 1992).
Lea et al., "COOL: system support for distributed object-oriented programming," pp. 1-18 (May 2, 1993).
Lee, et al., "Execution Characteristics on Desktop Applications on Windows NT," 25th Annual International Symposium on Computer Architecture, 12 pages (Jun. 1998).
Michel et al., "Experience with Distributed Processing on a Host/Satellite Graphics System," *Proc. Third Annual Conf. on Computer Graphics and Interactive Techniques* (SIGGRAPH '76), pp. 190-195 (1976).
Narasimhan et al., "Exploiting the Internet Inter-ORB Protocol Interface to Provide CORBA With Fault Tolerance," Proceedings of the Third USENIX Conference on Object-Oriented Technologies and Systems, 11 pp. (Jun. 1997).
Osman, Eric, "DDT Reference Manual," Massachusetts Institute of Technology Artificial Intelligence Laboratory, Memo No. 147A, pp. 81 (Sep. 1971).
Pettis et al., "Profile Guided Code Positioning," Proceedings of the ACM SIGPLAN'90, Conference on Programming Language, Design and Implementation (Jun. 20-22, 1990).
Pietrek, "Learn System-Level Win32 Coding Techniques by Writing an API Spy Program," *Microsoft Systems Journal*, pp. 17-44 (Dec. 1994).
Purtilo et al., "Module Reuse by Interface Adaptation", Software Practice and Experience, vol. 21, No. 6, pp. 539-555 (Jun. 1991).
Reimann et al., "User-oriented Criteria for the Selection of DSS Software," *Comm. Of the ACM*, vol. 28, No. 2, pp. 166-179 (Feb. 1985).
Romer, Ted et al., "Instrumentation and Optimization of Win32/Intel Executables Using Etch," Proceedings of the USENIX Windows NT Workshop 1997, Seattle, Washington, pp. 1-7 (Aug. 1997).
Sarkar, "Determining Average Program Execution Times and their Variance," ACM 0-89791-306/X/89/0006/0298 (1989).
Schmidt et al., Object Interconnections, Object Adapters: Concepts and Terminology (col. 11), *SIGS C++Report*, 9 pp. (Oct. 1997).
Speer et al., "Improving UNIX Kernel Performance using Profile Based Optimization," 1994 Winter USENIX, San Francisco, CA (Jan. 17-21, 1994).
Srivastava et al., "ATOM: A system for Building Customized Program Analysis Tools," Proceedings of the SIGPLAN '94 Conference on Programming Language Design and Implementation, Orlando, Florida, pp. 196-205 (Jun. 1994).
Storage and Retrieval for Image and Video Databases (SPIE) (Feb. 1993).
Tarjan, "Data Structures and Network Algorithms," CBMS-NSF Regional Conference Series in Applied Mathematics, Chapter 6, pp. 71-83 (1983).
Van Dam et al., "Intelligent Satellites for Interactive Graphics," *Proc. IEEE*, vol. 62, No. 4, pp. 483-492 (1974).
Vinoski, "CORBA Integrating Diverse Applications Within Distributed Heterogeneous Environments," *IEEE Communications*, vol. 14, No. 2 (Feb. 1997).
Visscher, "GNU Binary Utilities," documentation for the GNU binary utlities, collectively version 2.10.1, 61 pp., generated on Jan. 2, 2001, downloaded from the World Wide Web on Nov. 15, 2001.
Wang et al., "COMERA: COM Extensible Remoting Architecture," Proceedings of the 4th USENIX Conference on Object-Oriented Technologies and Systems (COOTS '98), pp. 79-88 (Apr. 1998).
Welch et al., "Metrics and Techniques for Automatic Partitioning and Assignment of Object-based Concurrent Programs," *Proc. Seventh IEEE Symposium on Parallel and Distributed Processing*, Oct. 25-28, 1995, pp. 440-447 (1995).
Zhang, et al., "System Support for Automated Profiling and Optimization," Proceedings of the Sixteenth ACM Symposium on Operating System Principles, Saint-Malo, France, 12 pages (Oct. 1997).
Zielinski et al., "A Tool for Monitoring Software-Heterogeneous Distributed Object Applications," Proc. 15th Int'l Conf. on Distributed Computing Systems, Vancouver, Canada, IEEE CS Press, pp. 11-18 (May 1995).
Hunt et al., "The Coign Automatic Distributed Partitioning System," Aug. 1998, pp. 1-2.

\* cited by examiner

FIG. 9

260 — *Program Control Flow:*
        a.func1: a->func2()

a.func2: ∴b->func3()

b.func3: ∴b->func4()

b.func4: ∴c->func5()

c.func5: ∴CoCreateInstance(type)

261 — *Incremental Classifier:*
        10 (for 10th call to CoCreateInstance)

262 — *Component Static-Type Classifier:*
        type

263 — *Static-Type Component Call-Chain (T3C) Classifier:*
        type + Type(c) + Type(b) + Type(a)

264 — *Procedure Call-Chain (PCC) Classifier:*
        type + func5 + func4 + func3 + func3 + func1

265 — *Internal Component Call-Chain (I3C) Classifier:*
        type + c.func5 + b.func4 + b.func3 + a.func3 + a.func1

266 — *Entry-point Component Call-Chain (EP3C) Classifier:*
        type + c.func5 + b.func4 + a.func3

FIG. 10

```
// Application Source
    ...
    CoCreateInstance (CIsid)  ──280──▶  XCoCreateInstance (CIsid)
    ...

;; Application Binary
    ...
    push  CIsid              ──281──▶   push  CIsid
    call  [CoCreateInstance]            call  [XCoCreateInstance]
    ...

;; Application Binary
    ...
    CoCreateInstance:        ──282──▶   CoCreateInstance:
       word _COM_CoCreateInstance          word _X_XCoCreateInstance
    ...

;; COM DLL Binary                      ;; COM DLL Binary Replacement
    ...                                    ...
    _COM_CoCreateInstance:  ──283──▶   _COM_CoCreateInstance:
       push  ebp                           Call   XcoCreateInstance
       mov   ebp, esp                      push   ebp
    ...                                    mov    ebp, esp
                                           ...

;; COM DLL Binary
    ...
    _COM_CoCreateInstance   ──284──▶   _COM_CoCreateInstance
       push  ebp                           trap
       mov   ebp, esp                      mov   ebp, esp
    ...

;; COM DLL Binary
    ...
    _COM_CoCreateInstance   ──285──▶   _COM_CoCreateInstance
       push  ebp                           jmp   _X_XCoCreateInstance
       mov   ebp, esp                      mov   ebp, esp
    ...
```

TOOLS AND TECHNIQUES FOR INSTRUMENTING INTERFACES OF UNITS OF A SOFTWARE PROGRAM

CROSS REFERENCE TO RELATED APPLICATIONS

This is a divisional of U.S. patent application Ser. No. 09/196,836, filed Nov. 20, 1998, now U.S. Pat. No. 7,039,919, which in turn claims the benefit of U.S. Provisional Patent Application No. 60/102,815, filed Oct. 2, 1998.

TECHNICAL FIELD

The present invention relates generally to instrumentation of an application program by wrapping interfaces of units of the application program. By wrapping interfaces, instrumentation measures communication across the interfaces, modifies execution of the application program, and detects and handles undocumented interfaces.

BACKGROUND OF THE INVENTION

Fueled by the growing importance of the Internet, interest in the area of distributed systems (two or more computers connected by a communications medium, alternatively termed a "distributed computing environment") has increased in recent years. Programmers desiring to take advantage of distributed systems modify existing application programs to perform on distributed systems, or design applications for placement on distributed systems.

A distributed application is an application containing interconnected application units ("units") that are placed on more than one computer in a distributed system. By placing units on more than one computer in a distributed system, a distributed application can exploit the capabilities of the distributed system to share information and resources, and to increase application reliability and system extensibility. Further, a distributed application can efficiently utilize the varying resources of the computers in a distributed system.

Various types of modular software, including software designed in an object-oriented framework, can conceivably be distributed throughout a distributed system. Object-oriented programming models, such as the Microsoft Component Object Model ("COM"), define a standard structure of software objects that can be interconnected and collectively assembled into an application (which, being assembled from component objects, is herein referred to as a "component application"). The objects are hosted in an execution environment created by system services, such as the object execution environments provided by COM. This system exposes services for use by component application objects in the form of application programming interfaces ("APIs"), system-provided objects and system-defined object interfaces. Distributed object systems such as Microsoft Corporation's Distributed Component Object Model (DCOM) and the Object Management Group's Common Object Request Broker Architecture (CORBA) provide system services that support execution of distributed applications.

In accordance with object-oriented programming principles, the component application is a collection of object classes which each model real world or abstract items by combining data to represent the item's properties with functions to represent the item's functionality. More specifically, an object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but instead call functions on the object's interfaces to operate on the data. Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

An application containing easily identifiable and separable units is more easily distributed throughout a distributed system. One way to identify separable units is to describe such units with structural metadata about the units. Metadata is data that describes other data. In this context, structural metadata is data describing the structure of application units. Further, application units are desirably location-transparent for in-process, cross-process, and cross-computer communications. In other words, it is desirable for communications between application units to abstract away location of application units. This flexibly enables the distribution of application units.

In many applications, one or more units of the application is subject to a location constraint. Such a unit must be located on a particular computer in a distributed computing environment in order for the application to function correctly. A single unit that must be placed on a particular computer in order to function correctly is subject to a "per-unit location constraint." For example, a unit that directly accesses a graphical user interface might be constrained to placement on a client computer in a client-server computer configuration. Conversely, a unit that directly accesses storage facilities might be constrained to the server computer. A pair of units that can be located on any computer in a distributed computing environment, but must be located together are subject to a "pair-wise location constraint." For example, if two units communicate across an undocumented interface such that communication across the interface cannot be supported by the system that remotes application units, the two units are subject to a pair-wise location constraint. An undocumented interface is one for which there is no description or inadequate description available.

The partitioning and distribution of applications are problematic and complicated by many factors.

To partition an application for distribution, a programmer typically determines a plan for distributing units of the application based on past experience, intuition, or data gathered from a prototype application. The application's design is then tailored to the selected distribution plan. Even if the programmer selects a distribution plan that is optimal for a particular computer network, the present-day distribution plan might be rendered obsolete by changes in network topology. Moreover, assumptions used in choosing the distribution plan might later prove to be incorrect, resulting in an application poorly matched to its intended environment.

Generally, to distribute an application, one can work externally or internally relative to the application. External distribution mechanisms work without any modification of the application and include network file systems and remote windowing systems on a distributed system. Although external distribution mechanisms are easy to use and flexible, they often engender burdensome transfers of data between nodes of the distributed system, and for this reason are far from optimal. Internal distribution mechanisms typically modify the application to be distributed in various ways. Internal distribution mechanisms allow optimized application-specific distribution, but frequently entail an inordinate amount of extra programmer effort to find an improved distribution and modify the application. Further, internal systems frequently provide ad hoc, one-time results that are tied to the performance of a particular network at a particular time.

Automatic Distributed Partitioning Systems

An automatic distributed partitioning system (ADPS) works internally relative to an application to partition application units, and works automatically or semi-automatically to save programmer effort in designing distributed applications.

In the 1970's, researchers postulated that the best way to create a distributed application was to use a compiler in a run time environment to partition the application, and to provide the exact same code base to each of plural distributed machines as used on a single machine to execute the distributed application. After analyzing the structure of procedures and parameters in the source code of an application, metadata describing the structure of an application was generated from the application source code. Using this metadata, these ADPSs profiled the application and generated a communication model for the application. The Interconnected Processor System (ICOPS) is an example of an ADPS designed in the 1970's. The Configurable Applications for Graphics Employing Satellites (CAGES) also supported creation of distributed applications, but did not support automatic application profiling at all. A more recent example of an ADPS is the Intelligent Dynamic Application Partitioning (IDAP) System. ICOPS, CAGES, and IDAP suffer from numerous drawbacks relating to the universality, efficiency, and automation of these systems.

To profile an application, an ADPS may measure communication between units of the application. To do so, the ADPS needs to identify units of the application. In an object-oriented framework, an object may not readily present an identity for the ADPS to use during profiling. For example, a COM object presents identifiable interfaces and belongs to an identifiable class, but presents no identity that is readily useable by an ADPS, or by any type of instrumentation system for that matter. Neither ICOPS, CAGES, nor IDAP provides a mechanism for determining which units of an application program expose which interfaces in an environment in which units lack readily available identities.

An APDS must recognize and treat location constraints on units. In ICOPS, CAGES, and IDAP, a programmer manually indicates location constraints for units of an application. There are numerous techniques for manually recognizing location constraints. A programmer can insert into application source code a call to an ADPS to indicate a location constraint for a unit. Application units can be "marked" in code so that static analysis of the code detects units marked as location constrained. A programmer can provide to an ADPS a list of units that are location constrained. If a programmer is responsible for directly distributing units, the programmer can recognize and handle location constraints when manually implementing the distribution. While manual recognition of location constraints is acceptable in applications with few units, the task of manual detection dramatically increases in difficulty and complexity as the number of units increases. Moreover, when application units change, location constraints may change too, requiring repetition of the tedious manual process. If a programmer lacks intimate knowledge of the units of an application, the task is further complicated. Nevertheless, neither ICOPS, CAGES, nor IDAP provides a mechanism for automatically detecting per-unit or pair-wise location constraints.

An instrumentation system provides a layer of functionality on top of an application for measuring and recording information about the application, or for somehow modifying the execution of the application, at some cost to the performance of the application. An ADPS is a type of instrumentation system that uses knowledge of the structure of an application to perform operations on the application. Neither ICOPS, CAGES, nor IDAP provides an instrumentation system for applications designed according to an object-oriented framework.

Instrumentation Systems for Object-Oriented Applications

An instrumentation system for an object-oriented application typically instruments the application at the interface table or function level. To do so, the instrumentation system typically replaces references to interface tables or functions with references to instrumented versions of the interface tables or functions. While these techniques work under some conditions, if an object internally accesses a reference that has been replaced by the instrumentation system, the instrumentation system may break the application.

A universal delegator is a data structure that acts as an intermediary between an interface of an delegatee object and a delegating object that seeks to use the interface as one of its own interfaces. When the interface is called from a calling object, the universal delegator passes control to the interface without reference to details of the interface and without notifying the calling object that the interface is not implemented by the delegating object. The universal delegator complicates the task of differentiating between interfaces for many instrumentation systems. Moreover, typical instrumentation systems for object-oriented applications break when an application uses universal delegators.

An object typically interacts with another object through the member functions of that other object. The choice of an appropriate technique for intercepting member functions is informed by the information needs of the instrumentation. To measure inter-unit communication, useful types of information include the identity of the called unit, quantitative information about the called interface, the identity of the called member function, and quantitative information about all function parameters. Instrumentation systems for object-oriented applications typically lack the ability to measure one or more of these types of information.

To fully measure communication between units, instrumentation measures both outgoing parameters to a called unit and return parameters from the called unit. Instrumentation systems for object-oriented applications typically fail to measure both calls to member functions and returns from member functions.

Occasionally, an instrumentation system lacks adequate information about a unit identity, interface, function identity, or function parameter. Instrumentation systems for object-oriented applications typically fail to perform robustly in the absence of this information.

An object that is dynamically created and destroyed during the execution of an application may rely on a reference count to determine when the object should be removed from memory. The reference count shows how many other objects reference the object at a given time, and can be manipulated by other objects as those other objects interact with the object. Although a reference count for an object is theoretically a robust way to determine when the object should remove itself from memory, object-oriented programmers typically design objects whose reference counts fail to operate correctly when the objects are instrumented. A poorly designed instrumentation system incorrectly causes an object to remove itself from memory.

SUMMARY OF THE INVENTION

The present invention pertains to instrumentation of interfaces of object-oriented applications. According to a first aspect of the invention, instrumentation identifies the unit that exposing an interface of an object-oriented application. According to a second aspect of the invention, the instrumentation wraps an interface in order to intercept communications crossing the interface. According to a third aspect of the invention, the instrumentation handles undocumented interfaces of object-oriented applications, and identifies which units of such applications must reside at the same location in a distributed computing environment.

Turning to the first aspect of the invention, the instrumentation assesses the relationship of an interface to a unit. A data structure such as a hash table associates interfaces with identified units. Alternatively, another type of data structure or combination of data structures associates interfaces with identified units. The instrumentation provides a mechanism for determining which units of an application program expose which interfaces, even in an environment in which units lack readily available identities. In an illustrated embodiment, an automatic distributed partitioning system (ADPS) identifies which unit exposes an interface. In alternative embodiments, other instrumentation systems use these techniques for identifying the object that exposes an interface.

In the illustrated embodiment, the ADPS detects a reference to an interface, for example, by noting and parsing the parameters of a call to a function of another interface. Alternatively, the ADPS detects a reference to an interface by noting and parsing return parameters from a call to a function, for example a unit creation function. Other techniques for detecting a reference to an interface can be used.

The ADPS determines if the unit that exposes the interface is known by checking a data structure such as a hash table that associates interfaces with units. If the identity of the unit that exposes the interface is not known, the ADPS discovers the unit that exposes the interface. According to the illustrated embodiment, if units lack readily available identities, the ADPS assigns identities as needed. Alternatively, a system service assigns identities to units as needed. The ADPS updates the data structure to accommodate newly discovered unit identities, for example by adding an entry to the hash table. Alternatively, the ADPS updates the data structure by verifying the unit identity of every interface that is detected, even if the identity of the unit exposing the interface was previously known.

In the illustrated embodiment, the ADPS tracks the identities of units exposing interfaces in a local stack. Alternatively, a local variable tracks unit identities. The ADPS notes the identity of the currently executing unit. By induction, if an interface is not wrapped, it belongs to the current component. When the ADPS detects a reference to a new interface, the ADPS can determine the identity of the unit from which the reference originated using the local variable. For example, when a client unit calls a member-function of an interface, the called unit can be identified as the current unit by pushing the unit identity on a local stack. When the called unit finishes executing, the unit identity pops from the local stack, and the client unit is on top of the local stack again.

The ADPS uses the information about which units expose which interfaces to perform an operation. For example, in the illustrated embodiment, by examining the pushed and popped unit identities of a local stack, the ADPS can track communication between units in order to profile units of the application program. Moreover, by examining the pushed unit identities on the local stack, the ADPS can dynamically classify a new unit before the unit is activated. Alternatively, an instrumentation system performs other operations using the interface-unit relationship information.

Turning to the second aspect of the invention, instrumentation wraps an interface in order to intercept communications across the interface. By replacing a reference to the interface as a whole rather than replacing an internal reference to an interface table or function, the instrumentation does not break an object that internally accesses an interface table reference or function reference. By providing an interface wrapper per interface, the instrumentation facilitates differentiation between interfaces of objects even when objects use universal delegation. Moreover, the instrumentation system does not cause objects to remove themselves from memory incorrectly.

Normally, a client unit receives a reference to an interface of a server unit with which the client unit will communicate. As used here, the terms client unit and server unit refer to a request/supply relationship between two units. A client unit requests an interface from a server unit. The server unit supplies the interface to the client unit. In the illustrated embodiment, the ADPS wraps an interface with an interface wrapper whenever a reference to an unwrapped interface is returned or passed to a client unit. A reference to an unwrapped interface is returned when a unit is created, or when a client requests an interface from an existing unit, for example. The interface wrapper holds a reference to instrumentation. Moreover, the interface wrapper holds a reference to the interface. Instead of receiving the reference to the interface of another unit, the client unit receives a reference to the interface wrapper. When the client unit attempts to call a member function of the other unit, the client unit invokes the instrumentation using the reference to the interface wrapper. The instrumentation executes, then calls the member function using the reference to the interface held in the interface wrapper. When the member function finishes execution, control returns to the instrumentation. After the instrumentation executes, control returns to the client unit.

For example, in the illustrated embodiment, the reference to instrumentation held in the interface wrapper and passed to the client unit is a pointer to a table of pointers to instrumentation functions. A client unit calls a function of an interface as an offset from the reference passed to the client unit. Because the client unit holds a reference to the interface wrapper, and not a reference to the interface, the client unit invokes an instrumentation function at the offset from the reference to the interface wrapper. The instrumentation then calls the original function of the interface using the same offset and the reference to the interface held by the interface wrapper.

The interface wrapper can store arbitrary data for access by the instrumentation. Alternatively, the interface wrapper can hold a reference to interface information that is stored outside of the interface wrapper.

The interface wrapper can store information describing the interface that is wrapped. With information about function calls and the data types of parameters passed across the interface, when a client unit makes a function call, the instrumentation parses and measures the size of parameters.

With access to information about the size of a function call, the instrumentation also parses and measures return parameters from a function call. Before invoking a function of an interface, the instrumentation sets control to return to the instrumentation when the function finishes. For example, in the illustrated embodiment, the instrumentation copies the function invocation frame on the call stack. The call stack further holds a return address to the instrumentation. In this way, when the function finishes execution, control returns to the instrumentation. At this point, with access to suitable function and parameter information, the instrumentation parses and measures the size of parameters returned to the client unit from the function call. The instrumentation then returns control to the client unit.

The interface wrapper can hold information identifying the unit that exposes an interface. In the illustrated embodiment, with unit identity information in interface wrappers and a data structure such as a hash table, instrumentation implements the interface-unit identity relationship aspect of the invention. The unit identity information allows association of measurements of parameter size with the client unit and the server unit during profiling. When a client unit calls a unit activation function, unit identities help dynamically classify the unit to be created.

Turning to the third aspect of the invention, instrumentation robustly handles interfaces of object-oriented applications that are not documented. The instrumentation identifies an interface that is not documented. The instrumentation invokes a special procedure for handling communication across the undocumented interface. Moreover, by noting the units that communicate across the interface, the instrumentation automatically identifies which units of an application must reside at the same location in a distributed computing environment. With this information, the ADPS notes a pairwise location constraint on the placement of those units.

In the illustrated embodiment, when the ADPS receives a call from a client unit to a member function of a unit across an interface, the ADPS determines if the interface is documented. The ADPS checks a description of the interface in an interface wrapper for the interface to determine if the ADPS has access to sufficient information about the interface to parse and measure the parameters of the interface. If the ADPS lacks sufficient information, the ADPS transfers control to the member-function without executing instrumentation. For example, when a client unit calls a member function by pushing function call parameters and a return address for the client unit on a call stack, the ADPS transfers control to the member function without changing function call parameters. When the member function finishes execution, control returns to the client unit.

Even for an undocumented interface, the ADPS executes instrumentation when the member function finishes execution. For example, when a client unit calls a member function, it pushes a return address to the client unit on a call stack. The ADPS replaces this return address with a return address to the instrumentation before transferring execution to the member function. When the member function finishes execution and pops the return address off the stack, control returns to the instrumentation.

For an undocumented interface, the ADPS determines the size of the function call to the member function. After doing so, the ADPS handles the interface as documented for the purpose of handling the interface. For example, when a client unit calls a member function by pushing function call parameters on a call stack, the ADPS notes the state of a pointer to the top of the stack. The ADPS then transfers control to the member function. When the member function finishes executing and pops the function call parameters off the call stack, the ADPS compares the state of the pointer to the top of the stack with the earlier noted state to calculate the size of the function call parameters. The calculated size is stored in the description of the interface in the interface wrapper.

Additional features and advantages of the present invention will be made apparent from the following detailed description of an illustrated embodiment, which proceeds with reference to the accompanying drawings.

BRIEF DESCRIPTION OF THE DRAWINGS

FIG. 9 is a listing showing a code fragment in which a component like that illustrated in FIG. 3 is created, and types of dynamic classifiers for the component.

FIG. 10 is a listing containing code fragments illustrating various techniques for intercepting communications according to the illustrated embodiment of the present invention.

DETAILED DESCRIPTION OF AN ILLUSTRATED EMBODIMENT

The present invention is directed toward automatic partitioning of units of an application and distribution of those units. In the illustrated embodiment of the present invention, an application is partitioned into one or more application units for distribution in a distributed computing environment. The COIGN system is one possible refinement of the illustrated ADPS that automatically partitions and distributes applications designed according to the Component Object Model ("COM") of Microsoft Corporation of Redmond, Wash. Briefly described, the COIGN system includes techniques for identifying COM components, measuring communication between COM components, classifying COM components, measuring network behavior, detecting component location constraints, generating optimal distribution schemes, and distributing COM components during run-time.

Figure 1:
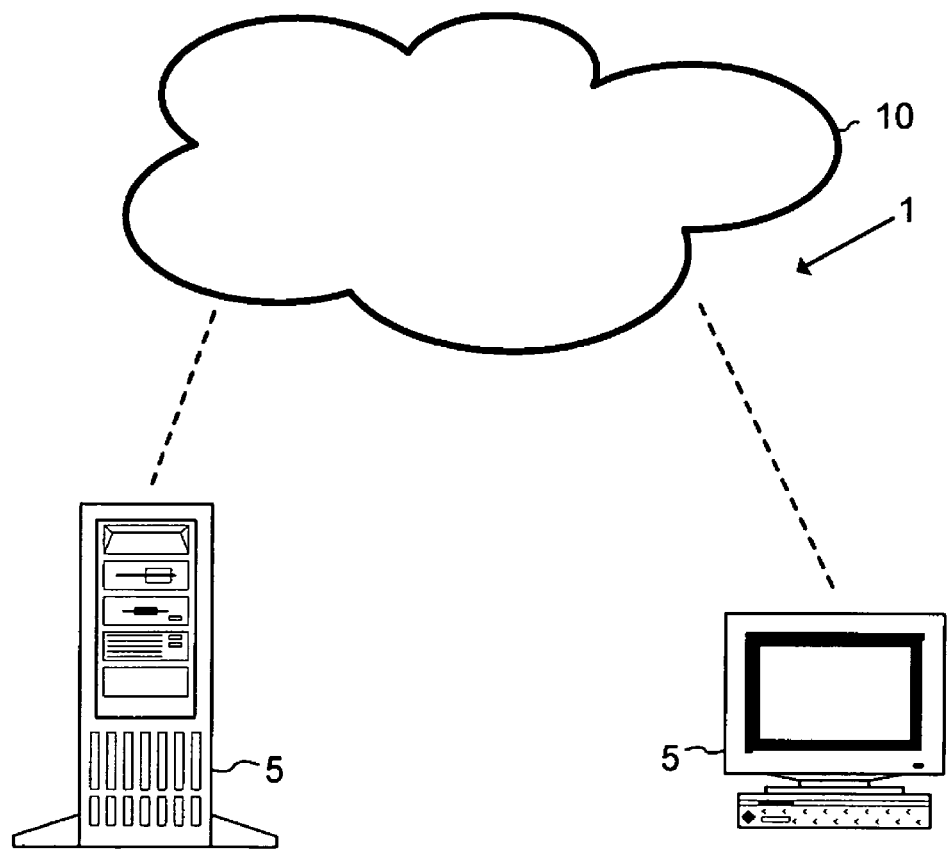
FIG. 1 is a diagram of a distributed computing environment in which the present invention can be implemented.
Figure 2:
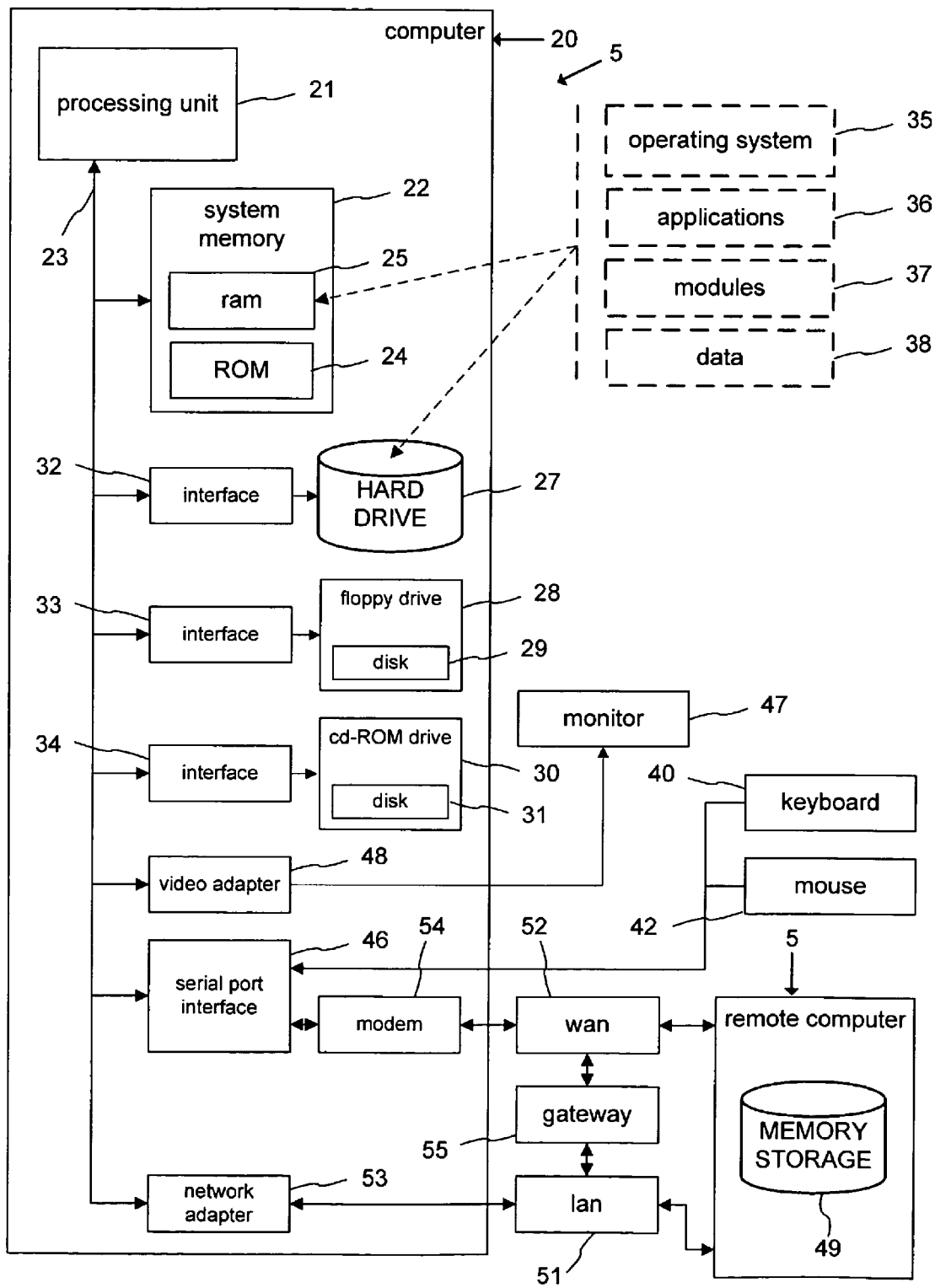
FIG. 2 is a block diagram of a computer system that can be used to implement the present invention.

FIGS. 1 and 2 and the following discussion are intended to provide a brief, general description of a suitable computing environment in which the illustrated ADPS can be implemented. While the present invention is described in the general context of computer-executable instructions that run on computers, those skilled in the art will recognize that the present invention can be implemented as a combination of program modules, or in combination with other program modules. Generally, program modules include routines, programs, components, data structures, etc. that perform particular tasks or implement particular abstract data types. The present invention can be implemented as a distributed application, one including program modules located on different computers in a distributed computing environment.

Exemplary Distributed Computing Environment

FIG. 1 illustrates a distributed computing environment 1 in which units of an application are partitioned and distributed by the illustrated ADPS in accordance with the present invention. The distributed computing environment 1 includes two computer systems 5 connected by a connection medium 10. The computer systems 5 can be any of several types of computer system configurations, including personal computers, hand-held devices, multiprocessor systems, microprocessor-based or programmable consumer electronics, minicomputers, mainframe computers, and the like. In terms of logical relation with other computer systems 5, a computer system 5 can be a client, a server, a router, a peer device, or other common network node. Moreover, although FIG. 1 illustrates two computer systems 5, the present invention is equally applicable to an arbitrary, larger number of computer systems connected by the connection medium 10. Further, the distributed computing environment 1 can contain an arbitrary number of additional computer systems 5 which do not directly involve the illustrated ADPS, connected by an arbitrary number of connection mediums 10. The connection medium 10 can comprise any local area network (LAN), wide area network (WAN), or other computer network, including but not limited to Ethernets, enterprise-wide computer networks, intranets and the Internet.

The illustrated ADPS automatically partitions an application and distributes program units by locating them in more than one computer system 5 in the distributed computing environment 1. Portions of the illustrated ADPS can be implemented in a single computer system 5, with the application later distributed to other computer systems 5 in the distributed computing environment 1. Portions of the illustrated ADPS can also be practiced in a distributed computing environment 1 where tasks are performed by a single computer system 5 acting as a remote processing device that is accessed through a communications network, with the distributed application later distributed to other computer systems 5 in the distributed computing environment 1. In a networked environment, program modules of the illustrated ADPS can be located on more than one computer system 5.

Exemplary Computer System

FIG. 2 illustrates an example of a computer system 5 that can serve as an operating environment for the illustrated ADPS. With reference to FIG. 2, an exemplary computer system for implementing the invention includes a computer 20 (such as a personal computer, laptop, palmtop, set-top, server, mainframe, and other varieties of computer), including a processing unit 21, a system memory 22, and a system bus 23 that couples various system components including the system memory to the processing unit 21. The processing unit can be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus can be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment.

A number of program modules can be stored in the drives and RAM 25, including an operating system 35, one or more application programs 36, other program modules 37, and program data 38.

A user can enter commands and information into the computer 20 through a keyboard 40 and pointing device, such as a mouse 42. Other input devices (not shown) can include a microphone, joystick, game pad, satellite dish, scanner, or the like. These and other input devices are often connected to the processing unit 21 through a serial port interface 46 that is coupled to the system bus, but can be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 can operate in a networked environment using logical connections to one or more other computer systems 5. The other computer systems 5 can be servers, routers, peer devices or other common network nodes, and typically include many or all of the elements described relative to the computer 20, although only a memory storage device 49 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications (e.g., via the LAN 51 and a gateway or proxy server 55) over the wide area network 52, such as the Internet. The modem 54, which can be internal or external, is connected to the system bus 23 via the serial port interface 46. In a networked environment, program modules depicted relative to the computer 20, or portions thereof, can be stored in the remote memory storage device. It will be appreciated that the network connections shown are exemplary and other means of establishing a communications link between the computer systems 5 (including an Ethernet card, ISDN terminal adapter, ADSL modem, 10 BaseT adapter, 100 BaseT adapter, ATM adapter, or the like) can be used.

In accordance with the practices of persons skilled in the art of computer programming, the illustrated ADPS is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Component Object Overview

Figure 3:
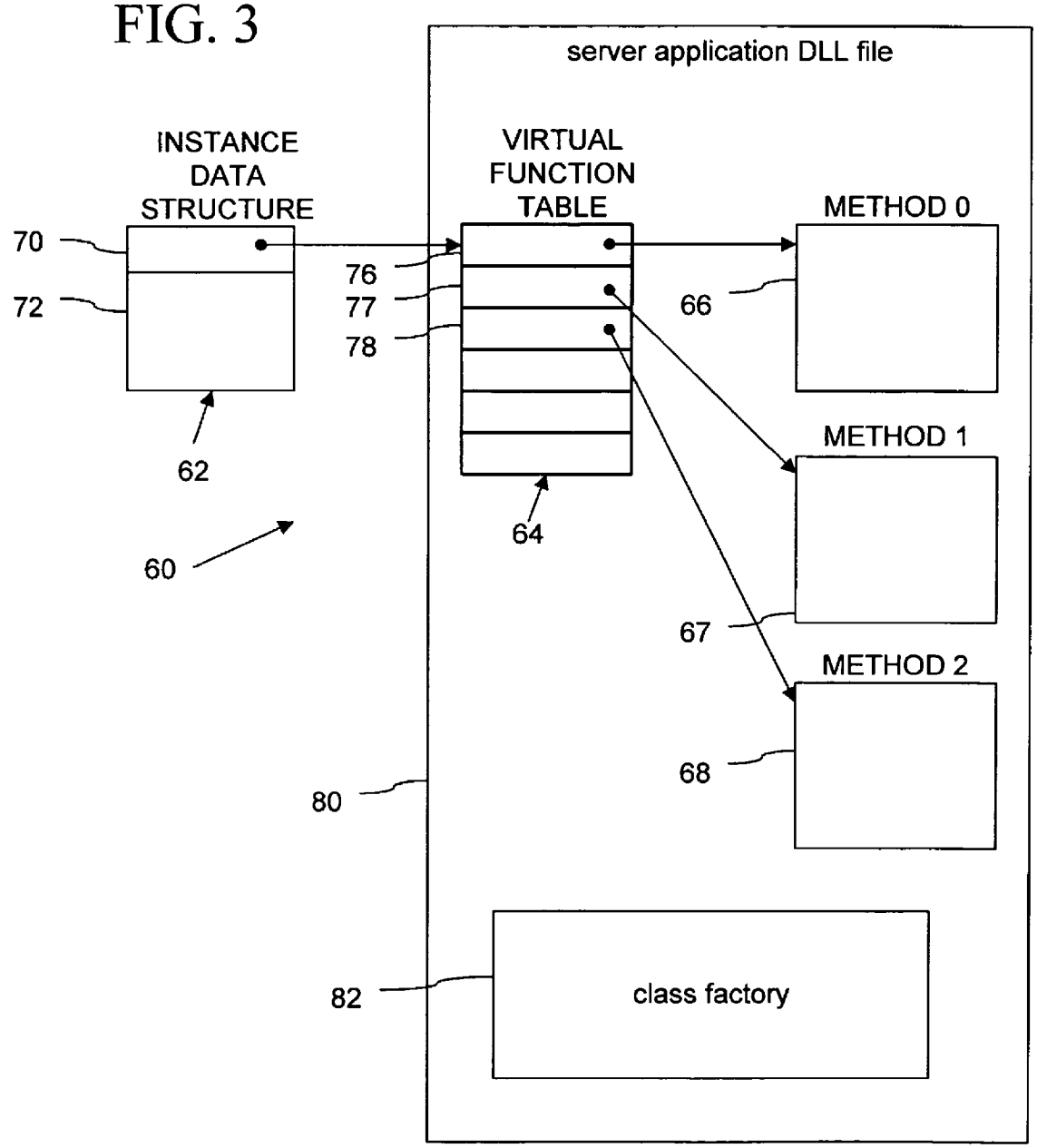
FIG. 3 is a block diagram of a Microsoft Component Object Model software component that can be used to implement the present invention.

With reference now to FIG. 3, in the COIGN system, the computer 20 (FIG. 2) executes "COIGN," a component-based application that is developed as a package of component objects. COIGN's component objects conform to the Microsoft Component Object Model ("COM") specification (i.e., each is implemented as a "COM Object" 60, alternatively termed a "COM component"). COIGN executes using the COM family of services (COM, Distributed COM ("DCOM"), COM+) of the Microsoft Windows NT Server operating system, but alternatively can be implemented according to other object standards (including the CORBA (Common Object Request Broker Architecture) specification of the Object Management Group) and executed under object services of another operating system.

COIGN automatically partitions and distributes other component-based applications. Like COIGN, the component-based applications automatically partitioned and distributed by COIGN are implemented in conformity with COM and executed using COM services, but alternatively can be implemented according to another object standard and executed using object services of another operating system.

COM: Binary Compatibility

The COM specification defines binary standards for objects and their interfaces which facilitate the integration of software components into applications. COM specifies a platform-standard binary mapping for interfaces, but does not specify implementations for interfaces. In other words, an interface is defined, but the implementation of the interface is left up to the developer. The binary format for a COM interface is similar to the common format of a C++ virtual function table. Referring to FIG. 3, in accordance with COM, the COM object 60 is represented in the computer system 20 (FIG. 2) by an instance data structure 62, a virtual function table 64, and member methods (also called member functions) 66-68. The instance data structure 62 contains a pointer 70 to the virtual function table 64 and data 72 (also referred to as data members, or properties of the object). A pointer is a data value that holds the address of an item in memory. The virtual function table 64 contains entries 76-78 for the member methods 66-68. Each of the entries 76-78 contains a reference to the code 66-68 that implements the corresponding member methods. A reference to an interface is stored as a pointer to the pointer 70.

While extremely simple, the binary mapping provides complete binary compatibility between COM components written in any language with any development tool. Any language that can call a function through a pointer can use COM components. Any language that can export a function pointer can create COM components. Language-neutral binary compatibility is an important feature of COM.

COM: Strongly Typed Interfaces and Interface Descriptor Language

The pointer 70, the virtual function table 64, and the member methods 66-68 implement an interface of the COM object 60. By convention, the interfaces of a COM object are illustrated graphically as a plug-in jack as shown in objects 110 and 130 in FIG. 4. Also, interfaces conventionally are given names beginning with a capital "I." In accordance with COM, the COM object 60 can include multiple interfaces, which are implemented with one or more virtual function tables. The member function of an interface is denoted as "IInterfaceName::MethodName."

All first-class communication in COM takes place through well-defined, binary-standard interfaces, which are strongly typed references to a collection of semantically related functions.

Programmatically, interfaces are described either with an Interface Definition Language (IDL) or with a package of compiled metadata structures called a type library. Whether expressed in IDL or a type library, the interface definition enumerates in detail the number and type of all arguments passed through interface functions. Each interface function can have any number of parameters. To clarify semantic features of the interface, IDL attributes can be attached to each interface, member function, or parameter. In IDL syntax, attributes are enclosed in square brackets ([ ]). Attributes specify features such as the data-flow direction of function arguments, the size of dynamic arrays, and the scope of pointers. Syntactically, IDL is very similar to C++. Moreover, the interface definition has a purpose similar to that of a function prototype in C++; it provides a description for invocation, but not an implementation. An IDL compiler maps the interface definitions into a standard format for languages such as C++, Java, or Visual Basic. For example, the Microsoft IDL compiler, MIDL, can map interfaces into C++ or export compiled IDL metadata to a type library. (For a detailed discussion of COM and OLE, see Kraig Brockschmidt, Inside OLE, Second Edition, Microsoft Press, Redmond, Wash. (1995)).

COM: Globally Unique Identifiers

In COM, classes of COM objects are uniquely associated with class identifiers ("CLSIDs"), and registered by their CLSID in the registry. The registry entry for a COM object class associates the CLSID of the class with information identifying an executable file that provides the class (e.g., a DLL file having a class factory to produce an instance of the class). Class identifiers are 128-bit globally unique identifiers ("GUIDs") that the programmer creates with a COM service named "CoCreateGUID" (or any of several other APIs and utilities that are used to create universally unique identifiers) and assigns to the respective classes. The interfaces of a component are also immutably associated with interface identifiers ("IIDs"), which are also 128-bit GUIDs. If an interface changes, it receives a new IID.

COM: Implementation

The virtual function table 64 and member methods 66-68 of the COM object 60 are provided by an object server program 80 (hereafter "object server DLL") which is stored in the computer 20 (FIG. 2) as a dynamic link library file (denoted with a ".dll" file name extension). In accordance with COM, the object server DLL 80 includes code for the virtual function table 64 and member methods 66-68 of the classes that it supports, and also includes a class factory 82 that generates the instance data structure 62 for an object of the class.

Other objects and programs (referred to as a "client" of the COM object 60) access the functionality of the COM object by invoking the member methods through the COM object's interfaces. First, however, the COM object must be instantiated (i.e., by causing the class factory to create the instance data structure 62 of the object); and the client must obtain an interface pointer to the COM object.

Before the COM object 60 can be instantiated, the object is first installed on the computer 20. Typically, installation involves installing a group of related objects called a package. The COM object 60 is installed by storing the object server DLL file(s) 80 that provides the object in data storage accessible by the computer 20 (typically the hard drive 27, shown in FIG. 2), and registering COM attributes (e.g., class identifier, path and name of the object server DLL file 80, etc.) of the COM object in the system registry. The system registry is a per-machine component configuration database.

COM: Component Instantiation

A client requests instantiation of the COM object locally or on a remote computer using system-provided services and a set of standard, system-defined component interfaces based on class and interface identifiers assigned to the COM object's class and interfaces. More specifically, the services are available to client programs as application programming interface (API) functions provided in the COM library, which is a component of the Microsoft Windows NT operating system in a file named "OLE32.DLL." The DCOM library, also a component of the Microsoft Windows NT operating system in "OLE32.DLL," provides services to instantiate COM objects remotely and to transparently support communication among COM objects on different computers.

In particular, the COM library provides "activation mechanism" API functions, such as "CoCreateInstance( )" that the client program can call to request local or remote creation of a component using its assigned CLSID and an IID of a desired interface. In response to a request, the "CoCreateInstance( )" API looks up the registry entry of the requested CLSID in the registry to identify the executable file for the class. The "CoCreateInstance( )" API function then loads the class' executable file either in the client program's process, or into a server process which can be either local or remote (i.e., on the same computer or on a remote computer in a distributed computer network) depending on the attributes registered for the COM object 60 in the system registry. The "CoCreateInstance( )" API uses the class factory in the executable file to create an instance of the COM object 60. Finally, the "CoCreateInstance( )" API function returns a pointer of the requested interface to the client program.

Figure 4:
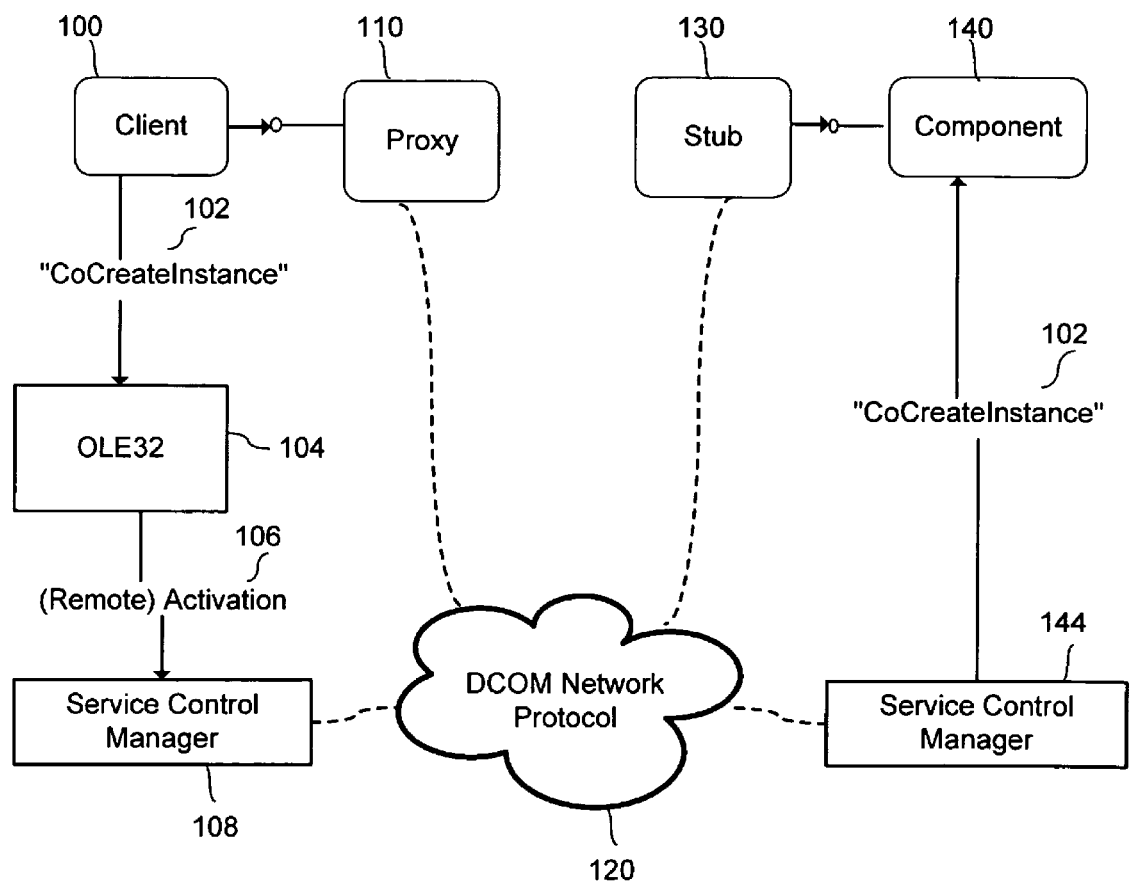
FIG. 4 is a block diagram of a client and the component of FIG. 3 in a distributed computing environment.

Referring to FIG. 4, a system including a local client 100 and a remote component 140 is described. A local client 100 instantiates and accesses the services of a remote component 140 using services provided by DCOM. DCOM provides the low-level services supporting instantiation of component 140 in another process or on another machine. After instantiation, DCOM supports cross-process or cross-machine communication.

More specifically, after the "CoCreateInstance" API 102 of the OLE32 DLL 104 is called by a client 100, the "CoCreateInstance" API 102 determines from the system registry, from an explicit parameter, or from a moniker, the class of the component 140 and in which machine or process the component 140 should be instantiated. In FIG. 4, the component 140 is to be activated 106 on a remote machine. A local Service Control Manager 108 connects to a remote Service Control Manager 144, which requests creation of the component 140 through the "CoCreateInstance" API 102. An executable file 80 for the class is then loaded into a remote server process, and the class factory 82 in the executable file 80 is used to create an instance of the COM object 140. Finally, the "CoCreateInstance( )" API 102 function returns to the client 100 an interface pointer to an interface proxy 110 for the requested component 140. Whether a component is instantiated locally or remotely, the pointer returned to the client program refers to a location in local address space. So to a client, all component instantiations appear to be in-process.

COM: In-Process, Cross-Process, and Cross-Machine Communication

Binary compatibility gives COM components true location transparency. A client can communicate with a COM component in the same process, in a different process, or on an entirely different machine. Stated more succinctly, COM supports in-process, cross-process, or cross-machine communication. The location of the COM component is completely transparent to the client because in each case the client still invokes the component by calling indirectly through an interface's virtual function table. Location transparency is supported by two facilities: MIDL generation of interface proxies and stubs, and the system registry.

Referring again to FIG. 4, cross-machine communication occurs transparently through an interface proxy 110 and stub 130, which are generated by software such as the MIDL compiler. The proxy 110 and stub 130 include information necessary to parse and type function arguments passed between the client 100 and the component 140. For example, this information can be generated from an Interface Description Language (IDL) description of the interface of the component 140 that is accessed by the client 100. The proxy 110 and stub 130 can provide security for communication between the client 100 and the component 140. A client 100 communicates with the proxy 110 as if the proxy 110 were the instantiated component 140. The component 140 communicates with the stub 130' as if the stub 130 were the requesting client 100. The proxy 110 marshals function arguments passed from the client into one or more packets that can be transported between address spaces or between machines. Data for the function arguments is stored in a data representation understood by both the proxy 110 and the stub 130. In DCOM, the proxy 110 and stub 130 copy pointer-rich data structures using deep-copy semantics. The proxy 110 and stub 130 typically include a protocol stack and protocol information for remote communication, for example, the DCOM network protocol, which is a superset of the Open Group's Distributed Computing Environment Remote Procedure Call (DCE RPC) protocol. The one or more serialized packets are sent over the network 120 to the destination machine. The stub unmarshals the one or more packets into function arguments, and passes the arguments to the component 140. In theory, proxies and stubs come in pairs—the first for marshaling and the second for unmarshaling. In practice, COM combines code for the proxy and stub for a specific interface into a single reusable binary.

The client 100 invokes the component 140 through an indirect call on an interface virtual function table 64. In this case, however, following the interface pointer provided to the client 100, the virtual function table 64 belongs to the proxy 110. The proxy 110 marshals function argument into one or more serialized packets and sends the packets to the destination machine using DCOM Network Protocol. The stub 130 unmarshals the arguments and calls the component 140 through the interface virtual function table 64 in the target address space. As a call is returned, the process is reversed. In this way, in-process communication between client 100 and component 140 is emulated in a distributed computing environment, invisibly to both the client 100 and the component 140.

Invocation of cross-process components is very similar to invocation of cross-machine components. Moreover, cross-process communication uses the same interface proxies and stubs as cross-machine communication. The important difference is that once the function arguments have been marshaled into a buffer, DCOM transfers execution to the address space of the component. As with cross-machine invocation and communication, cross-process invocation and communication are completely transparent to both client and component.

COM insures location transparency because all communication takes place through calls on interface virtual function tables. The client does not know whether the code pointed to by the virtual function table belongs to the component or to an interface proxy that will forward the message to the remote component.

COM: Standard Interfaces

Once the client of the COM object 60 has obtained the first interface pointer of the COM object, the client can obtain pointers of other desired interfaces of the component using the interface identifier associated with the desired interface.

The "IUnknown" interface includes a member function named "QueryInterface( )" The "QueryInterface( )" function can be called with an interface identifier as an argument, and returns a pointer to the interface associated with that interface identifier. The "IUnknown" interface of each COM object also includes member functions, "AddRef( )" and "Release( )" Whenever a client of a component creates a new reference (e.g., an interface pointer) to the component, it calls "AddRef( )" When it is finished using the reference, it calls "Release( )" Through the "AddRef( )" and "Release( )" functions, a component knows exactly how many clients have references to it. When its reference count goes to zero, the component is responsible for freeing itself from memory. By convention, the "IUnknown" interface's member functions are included as part of each interface on a COM object. Thus, any interface pointer that the client obtains to an interface of a COM object can be used to call the "QueryInterface( )" function.

Com: Interface Design Considerations

By design, the COM binary standard restricts the implementation of an interface and components to the degree necessary to insure interoperability. To summarize, COM places four specific restrictions on interface design to insure component interoperability. First, a client accesses a component through its interface pointers. Second, the first item pointed to by an interface pointer must be a pointer to a virtual function table. Third, the first three entries of the virtual function table must point to the "QueryInterface( )", "AddRef( )" and "Release( )" functions for the interface. Finally, if a client intends to use an interface, it must insure that the interface's reference count has been incremented. As long as a component programmer obeys the four rules of the COM binary standard, he or she is completely free to make any other implementation choices.

During implementation, the component programmer chooses a memory layout for component and per-instance interface data. Memory layout is influenced by the number of supported interfaces, the existence of unique instances of the same interface for different clients, the expected lifetimes of interface instances, the amount of per-instance and per-component data, and internal, component-specific design factors.

Figure 5:
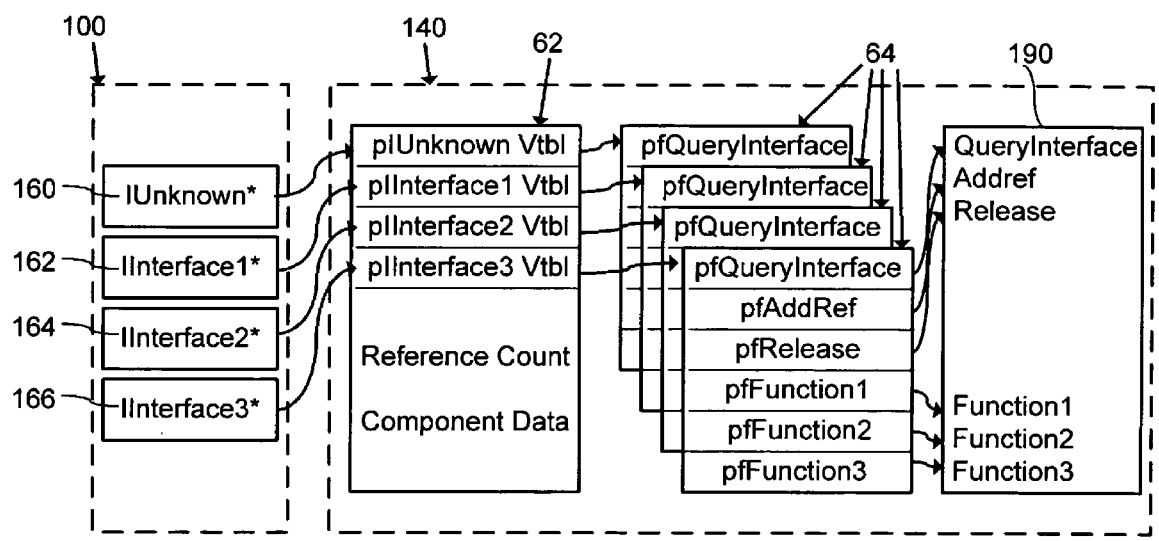
FIG. 5 is a block diagram of the component of FIG. 3 with multiple interfaces specified according to Microsoft's Component Object Model.

Most components support at most roughly a dozen interfaces with each interface having only a single instance. Referring to FIG. 5, the relationship between a client 100 and a component 140 exposing multiple interfaces to the client is explored in some detail. The client includes an interface pointer 160 to the (Unknown interface, and other interface pointers 162-166 for other interfaces exposed by the client. The interface pointers 160-166 point to an instance data structure 62 for the component 140. COM defines several standard interfaces generally supported by COM objects including the "IUnknown" interface. A pointer 170 to the virtual table 180 is listed first in the instance data structure 62 of the component 140. The instance data structure 62 contains one VTBL pointer 170-173 per interface, a per-component reference count 176, and internal component data 178. Each VTBL pointer 170-173 points to a virtual table 180-183, which in turn contain pointers to member functions 190-195 of the interfaces. Every interface includes the "QueryInterface( )" 190, "AddRef( )" 191, and "Release( )" 192 functions. In addition, interfaces can include other member functions. For example, Interface3 includes the additional functions 193-195. Within the component's member functions, a constant value is added to the "this" pointer to find the start of the memory block and to access component data 178. All of the component interfaces use a common pair of "AddRef( )" and "Release( )" functions to increment and decrement the component reference count 176.

Sometimes, a component supports multiple copies of a single interface. Multiple-instance interfaces are often used for iteration. A new instance of the interface is allocated for each client. Multiple-instance interfaces are typically implemented using a tear-off interface. A tear-off interface is allocated as a separate memory block. The tear-off interface contains the interface's VTBL pointer, a per-interface reference count, a pointer to the component's primary memory block, and any instance-specific data. In addition to multiple-instance interfaces, tear-off interfaces are often used to implement rarely accessed interfaces when component memory size is desirably minimized (i.e., when the cost of the extra four bytes for a VTBL pointer per component instance is too expensive).

Components commonly use a technique called delegation to export interfaces from another component to a client. Delegation is often used when one component aggregates services from several other components into a single entity. The aggregating component exports its own interfaces, which delegate their implementation to the aggregated components. In the simple case, the delegating interface simply calls the aggregated interface. The simple case is interface specific, code intensive, and requires an extra procedure call during invocation. The simple solution is code intensive because delegating code is written for each interface type. The extra procedure call becomes particularly important if the member function has a large number of arguments or multiple delegators are nested through layers of aggregation.

A generalization of delegation is the use of a universal delegator. The universal delegator is essentially a type-independent, re-usable delegator. The data structure for a universal delegator consists of a VTBL pointer, a reference count, a pointer to the aggregated interface, and a pointer to the aggregating component. Upon invocation, a member function in the universal delegator replaces the "this" pointer on the argument stack with the pointer to the delegated interface and jumps directly to the entry point of the appropriate member function in the aggregated interface. The universal delegator is "universal" because its member functions need know nothing about the type of interface to which they are delegating; they reuse the invoking call frame. Implemented in a manner similar to tear-off interfaces, universal delegators are instantiated on demand, one per delegated interface with a common VTBL shared among all instances.

Alternative Object Standards

Although COIGN is described with reference to applications designed according to COM, aspects of COIGN are equally applicable to applications designed according to other object standards. For example, the following aspects, later described in detail, are equally applicable to COM and non-COM applications: automatic distributed partitioning of an application binary; recording summarized pair-wise component communication; deriving a network-independent representation of application communication; re-instrumenting an application for distribution using pre-processed metadata; reversible static linking of a library to an application; in-line redirection of object creation requests in an ADPS; dynamic classification; quickly estimating network latency and bandwidth; and automatically detecting location constraints.

Alternative Distributed Communications Services

The COIGN system is described with reference to communication support provided by the COM family of services. Other distributed communication services provide cross-process and cross-machine transparency, but not in-process location transparency. This prevents a server process from running in the same address space as a client process, and thus prevents a distributed application from using inexpensive in-process communication between components also capable of distributed communication. In contrast, the COM family of services provides true location transparency, so non-distributed components pay no performance penalty for exposing potentially distributable interfaces.

Even so, a true location-transparent component system similar to COM could be built with some effort upon other distribution services, as in fact COM builds on the Distributed Computing Environment Remote Procedure Call ("DCE RPC") standard. The COIGN system could then be ported to the new system.

Overview of the Illustrated ADPS

It is both possible and beneficial to partition and distribute applications automatically. Quantitatively, the benefit of automatic distributed partitioning is determined by the performance of the chosen distribution. It is possible to determine a distribution for a given application that minimizes communication costs for the application in a given distributed computing environment. Ultimately, however, the performance of a selected application distribution also depends on the granularity and quality of the application's units (e.g., COM objects in the COIGN system ADPS), and, where applicable, on the appropriateness of the profiling scenarios (described below) used to measure internal application communication. While the present invention cannot improve a completed application's design, it can achieve the best possible distribution of that design subject to the profiling scenarios.

Automatic distributed partitioning reduces the programmer's burden. Rather than code for a specific distribution, the programmer is encouraged to create easily distributed application units. Emphasis is placed on code reusability, application unit autonomy, and choice of appropriate algorithm and data abstractions—all elements of good software engineering. In essence, automatic distributed partitioning makes the most of good software engineering by raising the level of abstraction for the distributed application programmer. In contrast, manual distributed partitioning forces the programmer to be keenly aware of how an application will be distributed.

Distributed partitioning is complicated by interactions between code modules, between data structures, and between both code and data. For instance, one data structure can contain a pointer to another data structure. If either data structure is naively relocated to another machine without modification, an attempt to de-reference the pointer will fail, most likely producing a virtual memory fault. Automatic distributed partitioning requires that either the programmer or the computer system explicitly manage code and data interactions crossing machine boundaries. For example, in the COIGN system, the COM family of services manages code and data interactions across machine and process boundaries.

In general, an ADPS takes an application as its input. For output, the ADPS modifies the application to produce a distributed version of the application that minimizes network communication costs.

Figure 6:
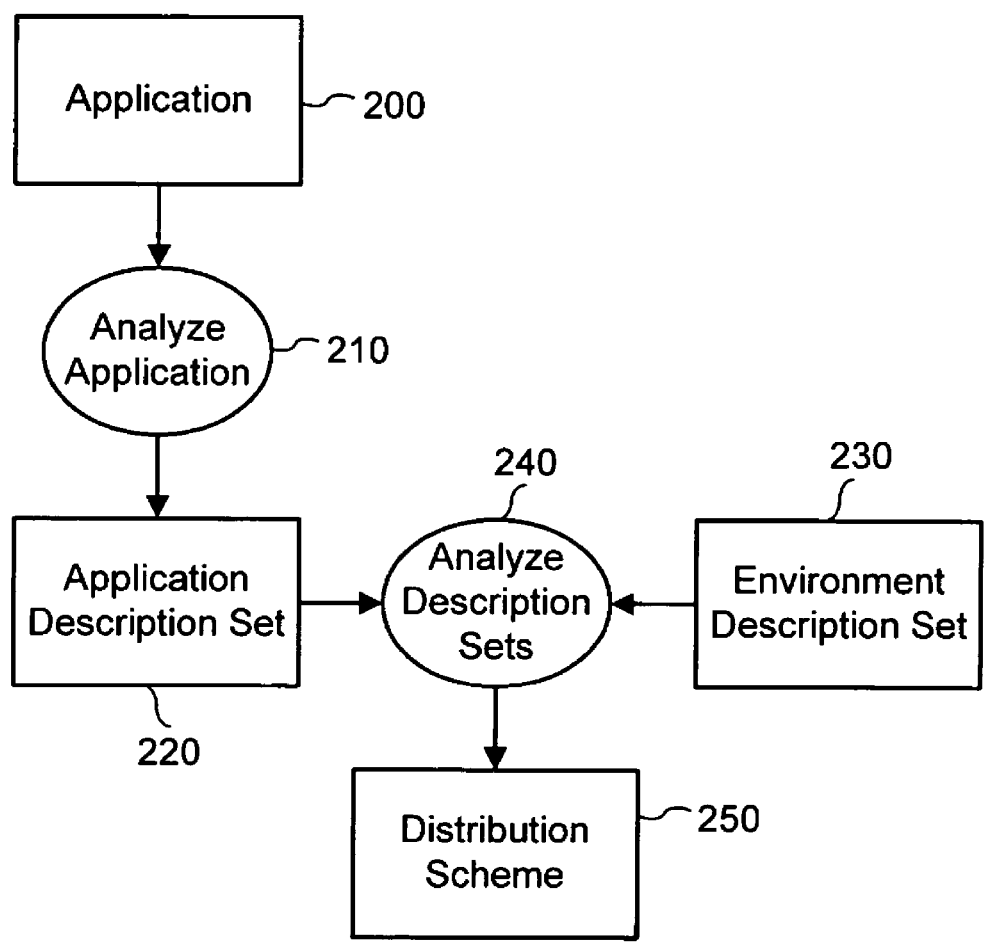
FIG. 6 is a flow chart showing the automatic partitioning of an application into application units according to the illustrated embodiment of the present invention.

Referring to FIG. 6, an application 200 is automatically partitioned for distribution according to the illustrated embodiment of the present invention. In the illustrated ADPS, the application 200 is of design known in the art. In the COIGN system, for example, the application 200 is an application binary, including executable files, dynamic link libraries, and other object code representations of software. In the COIGN system, the application binary is desirably designed according to an object model with suitable granularity, location transparency, and interface description, for example, Microsoft's COM, but alternatively can be designed according to other standards.

An application description set 220 describing the behavior of the application is prepared at step 210 for the application 200. The application description set 220 can be supplied by an external source that analyzes the application 200 in advance, or can be generated by the illustrated ADPS itself. The application description set 220 can include static and/or dynamic metadata describing the application. For example, in the COIGN system, the application description set 220 can include static metadata derived from metadata provided by a Microsoft IDL compiler (MIDL). Alternatively, the application description set 220 can include static metadata generated by the illustrated ADPS through static analysis techniques. Dynamic analysis techniques can be used by the illustrated ADPS to include dynamic metadata (such as dynamic descriptions of units, descriptions of actual inter-unit communication between the units of the application 200, and descriptions of how much time was spent in each unit in computation) in the application description set 220.

An environment description set 230 describes the distributed computing environment in which the application 200 is to be distributed. The environment description set 230 can be a description of an idealized computer network with identical computers and no communication costs. Alternatively, the environment description set 230 includes a high level description of a particular physical network on which the application 200 is to be distributed. The environment description set 230 can include a high level behavioral classification scheme used to determine which units should run on particular machines in a distributed computing environment. The environment description set 230 can also include descriptions of network characteristics such as latency and bandwidth, or descriptions of location constraints for particular units. In an alternative embodiment, the application description set 220 implicitly contains description of the behavior of a distributed computing environment along with description of the behavior of an application, for example real-time measurements of communications between distributed units of an application.

The environment description set 230 and application description set 220 are analyzed at step 240 to determine where units of the application 200 should be located in the distributed computing environment, for example according to the following pseudocode:

If (unit behavior=x) locate unit on machine Y

Else locate unit on machine Z.

In the COIGN system, a more complicated algorithm, for example, a commodity flow algorithm, is applied to a representation of units and communication between the units.

A distribution scheme 50 is the result of applying the environment description set 230 to the application description set 220. The distribution scheme 250 includes a mapping of application units to locations in a distributed computing environment. The units can be classified using static metadata of the units. Alternatively, where run-time profiling was used to dynamically describe the units, the units can be classified according to dynamic behavior. At run-time, units of the application 200 are mapped using the distribution scheme 250 for location on an appropriate computer in the distributed computing environment.

The various aspects of the present invention can be organized according to the three sub-areas they involve: discovering how the application can be partitioned, deciding how the application should be distributed, and achieving a chosen distribution.

Discovery: Discovering how the Application can be Partitioned.

An application description set 220 describes the behavior of the application. In the illustrated ADPS, these descriptors can be supplied by an external source and include static and/or dynamic metadata about the application. In the COIGN system, COIGN generates the application description set using an instrumentation package attached to the application, identifying individual units of the application, and identifying and quantifying relationships between the units. The mechanism by which the instrumentation package is attached to the application is described in detail below.

The illustrated ADPS requires knowledge of the structure and behavior of the target application. Data is gathered or supplied on how the application can be divided into units and how those units interact. ADPS functionality and effectiveness are limited by the granularity of distribution units, availability of structural metadata to identify units, choice of application analysis technique, representation of communication information, and mechanisms for determining location constraints on application units.

Granularity of Distributable Units

The granularity at which an application is divisible severely impacts the potential for improving performance of its distribution. Distribution granularity dictates the smallest independently distributable unit of the application. The number of potential distributions is inversely related to the distribution granularity. If the number of distributions is insufficient, none may offer good performance. However, if the granularity is too small, the tasks of choosing and realizing a distribution may become prohibitively expensive.

Perhaps even more importantly, the choice of partitioning unit shapes the relationships between partitioned granules. For instance, many distributed share memory (DSM) systems partition programs into VM pages. A single VM page often contains objects whose only commonality is their locality in creation time. The relationship between adjacent VM pages may be even more tenuous. Ideally, data within a distribution granule will exhibit good temporal and contextual locality.

The illustrated ADPS cannot choose granularity directly. The choice of distribution granularity is determined by the choice of operating environment. For instance, the distribution granularity in COIGN is a direct result of implementing the system on COM. An ideal environment for automatic distributed partitioning should provide a granularity of distribution with sufficient options to make automated partitioning worthwhile. The ideal granularity should match available metadata and provide a good "fit" to the application's structure.

Structural Metadata to Identify Units and Manage Communication

Distributed partitioning divides an application into units. Measurement of communication between units and division of units require access to appropriate metadata describing program structure. Program metadata can be derived from any of several sources including a compiler intermediate representation (IR), application debugging information, an interface definition language (IDL), and memory access data from the virtual memory (VM) system. Structural metadata provides the illustrated ADPS with sufficient information to separate application units and to manage code and data interactions among remote units of the application.

For example, in the COIGN system, IDL metadata and type libraries are provided by the Microsoft IDL compiler. IDL metadata is used to identify the number and type of arguments passed to and from interface functions. IDL metadata facilitates the identification and separation of components. Further, during distributed execution, IDL metadata is used to create proxies and stubs for cross-process and cross-machine communication.

Alternatively, other types of structural or program metadata can be used to identify application units.

Dynamic Application Analysis

The illustrated ADPS generates the application description set 220. To do so, the illustrated ADPS can analyze (step 210) the structure of the application 200 and the communication between identified units of the application 200.

The choice of application analysis technique determines the type of application behavior visible to an ADPS. To work satisfactorily on applications in which application units are dynamically created and destroyed, a fully functional ADPS requires whole program analysis with complete information about the application's units, their dynamic instantiation relationships, and their communication patterns.

Dynamic analysis provides insight into an application's run-time behavior. The word "dynamic," as it is used here, refers to the use of run-time analysis as opposed to static analysis to gather data about the application. Major drawbacks of dynamic analysis are the difficulty of instrumenting an existing application and the potential perturbation of application execution by the instrumentation. Techniques such as sampling or profiling reduce the cost of instrumentation. In sampling, from a limited set of application executions, a generalized model of application behavior is extrapolated. Sampling is only statistically accurate. In profiling, an application is executed in a series of expected situations. Profiling requires that profile scenarios accurately represent the day-to-day usage of the application. A scenario is a set of conditions and inputs under which an application is run. In the COIGN system, scenario-based profiling can be used to estimate an application's run-time behavior.

Figure 7:
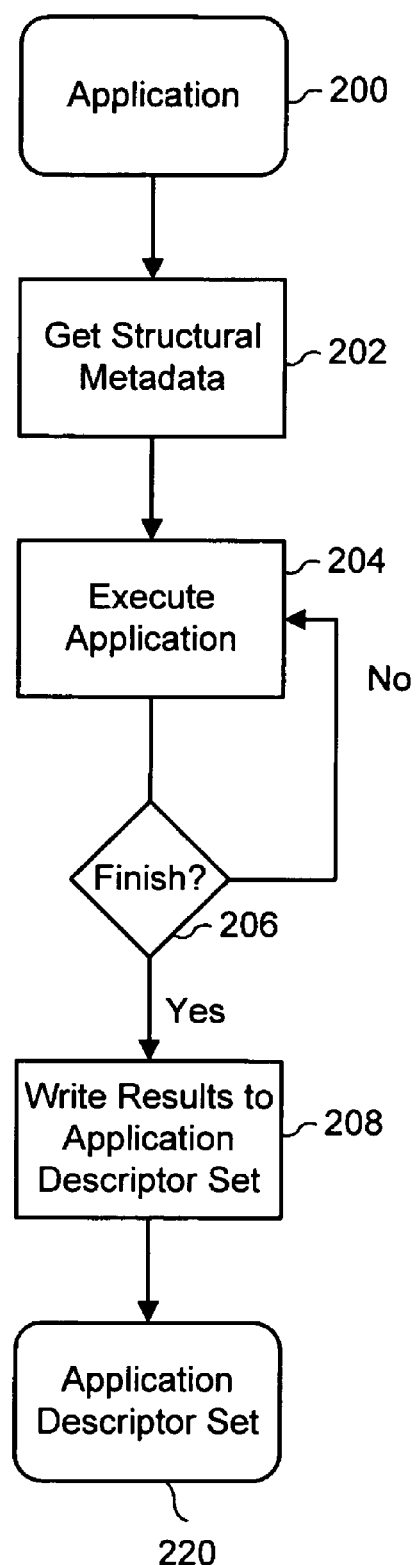
FIG. 7 is a flow chart showing the scenario-based profiling of an application to generate a description of the run-time behavior of the application according to the illustrated embodiment of the present invention.

Referring to FIG. 7, scenario-based profiling of an application 200 to generate an application description set 220 is described. At step 202, structural metadata describing the application 200 is obtained. This structural metadata can be provided by an external source, or generated by the illustrated ADPS, as described in the preceding section. During later dynamic analysis, structural metadata can be used to determine how much data is between units of an application. For example, in the COIGN system, IDL metadata can be used to exactly identify function parameters, then measure the size of those parameters. With accurate interception and access to structural information, communication measurement is a straightforward process.

At step 204, the application 200 is executed in a scenario meant to model the expected use of the application 200. During execution, the application behaves normally while the numbers, sizes, and endpoints of all inter-unit messages are measured. At step 206, the user decides if profiling is finished. The application can be run through an arbitrary number of profiling scenarios. After profiling of the application is completed, the results from the scenario-based profiling are written (step 208) to the application description set 220. The application description set 220 can include structural description of the application as well as description of communication between units of the application.

Through scenario-based profiling, an ADPS can create a profile for each application unit instantiated during profiling runs of the application. The profile identifies and quantifies communication between the application unit and other units. The collection of profiles for all units in the application, together with the records of communications between units, can be included within the application description set 220 and used to decide where units should be placed in the network.

Network-Independent Representation

An ADPS partitions an application to minimize its distributed communication costs. A correct distributed partitioning decision requires both realistic information about the network on which the application will be distributed, and accurate information about communications between units of an application.

In the illustrated ADPS, an appropriate inter-unit cost representation for an application is network-independent, but also incorporates realistic analysis of distribution tradeoffs prior to distribution. For example, referring to FIG. 6, an application description set 220 comprising a network-independent abstraction of inter-unit communication costs of an application can be combined with an environment description set 230 comprising basic statistics about a physical network to calculate concrete, network-dependent communication costs. While the environment description set 230 can be generated at the same time as the application description set, it can also be generated before or after. The environment description set 230 can be generated immediately before the application is to be distributed in a distributed computing environment, in this way describing the most recent state of the environment.

Network-independent representations of communication costs provide an application with a great degree of flexibility to adapt to future changes in network topology including changes in the relative costs of bandwidth, latency, and machine resources. In this way, a single application can be optimally bound to different networks, and a single application can be optimally bound and re-bound to a changing network. The ADPS preserves application flexibility by insulating the programmer from the final distributed partitioning decision. The programmer is responsible for exposing as many partitioning choices as possible by dividing the application into distributable units, but the ADPS is responsible for correctly distributing the application units for a given execution of the application based on the network environment. In essence, the ADPS allows late binding of an application to a particular network and its topology.

Late binding of an application across a specific network is facilitated by two mechanisms, described in detail below. First, compression of information about application communication reduces ADPS run-time overhead during profiling, and thereby enables more accurate and efficient summarization of network-independent communication costs. Second, quick estimation of the latency and bandwidth of a network allows the ADPS to delay partitioning until current estimates are needed. Combined, these techniques make it possible to delay binding of a distribution to a network until the latest possible moment, thus facilitating automatic adaptation to new networks.

In an alternative embodiment, estimates of latency and bandwidth are periodically taken during execution of a distributed application. If the new estimates deviate beyond a preset threshold from previous estimates, the application is re-partitioned and distributed using the new estimates. In another embodiment, inter-unit communication is measured during distributed execution. If the communication characteristics of the distributed application deviate beyond a preset threshold from the communication characteristics used to determine the current distribution scheme, the distributed application is re-partitioned and re-distributed.

Alternatively, at a time when the characteristics of the distributed application deviate beyond a preset threshold, a notification can be given to the user. In response to the notification, the user can re-bind the application or ignore the notification.

Communication Representation

In the illustrated ADPS, during scenario-based profiling, communication between the application units is measured. Later, the illustrated ADPS partitions the application by comparing the inter-unit communication costs and network costs of alternative distributions. Because precise distributed partitioning analysis requires an accurate picture of the cost to distribute each unit of an application, the illustrated ADPS requires an accurate picture of the communication between units of an application.

During scenario-based profiling, the illustrated ADPS can measure the number and size of communications sent between any two application units. Pertinent features describing an inter-unit message are the source unit, the destination unit, and the amount of data sent from source to destination. For practical reasons, it is important to minimize perturbation of the application by the illustrated ADPS during scenario-based profiling. While the illustrated ADPS might ideally log all data about every message, doing so would most likely have a severe impact on application execution during profiling. Moreover, data about application communication needs to be preserved until the application is actually partitioned. If the size of the communication data is extremely large, preserving it can be prohibitively expensive. An inclusive log of all messages can be extremely large. It is conceivable that an application scenario could involve millions of messages.

Rather than store this information in a lengthy trace file, in the COIGN system, the number and size of inter-unit messages is selectively summarized. Various techniques can be used to compress application communication information.

The communication log can be compressed somewhat by storing messages with the same source and destination in a single collection. The source and destination need only be written once with subsequent records containing the size of the message only. However, the communication log might still be prohibitively large.

The communication log can be compressed even farther by noting that the important feature of the message in the partitioning decision is not the size of the message, but rather the communication cost of the message. The communication log for a source-to-destination pair could be compressed into a single number by summing the cost of all messages. However, to preserve generality it is desirable to separate the network dependent portion of the communication costs from the network independent portion.

The cost of sending a message consists of a latency factor, which is fixed for all messages, and a bandwidth factor, which is a function of the message size. The correlation of message size to bandwidth is nearly linear. Assuming that the bandwidth-cost function is in fact linear, instead of storing each message size, an alternative ADPS according to the invention stores the number of messages and the sum of the message sizes, as shown in the following equation 1:

$$\sum_{m=1}^{n} \text{Cost}(m) = n \cdot \text{Latency} + \frac{s}{\text{Bandwidth}}, \text{ where } s = \sum_{m=1}^{n} \text{Size}(m). \quad (1)$$

Unfortunately, the bandwidth-cost function is not strictly linear for most networks. Instead, the bandwidth-cost function is made up of discontinuous, near-linear ranges. The discontinuities occur when a message of size n+1 requires one more network packet than a message of size n. Not coincidentally, the discontinuities are a function of the network maximum transmission unit (MTU) and the network protocols. Compressing message sizes under the assumption that the bandwidth-cost function is strictly linear introduces an average error of 15% for a 10 BaseT Ethernet. Similar errors are introduced for other networks.

An alternative approach to compress the log of messages is to compress each near-linear sub-range separately. For example, all messages from 0 to 1350 bytes could be linearly compressed into the number of messages and sum of message lengths. All messages from 1351 to 2744 bytes could also be linearly compressed. All messages above some large threshold value could be linearly compressed as MTU-induced discontinuities become less pronounced. MTU-induced non-linearities in the bandwidth-cost function are much more important for small messages than for large messages. As messages become larger, the amortized cost of each additional network packet becomes minimal. Unfortunately, compression based on the near-linear sub-ranges of a specific network is network dependent, which is something to be avoided.

Rather than linearly compress sub-ranges based on the MTU of a specific network, the ADPS of the present invention can linearly compress a number of exponentially larger sub-ranges starting with a very small range. For each sub-range, the decompression algorithm (i.e., the algorithm to calculate the cost of the compressed messages) is given by the following equation 2:

$$\sum_{m=1}^{n} \text{Cost}(m) = n \cdot \left( \text{Latency}_{small} + \left( \frac{s}{n} - \text{Size}_{small} \right) \right. \quad (2)$$

$$\left. \frac{\text{Latency}_{large} - \text{Latency}_{small}}{\text{Size}_{large} - \text{Size}_{small}} \right), \text{where } s = \sum_{m=1}^{n} \text{Size}(m),$$

Latency$_{small}$=Latency of the smallest message size in the sub-range,
Latency$_{large}$=Latency of the largest message size in the sub-range,
Size$_{small}$=Size of the smallest message in the sub-range, and
Size$_{large}$=Size of the largest message in the sub-range.

In the COIGN system, the following sub-ranges for network-independent linear compression are used: 0-31 bytes, 32-63 bytes, 64-127 bytes, 128-255 bytes, 256-511 bytes, 512-1023 bytes, 1024-2047 bytes, 2048-4095 bytes, and 4096 bytes and larger. Compressing with these sub-ranges and then calculating values results in an average error of just over 1% for a 10 BaseT Ethernet.

Determining Location Constraints

An ADPS can consider location constraints when partitioning application units for distribution. All prior work in ADPS systems has relied on programmer intervention to determine location constraints for application units. In the illustrated ADPS, location constraints can be desirably automatically detected and recorded, freeing the programmer from the task of identifying, tracking, and indicating location constraints.

Per-unit location constraints indicate which application units run better on a particular machine of the network or will not run at all if removed from a particular machine. The most common form of per-unit constraint is application unit communication through second-class communication mechanisms. A typical example of a second-class communication mechanism is a Unix file descriptor. The file descriptor represents a communication channel between the operating system and application. The file descriptor is a second-class mechanism because it cannot be directly distributed with first-class mechanisms, such as shared memory in a DSM system or interfaces in COM. The file descriptor implicitly constrains program location. In the COIGN system, system service libraries called by application units are analyzed to automatically detect second-class communication mechanisms and other per-unit location constraints. Alternatively, per-unit location constraints can be automatically detected by analyzing other application unit interactions with system resources.

Pair-wise location constraints indicate which combinations of application units must be located together. Pair-wise distribution constraints cannot be violated without breaking the application. For example, in COM, pair-wise constraints occur when two components must be co-located because they communicate either through an undocumented interface or through an interface that is not remotable because it uses opaque data types. In the COIGN system, pair-wise constraints are automatically detected during analysis of interaction between application units. If communication (e.g., function call parameters, data types) between two application units is not understood well enough to quantify the communication during profiling, a pair-wise location constraint is placed upon the two application units. Alternatively, if communication between the two application units is not understood well enough to remote the interaction (e.g., by marshalling and unmarshalling parameters over processes or machines) during distributed execution, a pair-wise location constraint is placed upon the two application units.

Decision: Deciding how the Application Should be Distributed.

While an application can be partitioned in many ways, not all of them will yield equivalent performance. Application distributions that reduce the number and size of distributed messages are most likely to exhibit good performance. Because distributed communication is much more expensive than local communication, a distribution should minimize the amount of inter-machine communication. In addition to communication overhead, the illustrated ADPS can take into consideration relative computation costs and resource availability. A simple classification algorithm can be used to generate a distribution scheme 250 from an application description set 220 and an environment description set 230. Abstractly, the distribution decision consists of a communication model and cost metric that encode the decision problem for a particular application on a particular network, and an algorithm for optimizing the model.

An ADPS can model the tradeoffs between candidate distributions. Distribution costs can be modeled either directly or indirectly. Direct models specifically include communications costs between application units and resource availability. Indirect models consider contributing factors such as data or temporal locality. The choice of model determines which kinds of input data are required and which factors the optimizing algorithm maximizes. One very useful model of the distribution problem represents the application as a connected graph. Nodes represent units of the application and edges represent interactions between units. Edges are weighted with the relative cost of the interaction if remote.

Distribution Optimization Algorithms

Figure 8:
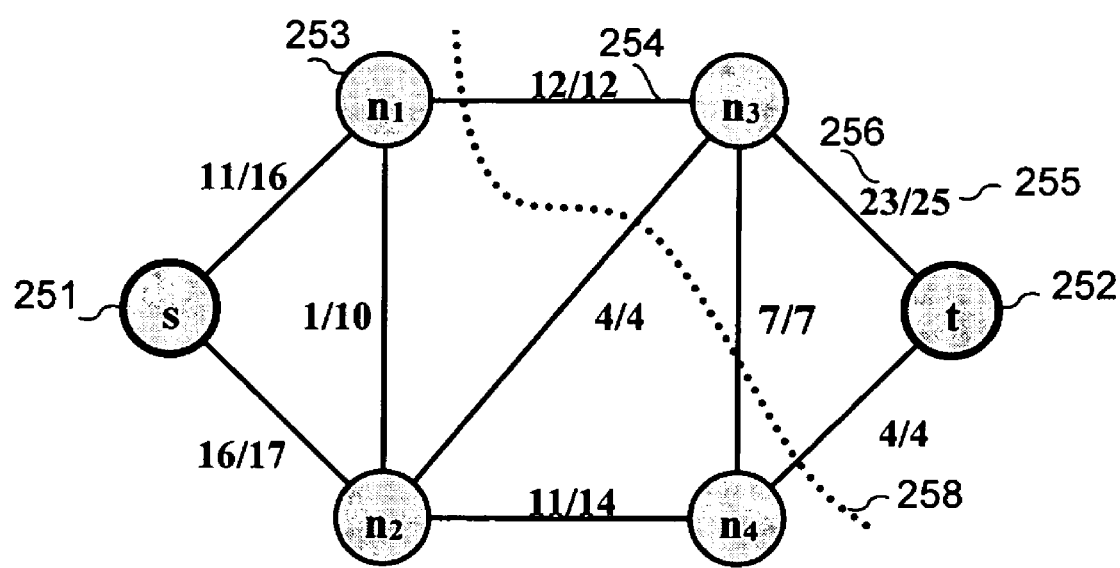
FIG. 8 is a commodity flow diagram cut by a MIN CUT MAX FLOW algorithm according to the illustrated embodiment of the present invention.

The distribution optimization algorithm accepts a model of the decision problem and maps it onto a computer network. After all data has been gathered, it is the optimization algorithm that decides where application units will be placed in the network. In the COIGN system, the problem of deciding where to place application units is mapped to the common problem of cutting a commodity flow network. As described below with reference to FIG. 8, the application units and inter-unit communication form a commodity flow network. After this mapping, known graph-cutting algorithms can be used for automatic distributed partitioning.

A commodity flow is a directed graph 250 G=(N,E) with two special nodes (s 251 and t 252) designated respectively the source and sink. A steady supply of a commodity is produced by the source s 251, flows through the graph 250, and is consumed by the sink t 252. The graph 250 contains an arbitrary number of nodes 253 through which the commodity flows. Each node 253 may be connected to another node 253 by an edge 254. A node 253 may be connected to an arbitrary number of other nodes. Each edge 254 of the graph 250 has a capacity 255 that determines how much of the commodity may flow through it at a given time The total flow through the graph is limited by the aggregate edge capacity 256. An important concept related to commodity flows is the cut 258. A cut (S, T) of a flow network G=(N,E) is a partition of the nodes N into two sets, S and T, such that the source s∈S and the sink t∈T and for all n∈N, n∈S or n∈T. The capacity of a cut 258 is the capacity of all of the edges connecting S to T; in other words, the capacity of the edges that cross the cut 258. A minimum cut is a cut of the commodity-flow graph with the smallest capacity.

In the case of a simple client-server network, the optimization algorithm can be a MIN-CUT MAX-FLOW algorithm, a type of optimization algorithm known in the art. The MIN-CUT MAX-FLOW theorem states that the capacity of the minimum cut is equal to the maximum flow through the flow graph. The capacity of the MIN-CUT is determined by the same edges that constrain the MAX-FLOW. The most efficient known algorithms to solve the MIN-CUT MAX-FLOW problem belong to the preflow-push family. The basic idea of the preflow-push algorithms is to use an iterative technique in which the commodity (limited by edge capacities) is pushed breadth-first through each edge from the source 251 to the sink 252. Excess commodity (when more commodity flows into a node than flows out) is iteratively pushed back to the sink again using a breadth-first algorithm. The simplest preflow-push algorithm runs in $O(N^2E)$ time. Another algorithm used to partition client-server application across two machines, the lift-to-front algorithm, is a known preflow-push algorithm that runs in time $O(N^3)$, which is asymptotically at least as good as $O(N^2E)$. The best known pre-flow push algorithm to date runs in time $O(NE \log(N^2/E))$. Alternatively, other known optimization algorithms can be applied to a model of the decision problem.

While the problem of partitioning a graph into two sets (one containing the source and one containing the sink) can be solved in polynomial time, partitioning a graph into three or more sets (creating a multi-way cut) according to known algorithms in the general case is NP-hard. For this reason, practical multi-way graph cutting relies on approximation algorithms known in the art.

In the COIGN system, the algorithm to map a client-server distributed partitioning problem onto the MIN-CUT problem is as follows: Create one node for each unit in the application. Create one edge between every pair of communication units. The weight on the edge should be the difference between communication cost (communication time) for the remote case (when the two application units are placed on separate machines) and the local case (when the two application units are placed on the same machine). Create two additional nodes: the source and the sink. The source represents the client. For each application unit that must reside on the client—for instance, because it directly accesses GUI functions—create an edge with infinite weight from the source to the application unit. For each application unit that must reside on the server—because it directly accesses storage—create an edge with infinite weight between the sink and the application unit. Find the minimum cut of the graph. Since the minimum cut contains edges with the smallest weights (capacities), those edges represent the line of minimum communication between the client and server.

Each edge in the commodity-flow graph effectively represents the cost in time of distributing that edge. Because the common currency of graph edges is time, other time-based factors that affect distribution choice can be mapped readily onto the same MIN-CUT problem with communication costs. A good example is the problem of deciding where to place application units when client and server have different speed processors. For this case, two additional edges are attached to each application unit. An edge from the application unit to the source s has a weight equal to the execution time of the application unit on the server. A second edge from the application unit to the sink has a weight equal to the execution time of the application unit on the client.

Each "computation" edge represents the cost in execution time if application unit is moved to the other computer. The MIN-CUT algorithm will cut through the edge that is least expensive (when considered with the other edges in the graph), thus leaving the application unit attached to the computer on which its aggregate communication and computation time is the lowest.

Each of the edges in the commodity flow graph is weighted with the same linear "currency". Because communication costs are most readily converted into time, the graph can be augmented with other time-based costs. In an ideal environment, one would also like to map discontinuous features into the graph problem. A common influencing factor in the choice of distribution is memory overhead. It is often desirable to keep memory footprint per client to a minimum on the server in order to maximize scalability of the server across multiple clients. Similarly, a client may not have enough memory to accommodate all application units that would ideally be placed upon it if considering time-based costs alone. The only known method to map memory overhead onto the graph-cutting problem uses a multi-commodity flow graph. Unfortunately, multi-commodity flow graphs are provable NP-complete in the general case.

Choosing a Distribution Online

In the illustrated ADPS, accurate values of latency and bandwidth for a particular network can be quickly estimated using a small number of samples, enabling adaptation to changes in network topology including changes in the relative costs of bandwidth, latency, and machine resources.

A correct distributed partitioning decision requires realistic information about the network on which the application will be distributed. If all distributed partitioning decisions are made offline, data for a particular network can be gathered from a large number of samples. For example, average latency and bandwidth values for a network can be derived from a large number of test packets sent on the network. In a dynamic environment where bandwidth and network availability can change from one execution to another, or within a given execution, it is desirable to make distributed partitioning decisions online at application startup. Data for online decision-making is gathered while the user waits. This creates a serious constraint on the number of samples used to determine available latency and bandwidth and model of network communication costs.

An ADPS minimizes communication costs between distributed application units by comparing alternative distributions. When comparing two application distributions, the communication costs in the first distribution are compared with the communication costs in the second distribution. The communication cost for any message is composed of two sub-costs: a fixed sub-cost due to network latency and a variable sub-cost due to network bandwidth. For some message m, the cost can be represented according to the following equation 3:

$$\text{Cost}(m) = \text{Latency} + \frac{\text{Size}(m)}{\text{Bandwidth}}. \quad (3)$$

The cost of an application distribution is the sum of the costs of all n messages sent between the partitioned application units given by the following equation 4:

$$\text{Distribution Cost} = \sum_{m=1}^{n} \text{Cost}(m) = n \cdot \text{Latency} + \frac{\sum_{m=1}^{n} \text{Size}(m)}{\text{Bandwidth}}. \quad (4)$$

Measuring the real communication costs for a given network is extremely simple in theory, but somewhat error-prone in practice. For instance, to measure the average latency of a network, one sends a number of messages from one machine to another and back. One can compute the average round-trip time from either individual round trips using the following equation 5:

$$T_{ave} = \frac{\sum_{i=1}^{n} T_i}{n}, \quad (5)$$

or from the cumulative time for all of the round trips using the following equation 6:

$$T_{ave} = \frac{T_{total}}{n}. \quad (6)$$

In practice, the round-trip time for a packet is unpredictable, making it hard to estimate average network behavior. This is particularly true for IP-based networks. Consider the round trip for a typical network message. The application initiates a message by creating a packet and invoking the operating system. The message passes through various layers in a protocol stack before the operating system eventually invokes the network interface. While traveling through the protocol stack, the message may be delayed by cache faults in the memory hierarchy. The network interface places the message onto the network medium. In many cases, such as shared medium token-ring or Ethernet, the network adapter may have to wait before actually transmitting the message. The message may travel over multiple physical networks; passing through routers to cross networks. At any router, the message may be dropped due to insufficient queue capacity on the router, forcing a re-transmission. When the message finally arrives at the receiver, it is placed in an incoming buffer. Again, the message may be dropped if the receiver has insufficient buffer capacity. In fact, the vast majority of message losses in typical networks are due to insufficient buffer capacity on the receiving machine. The network interface alerts the operating system, which picks up the message, passes it through the protocol stack, and finally delivers it to the receiving process. The receiving process takes appropriate action, then returns a reply to the sending process. The reply may wind its way back to the original process only to find that the original process was rescheduled after losing its scheduling quantum.

A message may be delayed at any point in the journey from the sender to the receiver and back. By measuring average round-trip time, an ADPS in fact measures the cumulative average effect of each source of delay. The more sources of spurious delay, the more measurements must be taken in order to calculate accurately the average round-trip time. Unfortunately, it takes time to make each network measurement. If network performance is unstable over time, then individual measurements will be unstable and the ADPS will therefore need more measurements to obtain an accurate view of current network performance. In contrast to average latency, minimum latency remains quite stable throughout all of the sources of delay typically introduced in networks. Stability in calculating the minimum network latency hints at the stochastic nature of packet-switched networks. No matter how heavy traffic is on a network, there are almost always a few packets that travel through the network at peak speeds. In fact, short-term performance of packet-switched networks is extremely unpredictable. If this were not the case, almost all packets would take a long time to travel through a heavily used network. In other words in a non-stochastic network, average latency and minimum latency would converge. Moreover, minimum latency fairly accurately tracks average latency for most networks.

In the illustrated ADPS, minimum latency and maximum bandwidth can be quickly measured with a short-term sample of measurements because even in congested networks, a few measurement packets pass through undelayed. Moreover, because minimum latency and maximum bandwidth reasonably track average values, minimum latency and maximum bandwidth values can be used in the illustrated ADPS.

Alternatively, an ADPS can utilize a combination of long-term values and short-term values. First, the ADPS can compute the average latency and bandwidth over an entire usage cycle—either a full day or a full week—and partition the application once accordingly. At the same time, the ADPS can create a library of stored average latency and bandwidth numbers—say one set of averages for each hour in the day—and depending on the time of day, partition the application according to the pre-computed network statistics: Second, after quickly estimating minimum latency and maximum bandwidth, these values can be matched to the closest stored average latency and bandwidth values, and the application then partitioned accordingly.

Distribution: Achieving a Chosen Distribution.

Ultimately, an ADPS modifies the execution of the application to achieve a desired distribution. In the COIGN system, described in detail below, COIGN modifies the application by inserting an instrumentation package specially designed for distributing the application according to the desired distribution. This instrumentation package can be included with the instrumentation package used to identify units and measure communication, or can be a separate, lighter overhead package. Once the application is instrumented, achieving a distribution consists of two important steps: identifying application units and distributing them to the correct machine.

In general, through scenario-based profiling or static analysis, the illustrated ADPS creates a profile for each application unit instantiated. The profile characterizes the application unit's communication with other units and any constraints on its location. Information from the profiling scenarios or static analysis is generalized to predict application behavior for later executions. A mapping of generalized application unit profiles to specific machines in the network is generated. Application units instantiated during application execution are then matched to similar application unit profiles, and located on the appropriate machine in the network. The actual distribution is an approximate solution to the distributed partitioning problem: the optimal solution for a particular application execution can only be determined after execution has completed. The underlying assumption of automatic distributed partitioning is that past profiles are statistically accurate in describing future application executions. If, in fact, past profiles accurately predict future application executions, then future executions can be partitioned using the distribution derived from the profiles.

Difficulties in classification by profile arise when application units are dynamic objects, such as COM components, for example. Component lifetimes are dynamic. A component may be instantiated or deleted at almost any point in program execution. Multiple instances of the same static type of component may exist concurrently. Moreover, separate instances of the same static type of component may have vastly different behavior and communication patterns due to their different usage contexts. For example, a single component in the document processing application, Octarine, is instantiated multiple times in a typical execution. Some instances hold references to operations invoked by menu commands. Some instances hold references to parts of a document including footers, headers, and body. Still other instances hold references to components in dialog boxes or spreadsheet cells. Two components with the same static type and similar communication patterns may need to be placed on separate machines if their sets of communicating partners are significantly different. In applications that are input-driven, user input typically drives the dynamic instantiation of application components. For this reason, component behavior varies tremendously between executions.

Component instances need to be classified not by their static type, but rather by their behavior and "where" they fit into the application. In essence, an instance needs to be classified by its usage context. The context in which a component is used determines its pattern of communication with other components. Usage context also determines the quantity of data communicated to other components.

Identification by Dynamic Classification

The illustrated ADPS can identify application units for distribution according to a dynamic classification scheme. The word "dynamic," as it is used here, refers to classification incorporating information on how the application unit was used during run-time.

Scenario-based profiling provides adequate information about the behavior and usage context of components to create component profiles used in dynamic component classification, assuming that the programmer or other user of the ADPS is sufficiently prudent to select profiling scenarios that accurately reflect the application's day-to-day usage. In practice, this is a reasonable assumption because the illustrated ADPS places no restriction on application execution that would make it impractical to use real-life scenarios for profiling. Dynamic component classification can be used to decide which component profile matches a component instance during distributed execution, or across multiple profiling scenarios. Moreover, component classification can be used within a single profiling scenario to classify component instances with identical or nearly identical behavior.

In a distribution scheme, a specific component profile can represent different combinations of component instances, depending on application behavior and on the chosen set of profiling scenarios. For example, a component profile can represent a single instance of a component in a single profiling scenario, or a single instance across multiple profiling scenarios. A component profile can represent a group of instances in a single profiling scenario, or groups of similar instances across multiple profiling scenarios.

A component is instantiated if a client uses it. For this reason, a component is dynamically classified at the time of instantiation using contextual information available at instantiation. The client must exist, in some form, if the component is instantiated. In the COIGN system, a component instance can be dynamically classified by examining the application state to determine context at the time of instantiation. An application's entire state (or at least an approximation thereof) is available at the time of component instantiation to aid in classification. However, to be tractable, component classification must use only a limited subset of the application state. Contextual information readily available at the time of component instantiation includes the execution call stack and arguments to the instantiation function.

According to the illustrated ADPS, various classification mechanisms can be used to dynamically classify components. Although some of these mechanisms, including procedure-call-chains, have been used in the field of dynamic memory allocation, none of these mechanisms has been used to dynamically classify components in automatic partitioning and distribution.

Referring to FIG. 9, various types of component instance classifiers are described for a component of type "type" instantiated by code fragment 260.

An incremental classifier 261 tracks the number of times the function "CoCreateInstance( )" has been called. To the extent the ordering of component instantiation varies between executions of an application, the incremental classifier has limited value.

A component static type classifier 262 describes the type of component. A static-type CCC classifier 263 (T3C) creates a classification descriptor by concatenating the static type of the component to be instantiated with the static types of the components in the CCC.

In the illustrated ADPS, a procedure-call-chain (PCC) classifier 264 can be used for dynamic classification. In the field of dynamic memory allocation, PCCs have been used to identify allocation sites for storing objects in memory. The PCC classifier 264 creates a classification descriptor by concatenating the static type of the component with the PCC of the instantiation request. A PCC consists of the return address from each of the invocation frames in the call stack. A depth-n PCC is a PCC containing the return addresses from the topmost n invocation frames. The depth of the PCC can be tuned to evaluate implementation tradeoffs. Accuracy in predicting allocation lifetimes increases as the depth of a PCC increases. While a PCC can be adequate for dynamic classification in procedure-based application, component-based applications have more call context because they are inherently object-oriented. The possible PCCs form a sparse, one-dimensional space: the range of valid return addresses. Object-oriented programming adds a second dimension: the identity of the component executing the code.

In the COIGN system, a component call chain (CCC) is used for dynamic classification. Entries in a CCC belong to a sparse, two-dimensional space: the product of the caller's instance identity and return address. A complete CCC identifies a component instantiation. Components with matching CCCs are assumed to have matching profiles. CCCs are stored in a persistent dictionary across profiling scenarios. As new instances are created, their CCCs are added to the profiling dictionary. To partition the application, each instance class, as identified by its unique CCC, is assigned to a specific network machine.

There are two major variants on the CCC. The first variant contains only the entry points into each component. The entry-point component call-chain (EP3C) classifier 265 concatenates the component's static type with an entry-point component call-chain (the EP3C). The EP3C contains one tuple for each component in the dynamic call-chain. The tuple contains the return address pointer and the component instance identifier of the calling component. The EP3C does not contain entries for component-internal functions. Like the PCC classifier, the depth of the call chain in the EP3C classifier can be tuned to evaluate implementation tradeoffs.

The internal component call chain (I3C) classifier 266 creates a classification descriptor by concatenating the static type of the component with the full CCC of the instantiation request (the I3C). The I3C contains one tuple for each entry point component in the dynamic call-chain, as well as additional tuples for any procedures internal to the calling component. Put another way, the I3C is the procedure-oriented dynamic call-chain augmented with component instance identifiers. The EP3C is the I3C with all entries but one removed for each component in the chain. Again, the depth of the CCC used for classification can be tuned to evaluate implementation tradeoffs.

Tradeoffs in call-chain depth and classifier implementations include processing overhead to create a call chain, memory overhead of the profile dictionary, accuracy of the classifier, and limitations on distribution granularity imposed by the classifier. While component granularity sets an ultimate upper bound on the divisibility of the application, the classifier can further reduce the upper bound. A component instance classifier desirably identifies as many unique component classifications as possible in profiling scenarios in order to preserve distribution granularity. The partitioning system distributes the application by component classification. All of the instances of the same classification are placed on the same machine because they are indistinguishable to the distribution runtime. Therefore, a component instance classifier is desirably reliable and stable; it correctly determines when two component instances are the "same," whether they are instantiated in the same application execution or in another application execution. Each classifier uses a specific descriptor to identify classes of similar component instances. Call-chain-based classifiers form a descriptor from the execution call stack.

Distributing Components to the Correct Machine

During distributed execution, application units are created in appropriate processes on appropriate machines in a distributed computing environment. This distribution is achieved by manipulating an application's execution.

Generally, there are three classes of solutions to accomplish this task according to the present invention: modify the application's source code, modify the application's binaries prior to execution, or manipulate the application's execution through run-time intervention. Static modification of application source code or binaries is extremely difficult because it requires problematic whole-program static analysis. Manipulating the application's execution through run-time intervention is relatively straightforward but has some limitations. In general, an application's execution can be manipulated to produce a chosen distribution efficiently by intercepting unit creation calls and executing them on the appropriate remote host.

Referring to FIG. 10, techniques for intercepting unit creation calls according to the illustrated embodiment are described.

Referring to code fragment 280, using call replacement in application source code, calls to the COM instantiation functions can be replaced with calls to the instrumentation by modifying application source code. The major drawback of this technique is that it requires access to the source code. Using call replacement in application binary code (281), calls to the COM instantiation functions can be replaced with calls to the instrumentation by modifying application binaries. While this technique does not require source code, replacement in the application binary does require the ability to identify all applicable call sites. To facilitate identification of all call sites, the application is linked with substantial symbolic information.

Another technique is DLL redirection 282. In this technique, the import entries for COM APIs in the application can be modified to point to another library. Redirection to another DLL can be achieved either by replacing the name of the COM DLL in the import table before load time or by replacing the function addresses in the indirect jump table after load. Unfortunately, redirecting to another DLL through either of the import tables fails to intercept dynamic calls using LoadLibrary and GetProcAddress.

The only way to guarantee interception of a specific DLL function is to insert the interception mechanism into the function code, a technique called DLL replacement. One method is to replace the COM DLL with a new version containing instrumentation (283). DLL replacement requires source access to the COM DLL library. It also unnecessarily penalizes all applications using the COM DLL, whether they use the additional functionality or not.

Borrowing from debugger techniques, breakpoint trapping of the COM DLL (284), instead of replacing the DLL, inserts an interception mechanism into the image of the COM DLL after it has been loaded into the application address space. At run time, the instrumentation system inserts a breakpoint trap at the start of each instantiation function. When execution reaches the function entry point, a debugging exception is thrown by the trap and caught by the instrumentation system. The major drawback to breakpoint trapping is that debugging exceptions suspend all application threads. In addition, the debug exception is caught in a second operating-system process. Interception via break-point trapping has a high performance cost.

The most favorable method for intercepting DLL functions is to inline the redirection call (286). In the COIGN system, inline indirection is used to intercept component instantiation calls. As described in detail below, component instantiation calls are intercepted by the COIGN Runtime, which is part of the COIGN system. The requested component is identified and classified according to the distribution scheme. If appropriate, the component instantiation call is re-directed to a remote computer. Otherwise, the component instantiation call is executed locally.

Usage and Architecture of the COIGN System

The COIGN system automatically partitions and distributes COM applications. Following a brief overview of the COIGN system, a detailed example is described in which COIGN is applied to an existing COM application, and the architecture of COIGN is described in detail.

Brief Overview of the COIGN System

Given an application built with COM components (in binary form), COIGN inserts an instrumentation package to enable scenario-based profiling of the application. COIGN uses scenario-based profiling on a single computer to quantify inter-component communication within the application. A network profile describing the behavior of a network is generated. Location constraints on the placement of components are automatically detected. Inter-component communication is modeled as a graph in which nodes representing components and edges represent inter-component communication and location constraints. Using graph-cutting algorithms, COIGN selects an optimal distribution scheme for the application for a distributed environment. COIGN then inserts an instrumentation package that incorporates the optimal distribution scheme into the application. At run time, COIGN manipulates program execution to produce the desired distribution.

COIGN analyzes an application, chooses a distribution, and produces the desired distribution without access to application source files. By leveraging the COM binary standard, COIGN automatically distributes an application without any knowledge of the application source code. As a corollary, COIGN is completely language neutral; it neither knows nor cares about the source language of the components in the application. Finally, by analyzing binaries only, COIGN automatically produces distributed applications without violating the primary goal of the COM component system: building applications from reusable, binary components.

Application of COIGN to an Existing COM Application

The application used in this example is a version of an existing COM application, Microsoft Corporation's Microsoft Picture It!®. Picture It!® is a consumer application for manipulating digitized photographs. Taking input from high-resolution, color-rich sources such as scanners and digital cameras, Picture It!® produces output such as greeting cards, collages, or publications. Picture It!® provides tools to select a subset of an image, apply a set of transforms to the subset, and insert the transformed subset into another image. The original Picture It!® application is entirely designed to run on a single computer. It provides no explicit support for distribution. Picture It!® is composed of approximately 112 COM component classes in 1.8 million lines of C++ source code.

Referring to Table 1, starting with the original binary files "pi.exe" for Picture It!®, the "setCOIGN" utility is used to insert COIGN's profiling instrumentation package, which includes a profiling logger, a NDR interface informer, and an EP3C classifier in this example.

Table 1 also shows file details for the application binary being instrumented. SetCOIGN makes two modifications to the pi.exe binary file. First, it inserts an entry to load the COIGN Runtime Executive (RTE) DLL (COIGNrte.dll) into the first slot in the application's DLL import table. Second, setCOIGN adds a data segment containing configuration information to the end of pi.exe. The configuration information tells the COIGN RTE how the application should be profiled and which of several algorithms should be used to classify components during execution.

TABLE 1

Instrumenting the Application with Profiling Instrumentation Using SetCOIGN

```
D:\apps\pictureit\bin> setcoign /p pi.exe
Config:
    Logger:             Coign Profile Logger
    Informer:           Coign NDR Interface Informer
    Classifier:         Coign EP3C Classifier
PE Executable:
    Initialized Data:       487424 (00077000)
    Image size:            1609728 (  189000)
    Section Alignment:        4096 (    1000)
    File Alignment:            512
    File Size:             1579520
    Optional header:           224
Directories:       _VAddr      _VSize      _VAEnd
    Exports:        15ac60        5563       1601c3
    Imports:        157148         12c        157274
    Resources:      173000       15868       188868
    Debug:          111a60          54       111ab4
    IAT:            110000        1a58       111a58
Sections: 4        _VAddr      _VSize      _VAEnd      _FAddr      _FSize   R  L  R  L
    .text             1000      10e343      10f343         400      10e400   0  0  0  0
    .rdata          110000       501c3      1601c3       10e800      50200   0  0  0  0
    .data           161000       11224      172224       15ea00       d400   0  0  0  0
    .rsrc           173000       15868      188868       16be00       15a00   0  0  0  0
    .coign          189000        6cd0      18fcd0      181800        6e00   0  0  0  0
Debug Directories:
    0.              00000000    00181800..00181910 -> 00188600..00188710
    1.              00000000    00181910..001819c0 -> 00188710..001887c0
    2.              00000000    001819c0..001819ea -> 001887c0..001887ea
Extra Data:        512 (   181a00 -    181800)
Coign Extra Data:
    {9CEEB02F-E415-11D0-98D1-006097B010E3}   :   4 bytes.
```

Because it occupies the first slot in the application's DLL import table, the COIGN RTE will always load and execute before the application or any of its other DLLs. It therefore has a chance to modify the application's address space before the application runs. The COIGN RTE takes advantage of this opportunity to insert binary instrumentation into the image of system libraries in the application's address space. The instrumentation modifies for redirection all of the component instantiation functions in the COM library. Before returning control to the application, the COIGN RTE loads any additional COIGN components as stipulated by the configuration information stored in the application.

Referring to Table 2, with the COIGN runtime configured for profiling, the application is ready to be run through a set of profiling scenarios in which the source, destination, and size of all communications are measured. Because the binary has been modified transparently to the user (and to the application itself), profiling runs behave from the user's point of view as if there were no instrumentation in place. The instrumentation gathers profiling information in the background while the user controls the application. The only visible effect of profiling is a slight degradation in application performance. In a simple profiling scenario, start Picture IV® is started, a file is loaded for preview, and the application is exited. For more advanced profiling, scenarios can be driven by an automated testing tool, for example, Visual Test.

During profiling, the COIGN instrumentation maintains running summaries of the inter-component communication within the application. COIGN quantifies every inter-component function call through a COM interface. The instrumentation measures the number of bytes that would have to be transferred from one machine to another if the two communicating components were distributed. The number of bytes is calculated by invoking portions of the DCOM code that use IDL structural metadata for the application, including the interface proxy and stub, within the application's address space. COIGN measurement follows precisely the deep-copy semantics of DCOM. Referring to Table 2, after calculating communication costs, COIGN compresses and summarizes the data online so that the overhead to store communication information does not grow linearly with execution time. If desired, the application can be run through profiling scenarios for days or even weeks to more accurately track user usage patterns.

TABLE 2

Running the Application through a Profiling Scenario

```
D:\apps\pictureit\bin> pi.exe
[Coign Runtime Environment: 00000080 636f6900 00000000]
[Coign EP3C Classifier/9999]
[Coign NDR Interface Informer]
[Coign Profiling Logger (16 cycles)]
[CoignRTE: DLL_PROCESS_ATTACH]
[CoignRTE: DLL_THREAD_ATTACH]
[CoignRTE: DLL_THREAD_ATTACH]
[CoignRTE: DLL_THREAD_ATTACH]
[CoignRTE: DLL_THREAD_ATTACH]
[CreateFileMoniker (D:\apps\pictureit\docs\MSR.mix )]
```

TABLE 2-continued

Running the Application through a Profiling Scenario

```
[StgOpenStorage (D:\apps\pictureit\docs\MSR.mix )]
[CoignRTE: DLL_THREAD_DETACH]
[CoignRTE: DLL_THREAD_DETACH]
[Elapsed time: 26400 ms]
[CoignRTE: DLL_PROCESS_DETACH]
[Inter-component communication:]
[ Messages   :   16       64      256    1024    4096   16384   _Totals  ]
[ In Counts  : 105240   1629      473    1599      66      45   109052   ]
[ Out Counts : 102980   4303      843     783     131      12   109052   ]
[ In Bytes   : 782022  57912    49616  815034  157619  237963  2100166   ]
[ Out Bytes  : 455207 130140    95473  304592  239239   70019  1294670   ]
```

At the end of the profiling, COIGN writes the summary log of inter-component communication to a file for later analysis. In addition to information about the number and sizes of messages and components in the application, the profile log also contains information used to classify components and to determine pair-wise component location constraints. Log files from multiple profiling executions can be combined and summarized during later analysis. Alternatively, at the end of each profiling execution, information from the log file can be inserted into the configuration record in the application executable (the pi.exe file in this example). The latter approach uses less storage because summary information in the configuration record accumulates communication from similar interface calls into a single entry.

Invoking "adpCOIGN" initiates post-profiling analysis, as shown in Table 3. AdpCOIGN examines the system service libraries to determine any per-component location constraints on application components. For example, for client-server distributions, adpCOIGN recognizes components that must be placed on the client in order to access the Windows GUI libraries or that must be placed on the server in order to access persistent storage directly.

TABLE 3

Initiating Post-Profiling Analysis

```
D:\apps\pictureit\bin> adpcoign pi.log
Binaries:
   pi.exe
   mso97d.dll
   mfc42d.dll
   mfco42d.dll
   oleaut32.dll
Dependencies:
         01 D:\apps\pictureit\bin\pi.exe
            D:\apps\pictureit\bin\piserv.dll
```

TABLE 3-continued

Initiating Post-Profiling Analysis

```
            piperf.dll
            oleaut32.dll
         00 D:\apps\pictureit\bin\piserv.dll
            D:\apps\pictureit\bin\mfco424.dll
            mfc42d.dll
         00 D:\apps\pictureit\bin\mfco42d.dll
            C:\winnt\system32\o1e32.dll
         00 C:\winnt\system32\o1e32.dll
   Objects:            112
   Interfaces:         792
   Calls:            38286
   Bytes:           743534
   Proc. Speed:     200MHz
```

Combining location constraints and information about inter-component communication, adpCOIGN creates an abstract graph model of the application. In one implementation, adpCOIGN combines the abstract graph model with data about the network configuration to create a concrete model of the cost of distribution on a real network. AdpCOIGN then uses a graph-cutting algorithm to choose a distribution with minimum communication costs. Alternatively, the construction of the concrete model and the graph-cutting algorithm are performed at application execution time, thus potentially producing a new distribution tailored to current network characteristics.

After analysis, the application's inter-component communication model is written into the configuration record in the application binary using the setCOIGN utility, as shown in Table 4. Any residual profiling logs are removed from the configuration record at this time. The configuration record is also modified to disable the profiling instrumentation. In its place, a lightweight version of the instrumentation is loaded to realize (enforce) the distribution chosen by the graph-cutting algorithm.

TABLE 4

Instrumenting the Application with Distribution Instrumentation Using SetCOIGN

```
D:\apps\pictureit\bin> setcoign /f:pi.set pi.exe
   Config:              pi.set
         Informer:      Coign Light Interface Informer
         Classifier:    Coign EP3C Classifier
   Initialized Data:    487424 (00077000)
   Image size:          1646592 ( 192000)
   Section Alignment:      4096 (   1000)
   File Alignment:          512
   File Size:           1612800
   Optional header:         224
   Directories:        _VAddr    _VSize    _VAEnd
         Exports:       15ac60     5563    1601c3
         Imports:       190f18      140    191058
         Resources:    173000    15868    188868
```

TABLE 4-continued

Instrumenting the Application with Distribution Instrumentation Using SetCOIGN

| | | | | | | | | | |
|---|---|---|---|---|---|---|---|---|---|
| Debug: | 111a60 | 54 | 111ab4 | | | | | | |
| IAT: | 110000 | 1a58 | 111a58 | | | | | | |
| Sections: 5 | _VAddr | _VSize | _VAEnd | _FAddr | _FSize | R | L | R | L |
| .text | 1000 | 10e343 | 10f343 | 400 | 10e400 | 0 | 0 | 0 | 0 |
| .rdata | 110000 | 501c3 | 1601c3 | 10e800 | 50200 | 0 | 0 | 0 | 0 |
| .data | 161000 | 11224 | 172224 | 15ea00 | d400 | 0 | 0 | 0 | 0 |
| .rsrc | 173000 | 15868 | 188868 | 16be00 | 15a00 | 0 | 0 | 0 | 0 |
| .coign | 189000 | 83f8 | 1913f8 | 181800 | 8400 | 0 | 0 | 0 | 0 |
| Debug Directories: | | | | | | | | | |
| 0. | 00000000 | 00189a00..00189b10 -> 00189c00..00189d10 | | | | | | | |
| 1. | 00000000 | 00189b10..00189bc0 -> 00189d10..00189dc0 | | | | | | | |
| 2. | 00000000 | 00189bc0..00189bea -> 00189dc0..00189dea | | | | | | | |
| Coign Extra Data: | | | | | | | | | |
| {9CEEB022-E415-11D0-98D1-006097B010E3} | | : 4980 bytes. | | | | | | | |
| {9CEEB030-E415-11D0-98D1-006097B010E3} | | : 904 bytes. | | | | | | | |
| {9CEEB02F-E415-11D0-98D1-006097B010E3} | | : 4 bytes. | | | | | | | |

Aside from the inter-component communication model, perhaps the most important information written into the application configuration is data for the component classifier. The component classifier matches components created during distributed executions to components created during the profiling scenarios. The abstract model of inter-component communication contains nodes for all known components and edges representing the communication between components. To determine where a component should be located in a distributed execution, the classifier tries to match it to the most similar component in the profiling scenario. The premise of scenario-based profiling is that profiled executions closely match post-analysis executions. Therefore, if the circumstances of a component's creation are similar to those of a component in a profiling execution, then the components will most likely have similar communication patterns. Based on the chosen distribution for similar profiled components, the classifier decides where new components created during the distributed execution should be instantiated.

Figure 11:
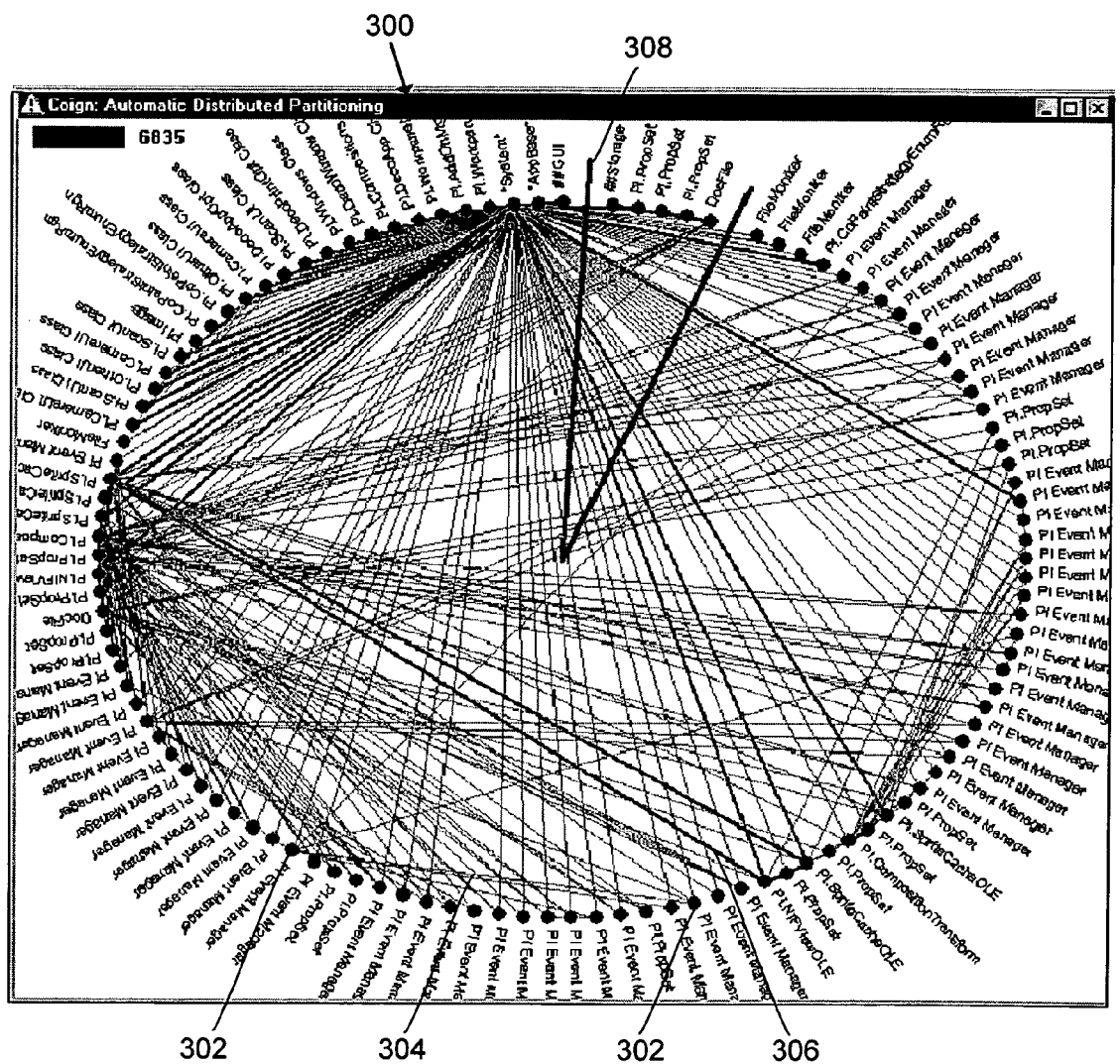
FIG. 11 is a diagram showing a graphical representation of a distribution chosen for a profiled scenario in which the user loads and previews an image in Picture It!® from a server in the COIGN system.

FIG. 11 shows a graphical representation 300 of the distribution chosen for a profiled scenario in which the user loads and previews an image in Picture It!® from a server. Each of the large dots 302 in FIG. 11 represents a dynamic component in the profiled scenario. Lines 304 between the large dots 302 represent COM interfaces through which the connected components communicate. The lines 304 can be colored according to the amount of communication flowing across the interface. Heavy black lines 306 represent interfaces that are not remotable (i.e., pairs of components that must reside on the same machine). An interface can be non-remotable for any of the following reasons: the interface has no IDL or type library description; one or more of the interface parameters is opaque, such as a "void *"; the client directly accesses the component's internal data; or the component must reside on the client or the server because it directly accesses system services. The "pie" slice 308 in the top half of FIG. 11 contains those components that should be located on the server to minimize network traffic and thus execution time. In the described example, the operating storage services, the document file component, and three "property set" components are all located on the server. Note that approximately one dozen other "property set" components (of the "PI.PropSet" class) are located on the client. In order to achieve optimal performance, a component-based ADPS is able to place components of the same class on different machines.

After the abstract distribution model is written into the binary, the application is prepared for distribution. When the application user instructs Picture We to load an image from the server, the lightweight version of the COIGN runtime will intercept the related instantiation request and relocate it to the server. The four components within the pie slice 308 in FIG. 11 are automatically distributed to the server. COIGN distributes components to the server by starting a surrogate process on the server. The surrogate acts as a distributed extension of the application; distributed components reside in its address space. A distributed version of the COIGN runtime maintains communication links between the original application process on the client and the surrogate process on the server.

COIGN has automatically created a distributed version of Picture It!® without access to the application source code or the programmer's knowledge of the application. The automatic distributed application is customized for the given network to minimize communication cost and maximize application throughput.

In the one embodiment, COIGN is used with other profiling tools as part of the application development process. COIGN shows the developer how to distribute the application optimally and provides the developer with feedback about which interfaces are communication "hot spots." The programmer can fine-tune the distribution by inserting custom marshaling and caching on communication-intensive interfaces. The programmer also enables or disables specific distributions by inserting or removing location constraints on specific components and interfaces. Alternatively, the programmer creates a distributed application with minimal effort simply by running the application through profiling scenarios and writing the corresponding distribution model into the application binary without modifying application sources.

In an alternative embodiment, COIGN is used on-site by the application user or system administrator to customize the application for a network. The user enables application profiling through a simple GUI to the setCOIGN utility. After "training" the application to the user's usage patterns—by running the application through representative scenarios—the GUI triggers post-profiling analysis and writes the distribution model into the application. In essence, the user has created a customized version of the distributed application without any knowledge of the underlying details.

Alternatively, COIGN can automatically decide when usage differs significantly from profiled scenarios, and silently enables profiling for a period to re-optimize the distribution. The COIGN runtime already contains sufficient infrastructure to allow "fully automatic" distribution optimization. The lightweight version of the runtime, which relocates component instantiation requests to produce the chosen distribution, can count messages between components with only slight additional overhead. Run time message counts could be compared with relative message counts from the profiling scenarios to recognize changes in application usage.

Architecture of the COIGN System

Figure 12:
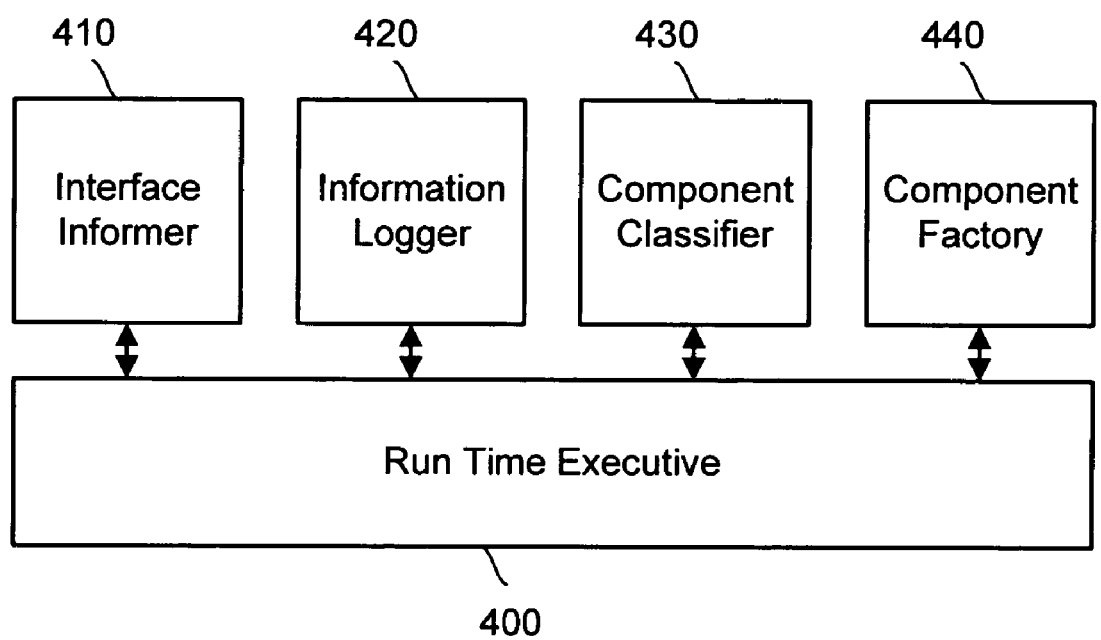
FIG. 12 is a block diagram of an object-oriented framework for partitioning and distributing application units of an application according to the COIGN system.
Figure 13:
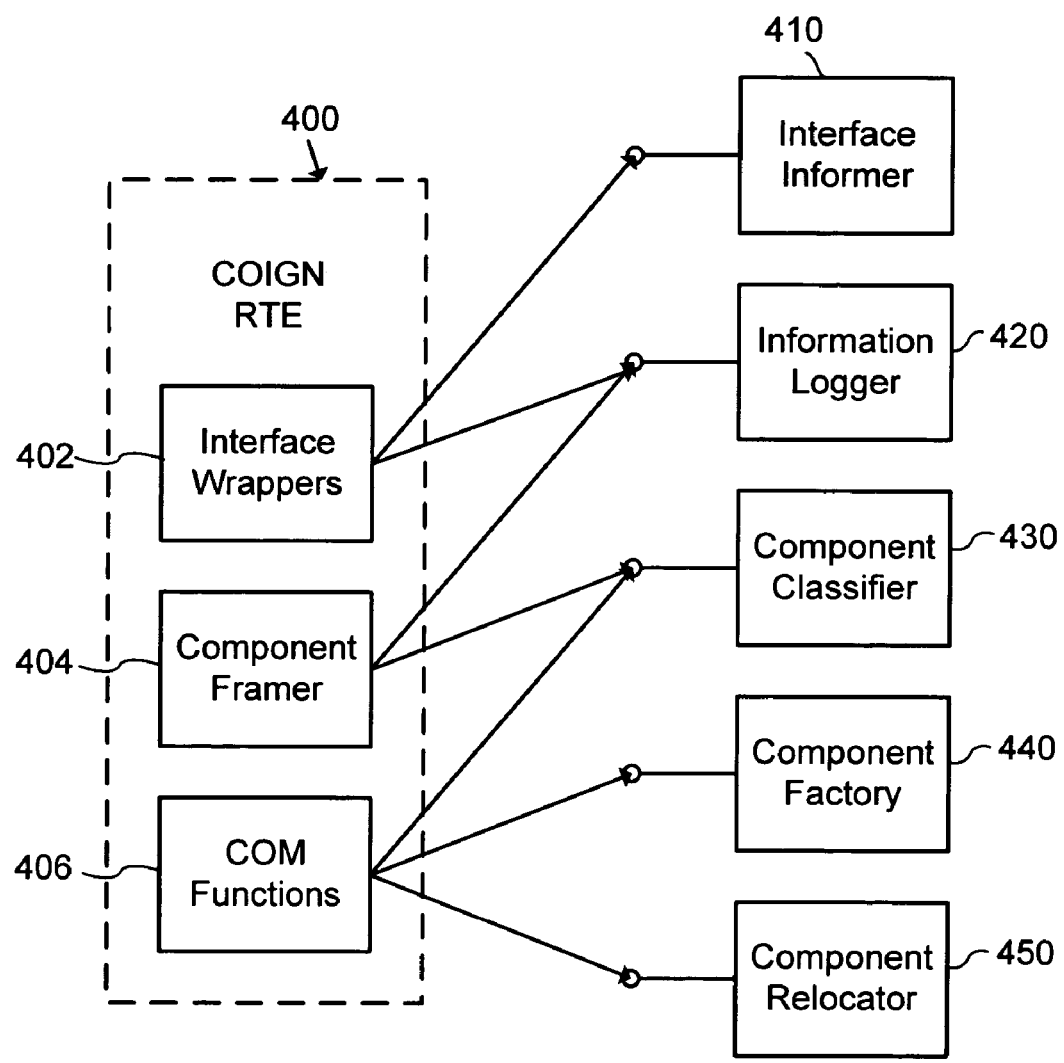
FIG. 13 is a block diagram of an object-oriented framework for partitioning and distributing application units of an application showing the pattern of intercommunication between the objects according to the COIGN system.

Referring to FIGS. 12 and 13, the COIGN runtime is composed of a small collection of replaceable COM components. The most important components are the COIGN Runtime Executive (RTE) 400, the interface informer 410, the information logger 420, the component classifier 430, and the component factory 440.

In general, the RTE 400 provides low-level services to the other components in the COIGN runtime. The interface informer 410 identifies interfaces by their static type and provides support for walking the parameters of interface function calls. The information logger 420 receives detailed information about all component-related events in the application from the RTE and the other COIGN runtime components. The information logger 420 is responsible for recording relevant events for post-profiling analysis. The component classifier 430 identifies components with similar communication patterns across multiple program executions. The component factory 440 decides where component instantiation requests should be fulfilled and relocates instantiation requests as needed to produce a chosen distribution. In an alternative embodiment, the component factory 440 is implemented in a separate object from a component relocator 450. Similarly, the functions of the other illustrated components could be divided or united in other configurations of components to perform the functions of the present invention.

Runtime Executive

The COIGN RTE 400 is the first DLL loaded into the application address space. As such, the RTE 400 runs before the application or any of its components. The RTE 400 patches the COM library and other system services to intercept component instantiation requests and re-direct them. The RTE 400 reads the configuration information written into the application binary by the setCOIGN utility. Based on information in the configuration record, the RTE loads other components of the COIGN runtime. For example, the sets of DLLs for profiling and "regular" program execution, i.e., the heavyweight and lightweight instrumentation packages, differ in the choice of components 410, 420, 430, 440, and 450 to run on top of the RTE 400. The heavyweight instrumentation package includes a different interface informer 410 and information logger 420 from the lightweight instrumentation package. The heavyweight interface informer includes more detailed structural metadata and more elaborate information logger than the lightweight interface informer. According to the model of the COIGN system, arbitrary combinations of modules, and arbitrary combinations of different versions of modules, enable tailoring of instrumentation packages for a wide range of analysis and adaptation tasks.

The RTE 400 provides a number of low-level services to the other components in the COIGN runtime. Services provided by the RTE 400 include interface wrapping, component identification and tagging, interception and redirection of component instantiation requests, interface wrapping, and address space and stack management.

As described in detail below, the RTE "wraps" all COM interfaces by replacing the component interface pointer with a pointer to a COIGN instrumentation interface. The RTE manages interface wrappers 402. Once an interface is wrapped, the COIGN runtime can intercept all function calls between components that cross the interface. An interface is wrapped using information from the interface informer 410. The RTE also invokes the interface informer 410 to process the parameters to interface function calls in profiling. The results of the processing can be stored in the information logger 420.

As described in detail below, to identify components communicating within an application, the RTE frames components 404 in conjunction with the interface wrappers 402. In this way, components can be dynamically identified by the component classifier 430 and information about components, rather than just interfaces, can be stored in the information logger 420.

The RTE 400 provides a set of functions to access information in the configuration record created by setCOIGN. The RTE 400, in cooperation with the information logger 420, provides other components with persistent storage through the configuration record.

As described in detail below, the RTE redirects all component instantiation requests made by the application through the function of the COM runtime 406. It invokes the component classifier 430 to identify the about-to-be-instantiated component. The RTE 400 then invokes the component factory 440, which fulfills the instantiation request at the appropriate location based on its component classification.

The RTE tracks all binaries (.DLL and .EXE files) loaded in the application's address space. The RTE also provides distributed, thread-local stack used by the other components to store cross-call context information.

Interface Informer

The interface informer 410 locates and manages interface metadata. With assistance from the interface informer 410, other components of the COIGN system can determine the static type of a COM interface, and walk both the input and output parameters of an interface function call. COIGN includes multiple versions of interface informers.

A first version of interface informer is included in the heavyweight instrumentation package and operates during scenario-based profiling. This "profiling" interface informer uses format strings generated by the MIDL compiler and interface marshaling code to analyze all function call parameters and precisely measure inter-component communication. The profiling interface informer adds a significant amount of overhead to execution run-time.

A second version of interface informer is included in the lightweight instrumentation package, and is used after profiling to produce the distributed application. This "distributed" informer examines function call parameters only enough to locate interface pointers. Before the execution of the distributed application, the interface metadata of the heavyweight, profiling interface informer is aggressively edited to remove metadata unnecessary for the identification of interface pointers. As a result of aggressive pre-execution optimization of interface metadata, the distributed informer imposes minimal execution overhead on most applications.

In an alternative embodiment, a third version of interface informer includes less interface metadata than the profiling interface informer, but more interface metadata than the distributed interface informer. This "intermediate" interface informer can be used for lightweight profiling of an application during distributed execution, for example, to determine if an application execution conforms to expected use parameters set forth after scenario-based profiling.

While described in the context of the COIGN system, the processing of interface metadata to yield a lightweight instrumentation package from a heavyweight instrumentation package has more general applicability to the field of instrumentation.

Information Logger

The information logger 420 summarizes and records data for automatic distributed partitioning analysis. Under direction of the RTE 400, COIGN runtime components pass information about a number of events to the information logger 420. The logger 420 is free to process the events as it wishes. Depending on the logger's version, it might ignore the event, write the event to a log file on disk, or accumulate information about the event into in-memory data structures. COIGN includes multiple versions of information loggers.

The profiling logger, included in the heavyweight instrumentation package, summarizes data describing inter-component communication into in-memory data structures. At the end of execution, these data structures are written to disk for post-profiling analysis.

The event logger, which can be included in the lightweight instrumentation package, creates detailed traces of all component-related events during application execution. Traces generated by the event logger can drive detailed simulations of the execution of component-based applications.

The null logger, which alternatively can be included in the lightweight instrumentation package, ignores all events. Use of the null logger insures that no extra files are generated during execution of the automatically distributed application.

Alternatively, an information logger 420 can process information in some arbitrary way tailored for a specific instrumentation package.

Component Classifier

The component classifier 430 identifies components with similar patterns across multiple executions of an application. COIGN includes eight component classifiers that were created for evaluation purposes, including classifiers that use static classification methods and classifiers that use PCCs and various types of CCCs. Alternatively, other component classifiers can identify similar components using different classification methods.

Information used to generate COIGN's dynamic classifiers is gathered during scenario-based profiling by the component classifier 430. COIGN's scenario-based approach to automatic distribution depends on the premise that the communication behavior of a component during a distributed application can be predicted based on the component's similarity to another component in a profiling scenario. Because in the general case it is impossible to determine a priori the communication behavior of a component, the component classifier 430 groups components with similar instantiation histories. The classifier 430 operates on the theory that two components created under similar circumstances will display similar behavior. The output of the post-profiling graph-cutting algorithm is a mapping of component classifications to computers in the network.

During distributed execution, the component classifier 430 matches a component created during distributed executions to the most similar component listed in the distribution scheme. When dynamic classification is used, the component classifier 430 in effect matches a component created during distributed execution to the most similar component created during the profiling scenarios. Based on the chosen distribution for similar profiled components, the classifier decides where new components created during the distributed execution should be instantiated.

Component Factory

The component factory 440 produces the distributed application. Using output from the component classifier 430 and the graph-cutting algorithm, the component factory 440 moves each component instantiation request to the appropriate computer within the network. During distributed execution, a copy of the component factory 440 is replicated onto each machine. The component factories act as peers. Each redirects component instantiation requests on its own machine, forwards them to another machine as appropriate, and fulfills instantiation requests destined for its machine by invoking COM to create the new component instances. The job of the component factory is straightforward since most of the difficult problems in creating a distributed application are handled either by the underlying DCOM system or by the component classifier 430.

COIGN can contain a symbiotic pair of component factories. Used simultaneously, the first factory handles communication with peer factories on remote machines while the second factory interacts with the component classifier and the interface informer.

Implementation of the COIGN Automatic Distributed Partitioning System

The COIGN system includes numerous features specific to an ADPS for applications built from COM components. These features are described in detail below for a version of the COIGN system on the Microsoft Windows NT platform.

COIGN is an ADPS for component-based applications. It instruments, measures, partitions, and distributes applications at the level of binary-standard COM components. While the instrumentation aspects of COIGN are described below in the context of automatic distributed partitioning, a number of the aspects, including interface wrapping, static re-linking, and handling undocumented interfaces, are applicable to any instrumentation system for COM components.

To understand component behavior, COIGN gathers intimate knowledge of how an application and its components interact with the COM run-time services. COIGN is a binary-level system. The COIGN runtime penetrates the boundary between the application and the COM runtime transparently to the application. COIGN inserts itself between the application and the COM runtime services.

COM components are dynamic objects. Instantiated during an application's execution, components communicate with the application and each other through dynamically bound interfaces. A component frees itself from memory after all references to it have been released by the application and other components. COIGN is particularly aware of component instantiations. Applications instantiate COM components by calling API functions exported from a user-mode COM DLL. Applications bind to the COM DLL either statically or dynamically.

Static binding to a DLL is very similar to the use of shared libraries in most UNIX systems. Static binding is performed in two stages. At link time, the linker embeds in the application binary the name of the DLL, a list of all imported functions, and an indirect jump table with one entry per imported function. At load time, the loader maps all imported DLLs into the application's address space and patches the indirect jump table entries to point to the correct entry points in the DLL image.

Dynamic binding occurs entirely at run time. A DLL is loaded into the application's address space by calling the LoadLibrary Win32 function. After loading, the application looks for procedures within the DLL using the GetProcAddress function. In contrast to static binding, in which all calls use an indirect jump table, GetProcAddress returns a direct pointer to the entry point of the named function.

The COM DLL exports approximately 50 functions capable of instantiating new components. With few exceptions, applications instantiate components exclusively through the CoCreateInstance function or its successor, CoCreateInstanceEx. From the instrumentation perspective there is little difference among the COM API functions. For brevity, CoCreateInstance is a placeholder for any function that instantiates new COM components.

Intercepting Component Instantiation Requests and In-Line Redirection

To correctly intercept and label all component instantiations, the COIGN instrumentation is called at the entry and exit of each of the component instantiation functions.

Figure 14:
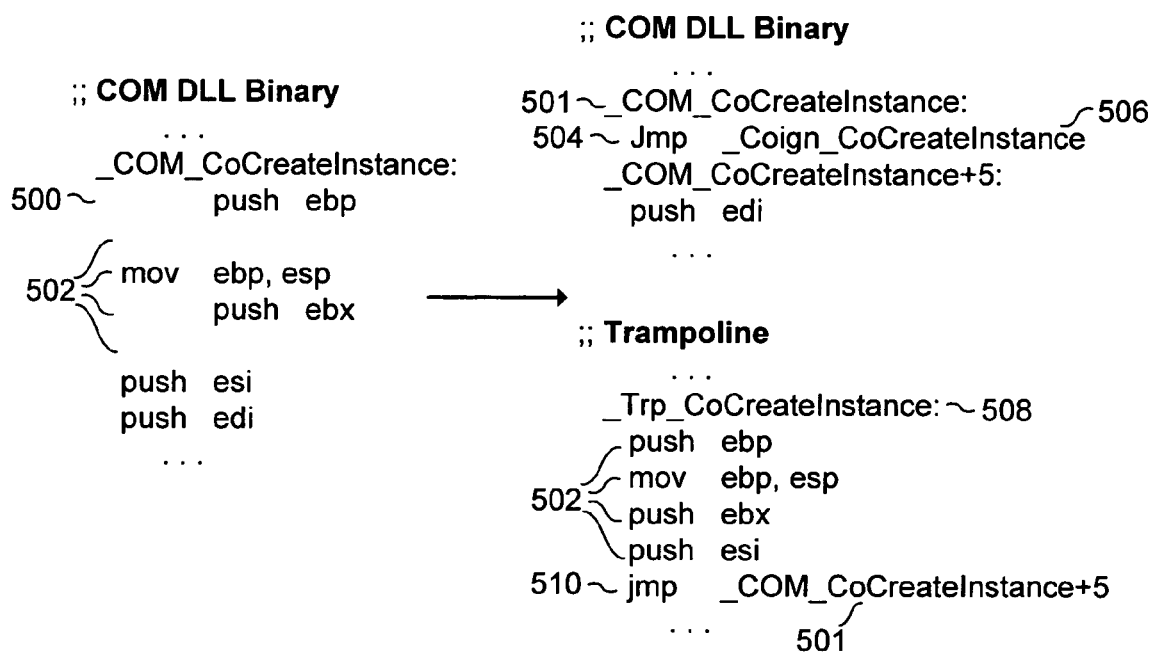
FIG. 14 is a listing containing code fragments illustrating interception and in-line redirection of communications according to the COIGN system.

Referring to FIG. 14, at load time, the first few instructions 502 of the target function 500 are replaced with a jump instruction 504 to the instrumentation detour function 506 in the instrumentation. The first few instructions 502 are normally part of the function prolog generated by a compiler and not the targets of any branches. The replaced instructions 502 are used to create a trampoline function 508. When the modified target function 501 is invoked, the jump instruction 504 transfers execution to the detour function 506 in the instrumentation. The detour function 506 passes control to the remainder of the target function by invoking the trampoline function 508. After the moved instructions 502 are executed in the trampoline 508, a jump instruction 510 transfers execution back to a spot in the target function 501. The trampoline function 508 allows the detour function 506 to invoke the target function without interception.

Although inline indirection is complicated somewhat by the variable-length instruction set of certain processors upon which the COIGN system runs, for example, the Intel x86 architecture, its low run-time cost and versatility more than offset the development penalty. Inline redirection of the CoCreateInstance function, for example, creates overhead that is more than an order of magnitude smaller than the penalty for breakpoint trapping. Moreover, unlike DLL redirection, inline redirection correctly intercepts both statically and dynamically bound invocations. Finally, inline redirection is much more flexible than DLL redirection or application code modification. Inline redirection of any API function can be selectively enabled for each process individually at load time based on the needs of the instrumentation.

To apply inline redirection, the COIGN runtime, a collection of DLLs, is loaded into the application's address space before the application executes. One of these DLLs, the COIGN run-time executive (RTE), inserts the inline redirection code.

In addition to exporting function entry points to applications, DLLs in Windows NT also export a special entry point to the operating system, the DllMain function. The DllMain function is invoked by the operating system on initialization or termination of an application or any of its threads. DllMain gives the DLL first-chance execution on program initialization and last-chance execution on termination. One use for DllMain is to invoke static C++ constructors and destructors. When loaded into an application's address space, the DllMain function of the COIGN RTE DLL applies inline redirection to the COM API functions.

Linking the COIGN Runtime to the Application

Using one of several mechanisms, the COIGN runtime is loaded into the application's address space before the application executes. The COIGN runtime is packaged as a collection of dynamic link libraries. The COIGN run-time executive (RTE) is the most important DLL; it loads all other COIGN DLLs, so it is loaded first into the application's address space. The COIGN RTE can be loaded by static or dynamic binding with the application.

Figure 15:
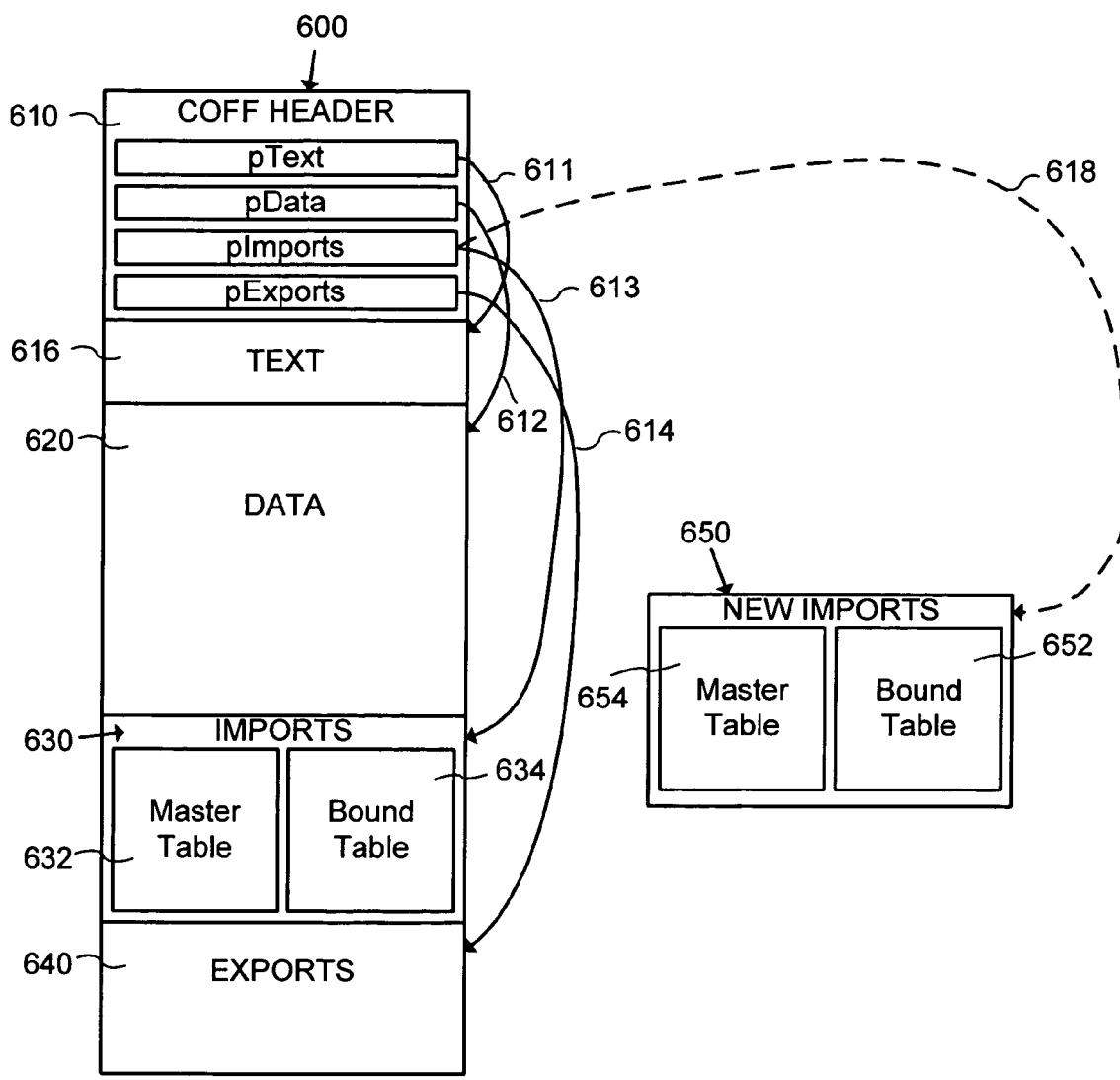
FIG. 15 is a block diagram showing an application binary in common object file format that is statically linked according to one embodiment of the present invention.

According to one method of static binding of the COIGN RTE into an application, the application binary is modified to add the RTE DLL to the list of imported DLLs. Static binding insures that the RTE executes with the application. Referring to FIG. 15, an application binary 600 in a common object file format ("COFF") includes a header section 610, a text section 616, a data section 620, a list of imports 630, and a list of exports 640. The header section 610 includes pointers 611-614 to other sections of the application binary 600. The text section 616 describes the application. The data section 620 includes binary data for the application. Within the binary data, function calls to functions provided by other DLLs are represented as address offsets from the pointer 613 in the COFF header 610 to the imports section 630. The list of imports includes two parallel tables. The first table, the master table 632, contains string descriptions of other libraries and functions that must be loaded for the application to work, for example, necessary DLLs. The second table, the bound table 634, is identical to the master table before binding. After binding, the bound table contains corresponding addresses for bound functions in the application image in address space. Function calls in the data section 620 are directly represented as offsets in the bound table. For this reason, the ordering of the bound table should not be changed during linking. The exports list 640 includes functions that the application binary 600 exports for use by other programs.

To statically bind the COIGN RTE into an application, COIGN uses binary rewriting to include the COIGN RTE in the list of imports 630. To load the rest of the COIGN runtime DLLs before any of the other DLLs are loaded, and to modify COM instantiation APIs at the beginning of application execution, the COIGN RTE DLL is inserted at the beginning of the master table 632 in the list of imports 630. Because the application is in binary form, merely inserting the COM RTE DLL into the master table of the list of imports is not possible without replacing the first entry on the master table 632 (assuming the first entry reference had the same length), or corrupting the binary file. For this reason, a new imports section 650 is created. Into the master table 654 of the new imports section 650, the binary rewriter inserts an entry to load the COIGN RTE DLL, and appends the old master table 632. A dummy entry for the COIGN RTE DLL is added to the bound table 652 of the new imports section 650 to make it the same size as the master table, but the dummy entry is never called. The bound table is otherwise not modified, so the references within the COFF binary data to spots within the bound table are not corrupted. The header section 610 of the application points 618 to the new imports section 650 instead of the old imports section 630. At load time, the libraries listed in the new master table 654 are loaded. Addresses are loaded into the new bound table 652. Function calls from the data 620 of the COFF continue to point successfully to offsets in a bound table. In this way, the COIGN RTE DLL is flexibly included in the list of imports without corrupting the application binary. The application is thereby instrumented with COIGN RTE, and the package of other COIGN modules loaded by the COIGN RTE according to its configuration record.

To dynamically bind the COIGN RTE DLL into an application without modifying the application binary, a technique known as DLL injection can be used. Using an application loader, the RTE DLL is forcefully injected into the application's address space. Inserting a code fragment into an application's address space is relatively easy. With sufficient operating-system permissions, the Windows NT virtual memory system supports calls to allocate and modify memory in another process. After the application loader inserts a code fragment into the application's address space, it causes the application to execute the fragment using one of several methods. The code fragment uses the LoadLibrary function to dynamically load the RTE DLL.

One method of invoking an external code fragment in an application is through the Windows NT debugging API. To execute the injected code fragment, the application loader suspends the application, changes the program counter on the application's startup thread to point to the injected code fragment, and resumes execution of the thread. After loading the COIGN RTE DLL, the injected code fragment triggers a debugging breakpoint. The application loader then restores the original program counter and resumes application execution. The primary disadvantage of invoking a code fragment through the debugging API is its penalty on application execution. Once a loader has attached to an application using the debugging API, it cannot detach itself from the application. As long as it is attached, the loader will be invoked synchronously for all debugging related events. Debugging related events include process creation and termination, thread creation and termination, virtual memory exceptions, and application exceptions. Each of these events necessitates two full context switches: one to the loader and one back to the application. A secondary disadvantage to invoking a code fragment through the debugging API is that only one program can attach to an application through the debugging API at a time. The application cannot be debugged if the COIGN application loader uses the debugging API.

An alternative method of invoking a code fragment within the application is to inject a new thread of execution into the application. The Win32 API supported by Windows NT includes a function called CreateRemoteThread. CreateRemoteThread starts a new thread within another operating-system process at an address specified by the caller. Using this method, COIGN loads the application in a suspended state using a special flag to the CreateProcess call. COIGN injects the RTE-loading code fragment into the application and starts a new thread to invoke the RTE-loading code. After the code fragment executes, it terminates its thread. COIGN then resumes application execution. Invoking a code fragment with CreateRemoteThread has little side effect on application execution. After the remote thread has executed, the application loader can terminate, leaving the instrumentation runtime firmly embedded in the application's address space.

Using the debugging API to invoke dynamically injected code is prohibitively expensive. Injecting the COIGN RTE DLL using the CreateRemoteThread call is only marginally more expensive than including the DLL through static binding, but is much more complex to implement. The primary advantage of static binding is simplicity. The statically bound application is invoked without a special loader or special command line parameters.

Static Re-Linking of Libraries to an Application

In FIG. 15, COIGN uses binary rewriting to insert the instruction to load the COIGN RTE in a new import section 650. The header section 610 of the application binary 600 is modified to point to the new import section 650. In the COIGN system, the linking of a library to an application is made reversible, and static re-linking to the same application binary to a second library is flexibly enabled. Although static re-linking is described in the context of the COIGN system, it is applicable to linking of applications in general.

Figure 16:
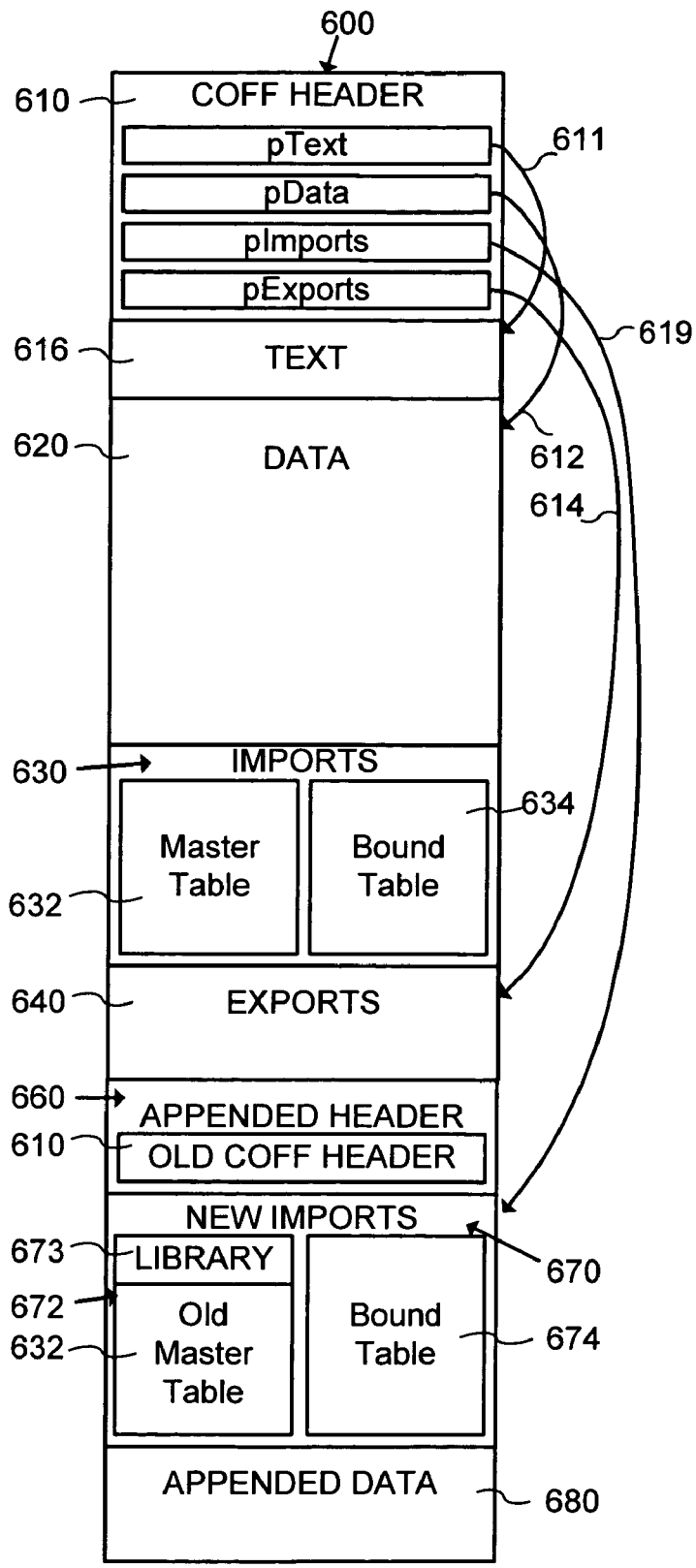
FIG. 16 is a block diagram showing the application binary of FIG. 15 reversibly static re-linked to a second set of libraries.

As shown in FIG. 16, an application binary 600 in common object file format ("COFF") includes a header 610, text 616, data 620, an imports list 630, and an exports list 640. The imports section 630 includes master 632 and bound 634 tables. To reversibly link a library to the application binary 600, a header 660 is appended to the application binary 600. In COIGN, the appended header 660 is called a COIGN header. The original COFF header 610 is copied to the appended header for storage.

A new imports section 670 is created following the appended header, and the first entry in the master table 672 of the new imports section 670 is a reference 673 to the first library to be loaded. For example, in COIGN, the first entry 673 can be for the COIGN RTE DLL. Following the first entry 673, the original master table 632 is appended.

The binary rewriter can also append arbitrary data 680 to the extended COFF file. For example, a COIGN configuration record can be appended to the end of the application. Alternatively, other types of data can be appended. For example, each unit of data in the COIGN system can include a GUID describing the type of data, an offset to the next unit of data, as well as the data itself. The COIGN configuration record can contain information used by the distributed runtime to produce a chosen distribution.

Finally, the original COFF header 610 is modified by the binary rewriter to point 619 to the new imports section 670.

At load time, the libraries listed in the master table 672 of the new import section 670 are loaded, and addresses are loaded into the bound table 674. During execution, an application instrumented according to the added library 673 in the imports section can access and store data 680 appended to the extended COFF file. For example, in COIGN, the COIGN instrumentation can access and store data in the COIGN configuration record.

To re-link the application binary, the original COFF header 610 is restored from the appended header 660. The appended header 660, new imports section 670, and any appended data 680 are discarded. Because the original COFF header 610 contained a pointer 613 to the original imports section 630, the application binary 600 is restored. At this point, the process can repeated using the original application binary, or using a second library instead of the first library. Alternatively, the first entry 673 in the master table 672 of the new imports section 670 can be overwritten with a binary rewriter to include the second library instead of the first, and the application re-binded.

In this way, multiple instrumentation packages can be added to an application binary 600 without recompiling the application binary. Moreover, because a new imports section 670 is used, changes to the imports section 670 can be of arbitrary length and still not corrupt the application binary 600.

Instrumenting Interfaces of COM Components to Measure Communication, Assist Distribution, and Identify Components by Interface All first-class communication between COM components takes place through interfaces. In many respects, the COIGN runtime is an interface instrumentation system. Much of its functionality is dedicated to identifying interfaces, understanding their relationships to each other, and quantifying the communication through them.

To measure communication between components, the COIGN runtime intercepts all inter-component communication through interfaces. By standard, an interface is a pointer to a virtual function table (VTBL, pronounced "V-Table"). A component client always accesses an interface through an interface pointer (a pointer to the pointer to a virtual function table). The component is responsible for allocating and releasing the memory occupied by an interface. Quite often, components place per-instance interface data immediately following the virtual-function-table pointer. FIG. 5 shows the memory layout of a typical component. With the exception of the virtual function table and the pointer to the virtual function table, the component memory area is opaque to the client.

Invoking an interface member function is similar to invoking a C++ member function. Clients invoke interface member functions through the interface pointer:

The first argument to any interface member function is the "this" pointer, the pointer to the interface. For example, typical syntax to invoke an interface member function is:

```
IStream *pIStream;
pIStream->Seek(nPos);                    // C++ Syntax
pIStream->pVtbl->pfSeek(pIStream, nPos)  // C Syntax
```

The initial interface pointer to a component is returned by the instantiating API function. By intercepting all component instantiation requests, COIGN has an opportunity to instrument the interface before returning the interface pointer to the client.

Figure 17:
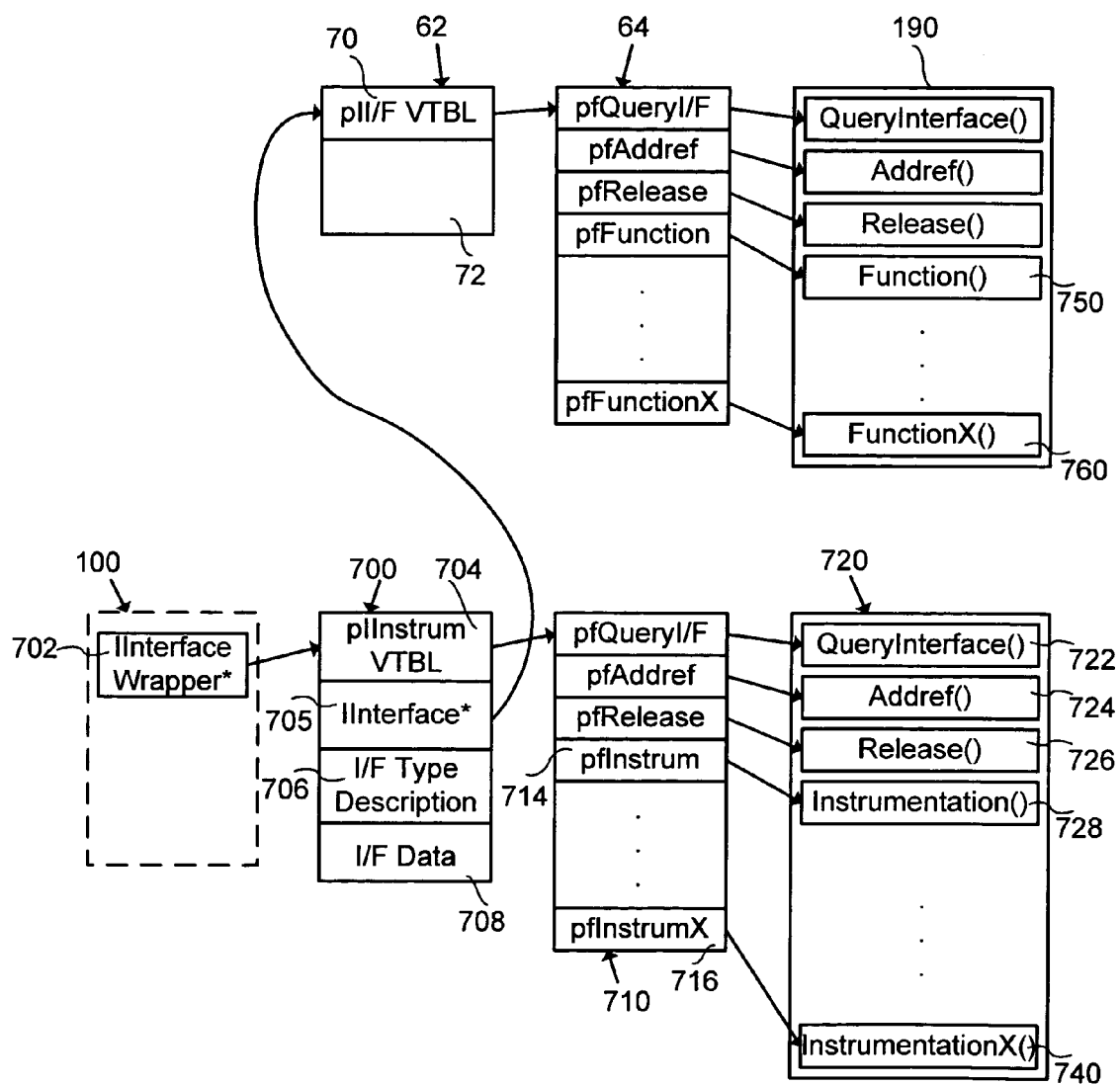
FIG. 17 is a block diagram of a series of COIGN data structures showing a component object, an interface wrapper appended to the component object, and analytical data appended to the wrapped component object.

Referring to FIG. 17, rather than return a pointer 705 to the component interface, the interception system returns a pointer 702 to an interface of its own making, a specialized universal delegator called an interface wrapper 700. The process of creating the wrapper and replacing the interface pointer with a pointer to an interface wrapper is referred to as wrapping the interface. Interfaces are referred to as being wrapped or unwrapped. A wrapped interface is one to which clients receive a pointer to the interface wrapper. An unwrapped interface is one either without a wrapper or with the interface wrapper removed to yield the component interface.

FIG. 17 shows an interface wrapper 700 used in the COIGN system. The client 100 holds a pointer 702 to the interface wrapper 700. The interface wrapper 700 holds a pointer 704 to a virtual table 710 for the COIGN instrumentation system, the original interface pointer 705, and an interface type description 706 for the wrapped interface. The interface pointer 705 that can be used to access the component interface through the instance data structure 62 and pointer 70 to the virtual table for the interface, as described above with reference to FIGS. 3 and 5. The interface type description 706 includes description of the parameters of the wrapped interface, and can include a GUID. Alternatively, the interface type description 706 can be a pointer to interface type description stored elsewhere. Further, the interface wrapper can hold arbitrary data 708 associated with the wrapped interface. The interface wrapper can hold a pointer as arbitrary data 708, where the pointer references data stored elsewhere. The virtual table 710 for the COIGN instrumentation system includes pointers 711-713 to the IUnknown functions 722-726, and pointers 714-716 to instrumentation functions 728-740. When the client 100 attempts to invoke an interface member function 750, the pointer 702 to the interface wrapper 700 is followed and COIGN has intercepted the interface member-function invocation. An instrumentation function 728 corresponding to the member function 750 is invoked that processes member-function parameters using the information supplied in the interface type description 706. The member function 750 is called through the instance data structure 62 of the component interface using the interface pointer 705. Upon return from the member-function call, the instrumentation function 728 processes the outgoing parameters, and returns execution to the client 100. Any information useful to the COIGN instrumentation system can be recorded in the data section 708 of the interface wrapper 700. In this way, access to information about the interface wrapper 700 is easily organized and accessible. Even for components that reuse the same implementation of "QueryInterface( )", "AddRef( )", and "Release( )" in multiple interfaces of dissimilar types, interface-specific information 708 is organized and accessible.

For example, in an architecture in which a called member-function controls the call stack for function calls, the client 100 pushes an invocation frame on the call stack to make a function call. The invocation frame includes function parameters and a return address for the client 100. As noted above, the function call also includes as an argument the "this" pointer, a reference to the interface containing the member function. By replacing the "this" pointer 705 with a pointer 702 to an interface wrapper 700, the COIGN system intercepts calls to member functions from client unit 100. When the COIGN instrumentation intercepts a call to a member function 750, it invokes the corresponding instrumentation function 728. The instrumentation function 728 processes the outgoing parameters by parsing and measuring the parameters using the interface type description 706. The instrumentation function 728 also uses the interface type description 706 to determine the parameters of the function call. An invocation frame of the identical function call parameters for the member function 750 is pushed onto the call stack. A return address to the instrumentation function 728 is pushed onto the call stack. The member-function 750 is then called by the instrumentation-function 728. The member function 750 executes, and when it finishes pops the added invocation frame from the call stack. Control returns to the instrumentation function 728. The instrumentation function 728 processes the return parameters, pops the original invocation frame off the call stack, then returns control to the client unit 100. Alternatively, in a framework in which a calling unit controls the call stack, the COIGN instrumentation would not utilize an additional invocation frame to intercept a return from a called function and parse and measure return parameters.

In one embodiment of COIGN, each interface has a corresponding interface wrapper. In an alternative embodiment, an interface wrapper is provided for each extended class of interface, with the interface type description used to differentiate function calls for the various interfaces within a class.

In addition to providing a mechanism for COIGN to intercept member function calls and measure the parameters, interface wrappers can be used by COIGN to identify communications as coming from or directed to a particular component. COM does not provide components with strongly-typed identities. Instead, COM components are loosely-coupled collections of interfaces. Despite this lack of a COM-supplied component identity, the interfaces of a component can be identified as common to the component using interface wrappers. In an interface wrapper, the identity of the owner of the interface can be stored.

Figure 18:
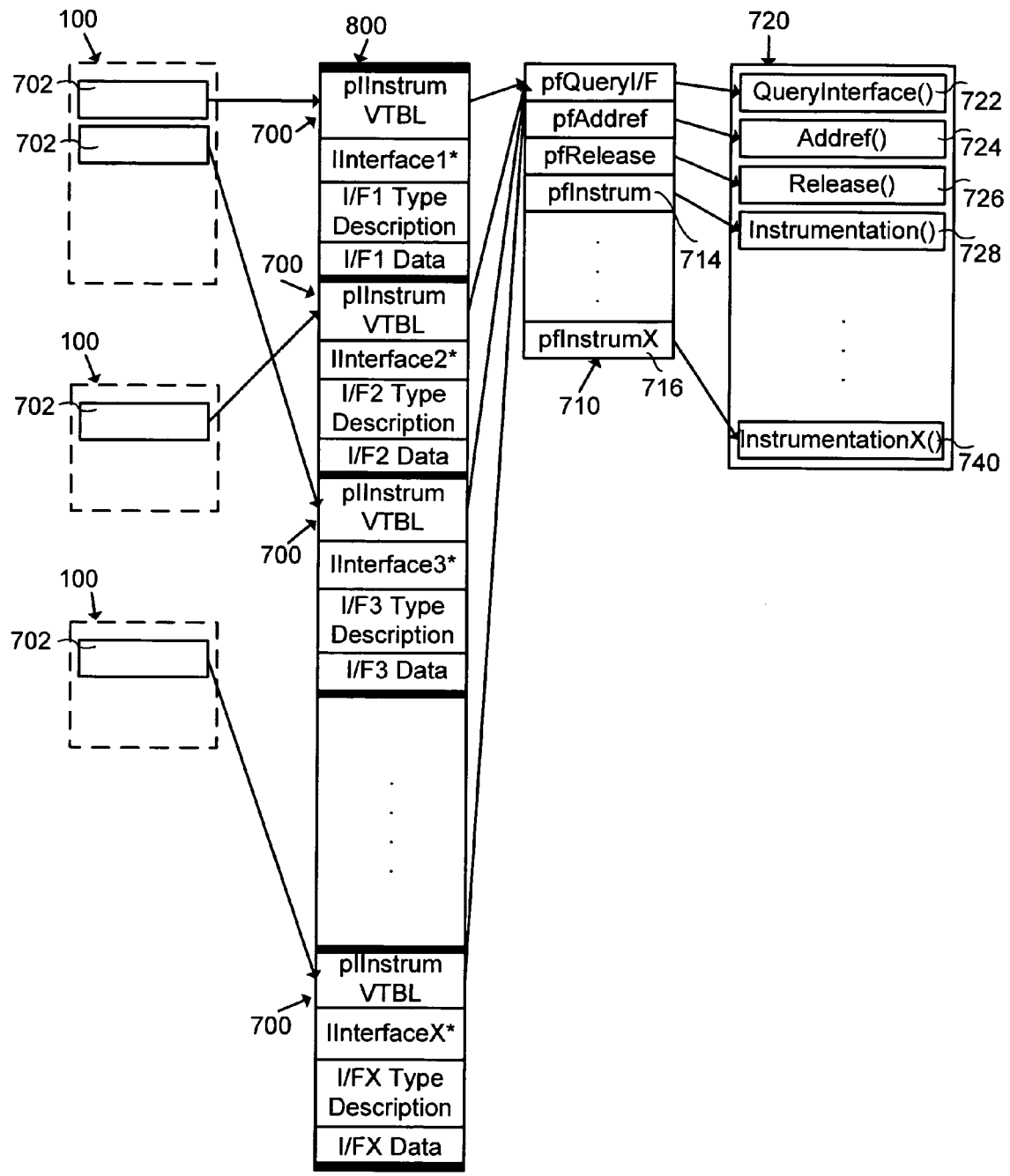
FIG. 18 is a block diagram of a series of COIGN data structures showing a table of interfaces, a group of interface wrappers, and a table of instrumentation functions.

FIG. 18 shows data structures used to track interface wrappers for all of the interfaces of components in an application. A number of clients 100 hold pointers 702 to interface wrappers 700. A table 800 of interface wrappers 700 includes an interface wrapper 700 for each interface created. Each of these interface wrappers 700 includes the same pointer 704 to the same instrumentation function table 710. Each interface wrapper also includes an interface type description 706 and can include other data 708 associated with the interface. The interface type description 706 and associated interface data 708 can be different for each of the interfaces.

A client can receive an interface pointer in one of four ways: from one of the COM component instantiation functions; by calling "QueryInterface( )" on an interface to which it already holds a pointer; as an output parameter from one of the member functions of an interface to which it already holds a pointer; or as an input parameter on one of its own member functions. For each new interface created by an instantiation function such as "CoCreateInstance( )" the interface is wrapped with an interface wrapper 700 identifying the created component. Whenever an unwrapped interface is returned to a client as a parameter, it is wrapped with an interface wrapper 700 identifying the originating component. Each new interface returned by a "QueryInterface( )" call is wrapped with an interface wrapper identifying the called component. By induction, if an interface is not wrapped, it belongs to the current component.

COIGN uses a hash table that maps interfaces to interface wrappers to help manage interface wrappers. When COIGN detects an interface pointer to be returned to a client, it consults the hash table. If the interface is wrapped, a pointer 702 to the interface wrapper for the interface is returned to a client. If the interface is not wrapped, an interface wrapper is added to the table 800 and a pointer 702 to the added interface wrapper is returned to the client. Because an interface wrapper points to the instrumentation virtual table 710, interface wrappers can be distinguished from normal interfaces, and multiple wrappings prevented. Alternatively, in an instrumentation system that does not use interface wrappers, the described techniques for and results of identifying which units expose which interfaces can be implemented using a hash table or other data structure that maps interfaces to owning units.

At any time the COIGN runtime knows exactly which component is executing. The identity of the current component is noted as a thread-local variable and used to identify interfaces. For example, when a member-function of a component interface is called through an interface wrapper, the called component can be identified as the current component by pushing the component identity on a local stack. When the component is done executing, the component identity is then popped from the local stack.

At any time, COIGN can examine the top values of the stack to determine the identity of the current component and any calling components. In this way, interface wrappers can be used to measure inter-component communication.

COIGN can also examine the identities of components currently pushed on the stack to determine the sequence of component calls preceding a component instantiation request. In this way, interface wrappers enable dynamic classification of components by tracing component identities on the local stack.

While clients should only have access to interfaces through interface wrappers, a component should never see an interface wrapper to one of its own interfaces because the component uses its interfaces to access instance-specific data. A component could receive an interface wrapper to one of its own interfaces if a client passes an interface pointer back to the owning component as an input parameter on another call. The solution is simply to unwrap an interface pointer parameter whenever the pointer is passed as a parameter to its owning component.

Structural Metadata, Static Analysis Techniques, and Pre-Processing of Metadata

Interface wrapping requires static metadata about interfaces. In addition to needing the information for the interface type description, an interface wrapper uses static metadata in the lightweight instrumentation package to identify all interface pointers passed as parameters to an interface member function.

There are a number of sources for COIGN to acquire static interface metadata. Possible sources include the IDL description of an interface, COM type libraries, and interface proxies and stubs.

Static interface metadata is used to generate interface proxies and stubs. The Microsoft IDL (MIDL) compiler generates proxies and stubs from IDL source code. COIGN can acquire marshaling byte code directly from interface proxies and stubs. The MIDL compiler supports a number of optimization levels to reduce the size of interface proxies and stubs. One of the optimization levels uses a byte-code interpreter to marshal interface parameters. Static interface metadata can be acquired easily by interpreting the marshaling byte codes. Although the marshaling byte codes are not publicly documented, the meanings of all byte codes emitted by the MIDL compiler can be determined by experimentation. Using MIDL generated byte-codes means that COIGN must be updated with each new release of the MIDL runtime. This is not a serious problem because changes in the MIDL byte-codes are always backward compatible and new versions of the runtime are generally released only with major operating-system upgrades.

Acquiring static interface metadata from the IDL description of an interface is another entirely acceptable method. It does however require static analysis tools to parse and extract the appropriate metadata from the IDL source code. In essence, it needs an IDL compiler. When components are distributed with IDL source code, but without interface proxies and stubs, a programmer can easily create interface proxies and stubs from the IDL sources with the MIDL compiler.

Another alternative is to acquire static interface metadata from the COM type libraries. COM type libraries allow access to COM components from interpreters for scripting languages, such as JavaScript or Visual Basic. While compact and readily accessible, type libraries are incomplete. The metadata in type libraries does not identify whether function parameters are input or output parameters. In addition, the metadata in type libraries does not contain sufficient information to determine the size of dynamic array parameters.

The COIGN toolkit contains an interpreter and a precompiler to process the marshaling byte codes. The interpreter is used during application profiling. The interpreter parses interface parameters and provides the COIGN runtime with complete information about all interface pointers passed as parameters. More importantly, the profiling interpreter calculates the size of all parameters. This size information is used to accurately predict inter-component communication costs.

The byte-code precompiler uses dead-code elimination and constant folding to produce an optimized metadata representation. The simplified metadata representation is used by the lightweight instrumentation package of the COIGN runtime during distributed executions of the application. The simplified metadata describes all interface pointers passed as interface parameters, but does not contain information to calculate parameter sizes. Processed by a secondary interpreter, the simplified metadata allows the non-profiling runtime instrumentation package to wrap interfaces in a fraction of the time required when using the COM marshaling byte codes.

Handling Undocumented Interfaces and Automatic Detection of Pair-Wise Component Location Constraints A final difficulty in interface wrapping is coping with undocumented interfaces, those without static metadata. While all component interfaces should have static metadata, occasionally components from the same vendor will use an undocumented interface to communicate with each other. Function calls on an undocumented interface are not marshallable, so two components communicating through an undocumented interface cannot be separated during distribution. The profiling instrumentation package runtime records this fact for use during distributed partitioning analysis.

Of immediate importance to the COIGN runtime, however, is the impossibility of determining a priori the number of parameters passed in a call to an undocumented interface.

Referring to FIG. 17, as noted above, when a function call on a documented interface is intercepted, the incoming function parameters are processed, a new stack frame is created, and the component interface is called. Upon return from the component's interface, the outgoing function parameters are processed, and execution is returned to the client. Information about the number of parameters passed to the member function is accessed through interface type description 706 and used to create the new stack frame for calling the component interface. For documented interfaces, the size of the new stack frame can easily be determined from the marshaling byte codes.

The COIGN instrumentation determines whether an interface is documented. For example, by examining interface type description 706, the COIGN instrumentation may detect interfaces for which there is no description or inadequate description. If the interface type description includes opaque data types, e.g. a marshalling byte code such as FC_BLK-HOLE, the interface type description is inadequately documented.

When an undocumented interface is intercepted, the interface wrapper 700 has inadequate static information describing the size of stack frame used to call the member function. A stack frame cannot be created to call the component, so the existing stack frame is reused. In addition, the execution return from the component is intercepted in order to preserve the interface wrapping invariants used to identify components and to determine interface ownership.

For a function call from a client unit 100 on an undocumented interface, the COIGN instrumentation replaces the return address in the stack frame with the address of a trampoline function. The original return address and a copy of the stack pointer are stored in thread-local temporary variables. The COIGN instrumentation transfers execution to the component directly using a jump rather than a call instruction.

When the component finishes execution, it pops the stack frame from the call stack and issues a return instruction. Rather than return control to the client unit 100—as would have happened if the COIGN instrumentation had not replaced the return address in the stack frame—execution passes directly to the trampoline function. The trampoline function calculates the function's stack frame size by comparing the current stack pointer with the copy stored before invoking the component code. The trampoline saves the frame size for future calls, then returns control to the client directly through a jump instruction to the temporarily stored return address. By using the return trampoline, the COIGN runtime continues to function correctly even when confronted with undocumented interfaces.

The return trampoline is used only for the first invocation of a specific member function. Subsequent calls to the same interface member function are forwarded directly through the interface wrapper, which stores the calculated size for the function's stack frame.

When an undocumented interface is detected, the COIGN instrumentation examines the identities of the components communicating over the interface using component identity information as described above. The COIGN instrumentation notes a pair-wise location constraint on the placement of those components in a distributed computing environment.

Interface metadata is crucial to the COIGN system. During partitioning, the interception system measures the DCOM message size for every interface invocation. COIGN's marshaling-byte-code interpreter follows the exact same control logic as the COM marshaling interpreter to measure the size of DCOM message packets. The COIGN runtime summarizes the DCOM message size data. At the end of execution, communication summarization information is written to a profiling file for later analysis.

With accurate interception and access to information from the interface proxies and stubs, communication measurement is a straightforward process. The COIGN runtime measures the numbers, sizes, and endpoints of all inter-component messages. The COIGN analysis tools combine physical network measurements with logical data from the COIGN runtime to determine the exact communication costs for a given network.

Automatic Detection of Per-Component Location Constraints

COIGN uses location-constraint analysis to determine which component instances should be constrained to a particular host regardless of communication cost. COIGN's algorithm for discovering per-component location constraints is based on the following hypothesis: if a component accesses a location dependent resource, that access will occur through system API functions listed in the component's binary as links to system libraries.

On platforms with shared or dynamically linked libraries, applications usually access system resources through system API functions. On Windows NT, system API functions are exported from system DLLs. By simple analysis of binaries, it is determined which system DLLs an application or a component use. It is also determined which functions are used from each system DLL.

During scenario-based profiling, the COIGN runtime creates a mapping of components to binary files. Whenever a component is instantiated, the COIGN runtime traces entries in the component's interface VTBL back to their original binary file. COIGN records the binary file of each component.

During a post-profiling analysis phase, COIGN examines the binary files for each component to determine which system DLLs and system API functions are accessed by the component. A list of location-specific system API functions which "constrain" a component's distribution is created by the programmer or included with COIGN. For client-server applications, constraining functions are divided into those that should be executed on the client and those that should be executed on the server. Client constraining functions include those that access the video system, such as CreateWindow, and those that access the multimedia system, such as PlaySound. Server constraining functions are restricted mostly to file access functions such as CreateFile. A component is constrained to execute on either the client or the server if it uses any of the client or server constraining functions.

Determining application constraints based on the usage of system API functions is not infallible. Occasionally, a component is flagged as being constrained to both the client and the server because it uses functions assigned to both. For these cases, the application programmer manually assigns the component to a machine.

In a more frequently occurring case, COIGN decides that a component should be located on a particular machine when, in fact, the constraint is not needed. This overly conservative constraint occurs when constraining API functions execute only once, such as during installation. When a COM component is first installed on a computer, it registers itself with the system registry. The code used to register the component during installation resides in the component binary although it is never executed after installation. COIGN's constraint detection system has no way to know that a constraining function used during installation is not used during application execution. Therefore, installation code is desirably isolated from application-execution code.

From the models of application communication, network behavior, and location constraints, COIGN uses an optimization algorithm to select an optimal distribution scheme of the application components. To effect a desired distribution, COIGN intercepts component instantiation requests to the appropriate machine. COIGN intercepts all COM component instantiation requests and invokes the appropriate static or dynamic component classification system to determine which component is about to be instantiated. COIGN then determines the appropriate host for the component instantiation using the component placement map created during post-profiling analysis. A remote instantiation request is forwarded to the appropriate host for execution. After the remote instantiation request completes, the interface pointer to the newly instantiated component is marshaled, and returned to the calling machine. Each interface pointer is wrapped before being returned to the application.

Remote instantiation requests execute in a surrogate process on the remote machine. Surrogate processes are created by the COIGN runtime on each machine used by the application. Surrogate processes communicate with each other and with the application through a redirection interface. The redirection interface provides remote access to all of the COM instantiation functions. In addition to the COM instantiation functions, the redirection interface also provides access to COIGN-specific utility functions. For example, one of these functions retrieves a remote stack walk for component classification across multiple machines.

Having described and illustrated the principles of our invention with reference to an illustrated embodiment, it will be recognized that the illustrated embodiment can be modified in arrangement and detail without departing from such principles. Moreover, it will be recognized that the COIGN system is one possible refinement of the illustrated embodiment. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

Appendix A includes "COIGN.h," a source code compendium of system accessible COIGN definitions.

Appendix B includes "COIGN.idl," an interface description language file for the COIGN system.

I claim:

1. A method of instrumenting one or more units of an application program, wherein a unit comprises one or more interfaces through which communications to and from the unit pass, and wherein a client unit requests creation of a server unit, the method comprising, with an instrumentation tool that includes a processor and memory:
    intercepting a call from a client unit to a unit creation function to create a server unit;
    routing the call to the unit creation function, wherein the unit creation function creates the server unit and returns a reference to an interface of the server unit;
    detecting the reference to the interface returned from the unit creation function;
    creating an interface wrapper for the interface, the interface wrapper comprising a reference to instrumentation, the reference to the interface, and a reference to a type description of the interface; and
    returning to the client unit a reference to the interface wrapper in place of the reference to the interface, wherein the client unit treats the reference to the interface wrapper as the reference to the interface.

2. A computer-readable storage medium having stored therein computer-executable instructions for performing the method of claim 1.

3. The method of claim 1 wherein an interface comprises at least one function, the method further comprising:
    receiving from the client unit an invocation of the instrumentation that is based upon the reference that the client unit received, wherein the client unit treats the invocation as a call to a function of the interface, and wherein the client unit passes one or more parameters for the function; and
    executing the instrumentation, wherein the instrumentation parses and measures the one or more parameters based upon the type description of the interface, producing a measurement.

4. The method of claim 3 further comprising:
    calling the function of the interface using the reference to the interface in the interface wrapper, wherein the function performs an operation and returns one or more return parameters;
    executing the instrumentation, wherein the instrumentation parses and measures the one or more return parameters based upon the type description of the interface, producing a second measurement; and
    returning execution to the client unit.

5. A computer-readable storage medium having stored therein computer-executable instructions for performing the method of claim 4.

6. The method of claim 4 wherein the reference to instrumentation comprises a pointer to a table of at least one pointer to one or more instrumentation functions, and wherein the invocation of the instrumentation comprises a call to an instrumentation function.

7. The method of claim 4 further comprising:
    before the step of executing the instrumentation, comparing the reference to the interface wrapper with the invocation of the instrumentation to calculate an offset;
    determining from the offset the identity of the function of the interface to be called;
    during the step of executing the instrumentation, parsing and measuring based upon type description for the function to be called; and
    during the step of calling the function, applying the offset to the reference to the interface when referencing the function of the interface.

8. The method of claim 4 wherein the interface wrapper further comprises data identifying the server unit, the method further comprising:
associating the measurements with the server unit.

9. The method of claim 4 wherein the interface wrapper further comprises data identifying the server unit, and wherein a local variable stores an identifier for the client unit, the method further comprising:
associating the measurements with the client unit and the server unit.

10. The method of claim 9 wherein the local variable is a stack, and wherein an identifier for the client unit is at the top of the stack, the method further comprising:
before the step of calling the function, pushing an identifier for the server unit on the stack; and
after the step of calling the function, popping the identifier of the server unit off the stack.

11. A computer-readable storage medium having stored therein computer-executable instructions for performing the method of claim 10.

12. The method of claim 1 wherein a dynamic structure tracks the state of the application program, and wherein a local variable stores an identifier for the client unit, the method further comprising:
before the step of routing the call to the unit creation function,
dynamically classifying the server unit based upon the dynamic structure and the local variable, resulting in a unit classifier;
mapping the unit classifier to a location in a distributed computing environment; and
during the step of routing the call to the unit creation function, routing the call to the location.

13. The method of claim 12 wherein the dynamic structure is a call stack comprising one or more client unit invocation frames, and wherein the step of dynamically classifying the server unit comprises:
traversing the call stack;
noting a return address for an invocation frame;
examining the local variable;
noting the identifier for the client unit; and
creating a unit classifier based upon the return address and the identifier.

14. The method of claim 1 further comprising:
receiving from the client unit an invocation of the instrumentation that is based upon the reference that the client unit received, wherein the client unit treats the invocation as a call to a function of the interface;
determining if the interface is documented based upon the interface wrapper;
if the interface is undocumented,
transferring execution to the function of the interface using the reference to the interface in the interface wrapper, wherein the function performs an operation and finishes; and
returning execution to the client unit.

15. The method of claim 1 wherein the interface wrapper further comprises an identifier for the server unit that exposes the interface, and wherein a local variable stores an identifier for the client unit, the method further comprising:
receiving from the client unit an invocation of the instrumentation based upon the reference that the client unit received;
determining if the interface is documented based upon the interface wrapper;
if the interface is undocumented,
noting the relationship of the undocumented interface to the client unit and the server unit based upon the identifiers; and
noting a pair-wise location constraint between the client unit and the server unit.

16. An application program unit instrumentation creator, comprising a processor, memory and storage storing computer-executable instructions for:
means to intercept a call from a client unit to a unit creation function;
means to route the call to the unit creation function;
means for the unit creation function to create a server unit and return a reference to an interface of the server unit;
means to intercept the reference to the interface of the server unit;
means to create an interface wrapper which comprises a reference to instrumentation, and the reference to the interface; and
means to return to the client unit the interface wrapper in place of the interface reference.

17. A method of instrumenting one or more units of an application program, wherein a unit comprises one or more interfaces, through which communications to and from the unit pass, and wherein a client unit requests creation of a server unit, wherein at least one interface comprises one or more functions, wherein a call stack holds one or more parameters of a call to a function from a client unit, wherein the call stack holds a return address for the client unit, and wherein a stack pointer points to the top of the stack, the method comprising, with an instrumentation tool that includes a processor and memory:
receiving from the client unit an invocation of an instrumentation function that is based upon a reference to an interface wrapper that the client unit received, wherein the client unit treats the invocation as a call to a function of the interface, wherein the client unit pushes the one or more parameters for the call to the function on the call stack, and wherein the client unit pushes a return address for the client unit on the call stack;
determining if the interface is documented based upon the interface wrapper;
if the interface is undocumented,
storing the value of the stack pointer;
storing the return address for the client unit;
replacing the return address for the client unit on the call stack with a return address for an instrumentation function;
transferring execution to the function of the interface using the reference to the interface in the interface wrapper, wherein the function performs an operation;
after the function finishes,
popping the return address for the instrumentation function from the call stack;
popping the one or more parameters from the call stack;
transferring execution to the instrumentation function;
calculating the size of the one or more parameters based upon the stored value of the stack pointer and the current value of the stack pointer;
storing the calculated size in the type description of the interface wrapper;
transferring execution to the client unit.

18. The method of claim 17 wherein determining if the interface is documented comprises:
examining the type description referenced in the interface wrapper; and
if the type description contains no type information, indicating that the interface is undocumented.

19. The method of claim 17 wherein determining if the interface is documented comprises:

examining a type description referenced in the interface wrapper; and if the type description contains opaque type information, indicating that the interface is undocumented.

20. The method of claim 17 wherein the interface wrapper comprises an identifier for the server unit that exposes the interface, and wherein a local variable stores an identifier for the client unit, the method further comprising:

if the interface is undocumented, noting the relationship of the undocumented interface to the client unit and the server unit based upon the identifiers; and noting a pair-wise location constraint between the client unit and the server unit.

* * * * *